(12) United States Patent
Nicholas et al.

(10) Patent No.: US 12,299,693 B2
(45) Date of Patent: May 13, 2025

(54) METHOD AND SYSTEM FOR PROVIDING NETWORK BASED TARGET ADVERTISING AND ENCAPSULATION

(75) Inventors: Frank C. Nicholas, Wilmette, IL (US);
Ian B Carswell, Chicago, IL (US);
Paul M. Hletko, Chicago, IL (US)

(73) Assignee: DIZPERSION CORPORATION, Evanston, IL (US)

( * ) Notice: Subject to any disclaimer, the term of this patent is extended or adjusted under 35 U.S.C. 154(b) by 1585 days.

(21) Appl. No.: 11/134,116

(22) Filed: May 20, 2005

(65) Prior Publication Data

US 2006/0026067 A1   Feb. 2, 2006

Related U.S. Application Data

(63) Continuation-in-part of application No. 10/657,636, filed on Sep. 8, 2003, now abandoned, and a
(Continued)

(51) Int. Cl.
*G06Q 30/00*  (2023.01)
*G06Q 30/0251*  (2023.01)

(52) U.S. Cl.
CPC ......... *G06Q 30/00* (2013.01); *G06Q 30/0255* (2013.01); *G06Q 30/0261* (2013.01)

(58) Field of Classification Search
CPC . G06Q 30/00; G06Q 30/0255; G06Q 30/0261
See application file for complete search history.

(56) References Cited

U.S. PATENT DOCUMENTS 5,724,521 A * 3/1998 Dedrick ............... G06Q 30/02
  705/26.1
5,794,210 A * 8/1998 Goldhaber ......... G06Q 30/0273
  705/14.69
(Continued)

FOREIGN PATENT DOCUMENTS

| EP | 1271365 A1 | 2/2003 |
| WO | WO9957660 | 11/1999 |
| WO | WO0029969 | 5/2000 |

OTHER PUBLICATIONS

Gallagher, A framework for targeting banner advertising on the Internet, 1997, IEEE, vol. 4, pp. 265-274.*

*Primary Examiner* — Arthur Duran
(74) *Attorney, Agent, or Firm* — Douglas B Teaney; Cardinal Law Group

(57) ABSTRACT

A method of online advertising includes receiving an ad request, determining at least one proxy ad in response to the ad request, and providing the at least one proxy ad, wherein the at least one proxy ad links to a listing page. A method of online advertising includes providing a template ad including a static portion, receiving a request for structured information format data, determining structured information format data based on selection criteria associated with the request, and providing the structured information format data to the template ad based on the determination. A method for advertising with structured information format data feeds including receiving a first request at a structured information format data server, sending structured information format data including an ad from the structured information format data server, the ad including a content aggregator identifier, and determining whether the content aggregator identifier is included in an ad request.

18 Claims, 61 Drawing Sheets

Related U.S. Application Data continuation-in-part of application No. 10/456,826, filed on Jun. 6, 2003, now Pat. No. 8,538,803, and a continuation-in-part of application No. 10/172,492, filed on Jun. 14, 2002, now Pat. No. 8,131,585.

(60) Provisional application No. 60/573,219, filed on May 21, 2004.

(56) References Cited

U.S. PATENT DOCUMENTS

| | | | | |
|---|---|---|---|---|
| 5,848,396 | A * | 12/1998 | Gerace | H04L 9/40 705/7.29 |
| 5,933,811 | A | 8/1999 | Angles et al. | |
| 5,948,061 | A | 9/1999 | Merriman et al. | |
| 5,963,925 | A * | 10/1999 | Kolling | G06Q 20/10 705/40 |
| 6,018,748 | A * | 1/2000 | Smith | G06F 16/94 707/E17.013 |
| 6,029,141 | A * | 2/2000 | Bezos et al. | 705/27 |
| 6,144,944 | A | 11/2000 | Kurtzman, II et al. | |
| 7,376,714 | B1 * | 5/2008 | Gerken | G06Q 30/02 709/219 |
| 7,464,344 | B1 * | 12/2008 | Carmichael | G06Q 30/0244 707/E17.116 |
| 7,668,748 | B1 * | 2/2010 | Veach | G06Q 30/0275 705/37 |
| 2001/0014868 | A1 * | 8/2001 | Herz | G06Q 30/0269 705/26.1 |
| 2002/0018076 | A1 * | 2/2002 | Gianola | G06Q 30/06 715/733 |
| 2002/0046104 | A1 * | 4/2002 | Kaddeche | G06Q 30/0258 705/14.56 |
| 2002/0063714 | A1 * | 5/2002 | Haas | G06F 16/40 345/473 |
| 2002/0113820 | A1 * | 8/2002 | Robinson | G06F 16/954 715/764 |
| 2002/0116268 | A1 * | 8/2002 | Fukuda | G06Q 30/0277 709/201 |
| 2002/0133397 | A1 * | 9/2002 | Wilkins | G06Q 30/02 702/181 |
| 2003/0023489 | A1 * | 1/2003 | McGuire | G06Q 30/0257 705/14.66 |
| 2003/0028419 | A1 * | 2/2003 | Monaghan | G06Q 10/10 705/7.29 |
| 2003/0036949 | A1 * | 2/2003 | Kaddeche | G06Q 30/02 705/14.58 |
| 2003/0037041 | A1 * | 2/2003 | Hertz | H04N 21/454 348/E7.071 |
| 2003/0040946 | A1 * | 2/2003 | Sprenger | G06Q 30/06 705/6 |
| 2003/0149937 | A1 * | 8/2003 | McElfresh | G06Q 30/0269 715/210 |
| 2003/0220918 | A1 * | 11/2003 | Roy | G06Q 30/02 |
| 2004/0044571 | A1 * | 3/2004 | Bronnimann | G06Q 30/0275 705/14.71 |
| 2004/0249709 | A1 * | 12/2004 | Donovan | G06Q 30/02 705/14.46 |
| 2005/0001743 | A1 * | 1/2005 | Haemerle | G08G 1/0962 348/E7.071 |
| 2005/0021521 | A1 * | 1/2005 | Wycoff | 705/10 |
| 2005/0038749 | A1 * | 2/2005 | Fitch | H04N 21/4223 348/E7.06 |
| 2005/0096979 | A1 * | 5/2005 | Koningstein | G06Q 30/0277 705/14.68 |
| 2005/0096980 | A1 * | 5/2005 | Koningstein | G06Q 30/0255 705/14.69 |
| 2005/0222900 | A1 * | 10/2005 | Fuloria | G06Q 30/0277 705/14.54 |
| 2005/0256766 | A1 * | 11/2005 | Garcia | G06Q 30/0256 705/14.54 |
| 2006/0116924 | A1 * | 6/2006 | Angles | G06Q 30/0251 705/14.69 |
| 2006/0253434 | A1 * | 11/2006 | Beriker | G06Q 30/0601 705/26.1 |
| 2007/0179867 | A1 * | 8/2007 | Glazer | G06Q 30/0613 705/26.8 |
| 2009/0070221 | A1 * | 3/2009 | Carmichael | G06Q 30/02 705/14.54 |

* cited by examiner

Independent Register
INTERNET CHANNEL NETWORK
for Brodhead and greater Green County, WI

HOME | CONTACT US | HELP

GENERAL NEWS | BUSINESS/FINANCE | SPORTS | TRAVEL | FAMILY | LEISURE | JOBS |

— 281

| AUDIENCE PROFILE |
| IPARENTING.COM | ← 282

FAMILY
3/7/2002 1:05:26 PM
○ iParenting.com

RATE CARD

Gender
Male         2%
Female       98%

Median Age: 36 years
18-34        35%
35-44        53%      — 283
45-54        7%

Education
College Graduate +    88%
Some College          8%

DEMO

Occupation
Managerial            31%
Professional          35%

METHOD AND SYSTEM FOR PROVIDING NETWORK BASED TARGET ADVERTISING AND ENCAPSULATION

RELATED APPLICATION DATA

This application claims the benefit of U.S. Provisional Application 60/573219 filed May 21, 2004 entitled METHOD AND SYSTEM FOR PROVIDING NETWORK BASED TARGET ADVERTISING AND ENCAPSULATION. This application also claims priority as a continuation-in-part of U.S. patent application Ser. No. 10/657,636 filed Sep. 8, 2003 and U.S. patent application Ser. No. 10/456,826 filed Jun. 6, 2003, and U.S. patent application Ser. No. 10/172,492 filed Jun. 14, 2002. The entirety of each application is hereby incorporated by reference.

FIELD OF THE INVENTION

The present invention generally relates to the advertising of goods and services. More specifically, the present invention relates to the targeted distribution of advertisements over a network.

BACKGROUND OF THE INVENTION

The networked world, particularly the Internet and World Wide Web (WWW), has provided numerous new opportunities, formats and mediums for the advertisement of product and services. Early forms of advertising were not based upon a geographic location or demographic profile of the viewers and listeners of the advertisements. Over the past several years, there has been a movement to target advertising toward viewers and listeners based on their geographic location and demographic profile. The present invention is an advancement of this movement.

One method of online advertising that has experienced growth in recent years is the listing site. A listing site may be defined as a site made up of listing pages. A listing page is a page with one or more than one element listed. The one or more than one element listed may include a product, service, person, informational resource, image, business, and the like. The listing site allows an end user to view listing pages, often organized in a hierarchy. Some listing sites allow a user of the listing site to specify search terms that determine what listing page or pages are displayed. Search terms may be entered free form or selected from a set list. Search terms may include description of service, service category, product, geographic location, and price, among many others.

Some listing sites provide primarily contact information to the user of the listing site; this contact information often refers to a person, business establishment, government agency, organization location, or the like. This listing site subcategory shall be termed a directory site. Some directory sites are in highly focused markets such as bars in a particular city, others cover a much broader range such as SuperPages.com®.

Other listing sites exist with the intention of selling the listed elements, with the listing being an intermediate step in the retail process. A typical example of this type of site may be an online store such as Amazon.com®. The function of Amazon.com is primarily to retail the listed elements, but it also performs the function of listing the elements. This listing site subcategory shall be termed a retail site.

Another subcategory of listing site is a review site. A review site is a site such as ConsumerReports.com®, that lists elements along with a review of the listed elements.

On occasion a site will exist without the primary function of listing elements, but the site contains one or more listing pages. One example is a news site such as WSJ.com®. WSJ.com may include an article reviewing a list of elements such as best mutual funds. A site that includes a listing page still may be classified as a listing site, but is further subcategorized as an incidental listing site.

Another subcategory of listing site is a search engine site. A search engine site generally operates by crawling through internet resources, indexing them, and displaying them when a query entered is associated with the indexed resources. The elements of a list on a search engine site are returned in response to the query.

Sometimes the listed elements on a listing site are ranked. The ranking may be based on price, quality, geographic proximity, popular review, or the like. The ranking may also be artificially created.

Each listed element on a listing page may not be displayed in the same manner. One or more elements may be enhanced, listed as a featured element, highlighted, or receive any other treatment that provides a means of attracting attention to it. Any such treatment shall be termed as featured status. For example, a company listing in a directory site may include a colored background, a company logo image, a recommended label, a larger font, or any combination of these or other highlighting features.

A listing site may rank or provide featured status to one or more of its listed elements at least in part based upon a payment from an entity requesting preferential listing for that element. A typical example of this is again a company can often by a featured status package from a directory site to receive a higher listing on the listing page, a featured status listing, or a combination of the two.

Elements listed on a listing page will, in most cases, enjoy additional recognition based upon inclusion on a listing page. Featured status or a higher ranking increases this additional recognition. In the example of a company listed on a directory site having featured status or a higher ranking there is an increased likelihood that they will receive inquiries into their product or service as potential patrons are more likely to notice their listed element. This provides an advantage to the highly ranked or featured status element or its associated entity.

A secondary case should be noted wherein a listing may indicate a non-desirable characteristic. For example a list of least environmentally friendly companies, a list of worst repair records on car models, or a list of known sex offenders. In these cases a lower ranking, lack of featured status, or exclusion from the list is advantageous. Because there are listing sites that provide advantages to listed elements and listing sites that are disadvantageous to listed elements, a way of referring to an elements preferred state on a listing site is needed—be that highly ranked and featured, or lower ranked, or even absent. This will be called an elements preferred state or its preferential state.

One reason for the popularity of listing sites is presumed impartiality. In many cases the elements listed are not owned or associated directly with the listing site. In some cases, there is no financial relationship between the element or owner of the element and the listing site. As a result, the user of a listing site in many cases has the impression or supposition of impartiality in the listing site. Featured status on a listing site may decrease this impression of impartiality, but as the listing page in many cases represents multiple elements the user may feel more comfortable selecting, contacting, or purchasing the featured element because there was the opportunity for choice. From an advertising perspective, the perceived impartiality and/or opportunity for choice may lead the user to feel less coercion in the pitch. In many cases, a listing, especially a featured listing, is larger and more prominently displayed on a page than standard display advertising such as banners, towers, and the like. Moreover, one may assume that when a listing site is designed and used properly, the listing is what the user is looking for. The power in this advertising model is evidenced in the current popularity of paid search programs such as Google AdWords®. Using this program, an advertiser creates an advertisement listing and chooses words that, if searched for, trigger the display of the advertisement listing on the Google® search engine site listing page. While the method of distributing elements and information about elements in listing sites has been effective in many instances, and while elements or their associated parties may enjoy advantages of a preferential state with a listing site, there are some potential disadvantages to the current system.

Some of the challenges associated with achieving full advantage and value from a listing site are due to the likelihood of a user reaching the desired listing page. For example, an advertiser using Google Adwords may feel that a person using that search engine site may be interested in their service if they were to search for "invention protection." While this may be an accurate description of the advertiser's services, and while this may be the service the person using the search engine is looking for, the person may not use those search terms. By way of another example, a person searching for an intellectual property lawyer using a directory site must often either drill down through pages selecting state, city, and practice type. Many users may be more inclined to search for the word "patent" if a free form search option is given, but depending on the sophistication of the directory site this may or may not give the user a listing of intellectual property lawyers. In both of these examples, we begin with a user already at the listing site. A listing site must attract users for those users to perform the listed searches.

Various methods of geotargeting exist. There are possible inaccuracies in some of these methods. For example, a user may volunteer their location information to some site or service. This type of demographic determination is profile-based targeting. Some users may intentionally or unintentionally provide false location information in their profile.

Geographic targeting based on IP address translation is IP-based targeting. IP-based targeting is subject to changes network address assignment. Entire blocks of IP addresses are at times reassigned to different cities, states, or even countries.

One problem with existing on-line advertising is the extra steps necessary to get information to a user. Various on-line advertising approaches have been taken to target advertising to subject matter of searches and key words in content. The user must then, however, click on the ad and find his way to a desired product or service. The user may then be required to call the product or service provider or go through additional steps to purchase the product or service.

Often times when advertisers are running promotions they want as many redemptions as possible to allow them to, for example, move merchandise or introduce a new product.

BRIEF DESCRIPTION OF THE DRAWINGS

FIG. 15 illustrates one embodiment of a web site category and demographic interface;

DETAILED DESCRIPTION OF A PRESENTLY PREFERRED EMBODIMENT

Figure 1:
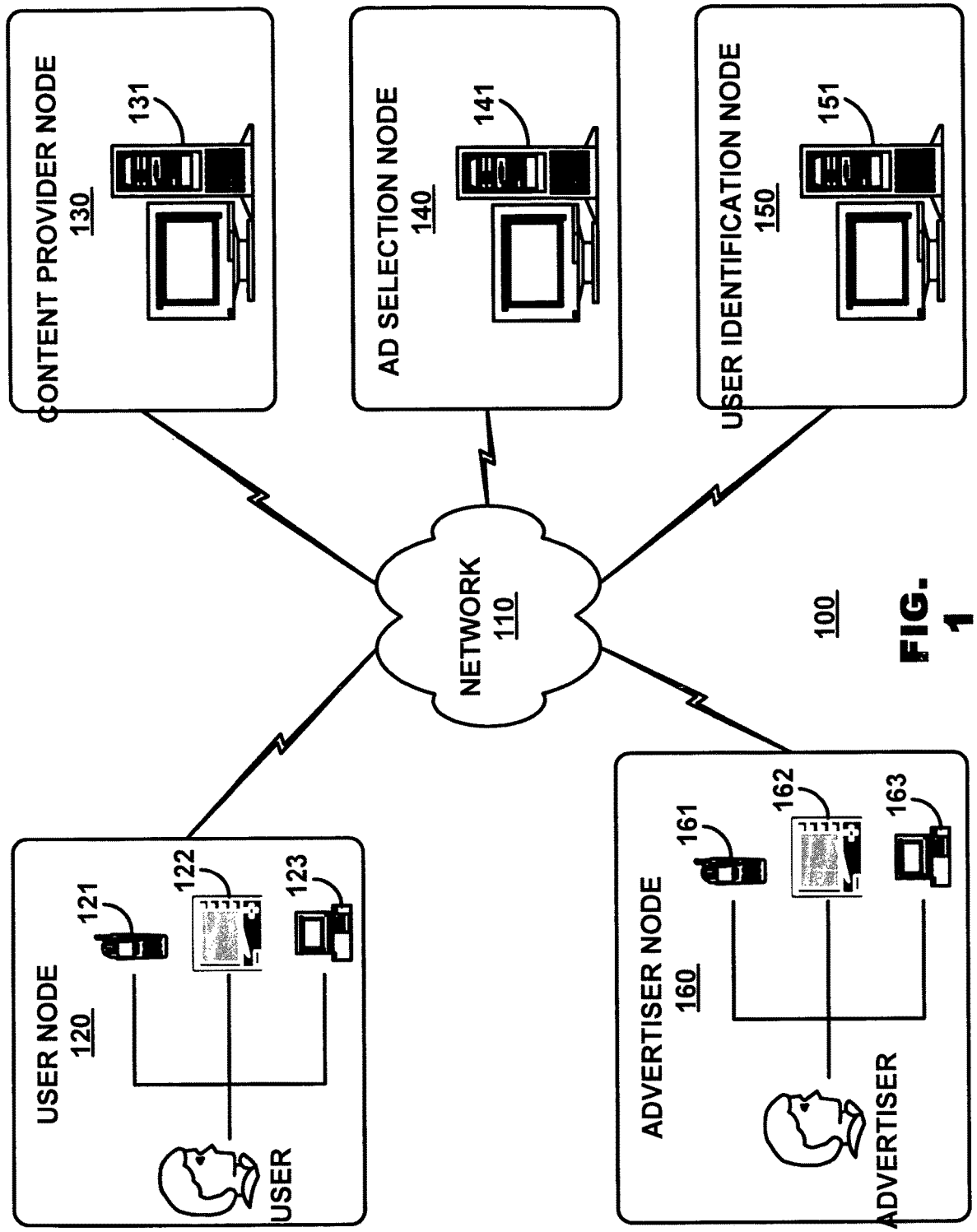
FIG. 1 illustrates a schematic diagram of one embodiment of a telecommunication system of the present invention.

Referring to FIG. 1, a telecommunication system 100 of the present invention is shown. Telecommunication system 100 comprises a network 110 which is the media used to provide communications links between the various nodes of telecommunication system 100. Links through network 110 may include permanent connections (e.g., wire or fiber optic cables), temporary connections made through telephone or wireless communications, or various nodes of telecommunication system 100 may actually be hosted on the same physical hardware platform removing the necessity of a network link altogether. Network 110 may be in the form of public or private connections available over the Internet, an extranet, an intranet, a hard-wired local area network (LAN), a hard-wired wide area network (WAN), a wireless LAN a wireless WAN, and/or other forms.

A user node 120 of telecommunication system 100 operates to facilitate communications of requested information in audio form and/or visual form between a user of user node 120 and one of the other nodes of telecommunication system 100. Devices, apparatuses and systems, such as for example, a cell phone 121, a personal digital assistant 122, and a personal computer 123 as illustrated, can be utilized within user node 120 to establish such communications. Other suitable devices, apparatuses and systems not illustrated include networked household appliances (e.g., televisions, refrigerators, etc.), digital or satellite radio systems, and others as would occur to those having ordinary skill in the art.

Figure 2:
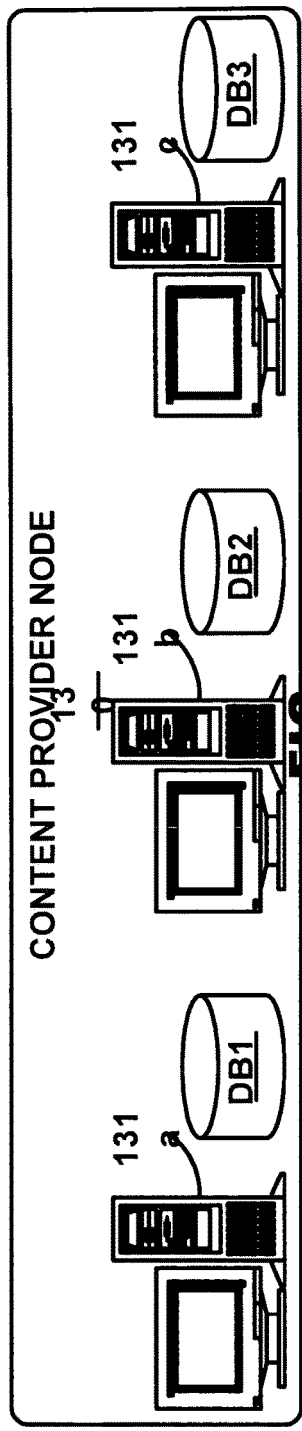
FIG. 2 illustrates a schematic diagram of one embodiment of a content provider node of the FIG. 1 telecommunication system.

A content provider node 130 includes one or more servers 131 for communicating with the other nodes of telecommunication system 100. In one embodiment, content provider node 130 includes a content server 131a and an associated database DB1 as illustrated in FIG. 2 for providing requested information to user node 120. The requested information can be in a variety of forms, such as, for example, a static or dynamic web page, a radio or video broadcast or narrowcast, a page or segment of wireless application protocol (WAP) content, a short messaging service (SMS) message, or other forms of network information. Accordingly, content server 131a can include suitable hardware platforms and software modules to operate as a web site server, a radio broadcast server, a streaming video server, etc.

Content provider node 130 can further operate to communicate one or more advertisements with or as the requested information to user node 120 as directed by an ad selection node 140. These advertisements can be managed by content server 131a and associated database DB1, a third party ad server 131b and an associated database DB2 as illustrated in FIG. 2 (e.g., a commercially accessible server by Double Click), or a distributed media server 131c and an associated database DB3 as illustrated in FIG. 2 (e.g., a commercially available server by Akamai).

Figure 3:
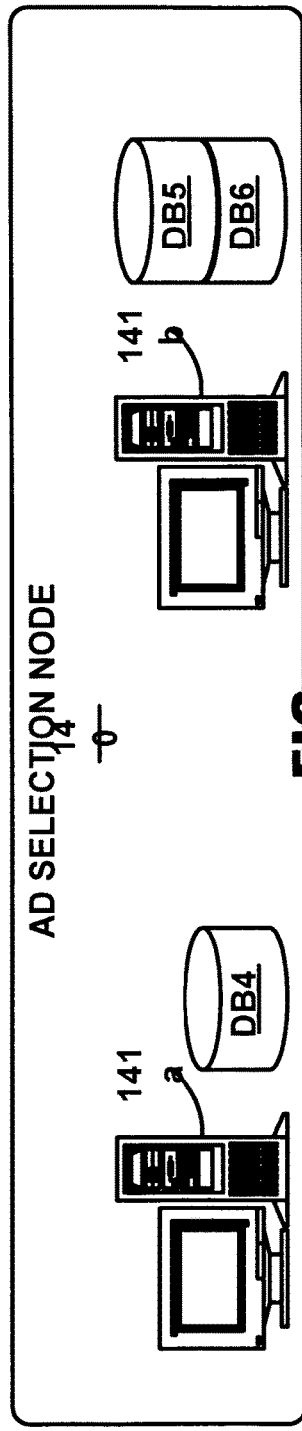
FIG. 3 illustrates a schematic diagram of one embodiment of an ad selection node of the FIG. 1 telecommunication system.

Referring again to FIG. 1, ad selection node 140 includes one or more servers 141 for communicating with the other nodes of telecommunication system 10. In one embodiment, ad selection node 140 includes a targeted ad server 141a and an associated database DB4 as illustrated in FIG. 3 for managing a selection of which advertisement or advertisements are to be communicated with the requested information from content provider node 130 to user node 120 in accordance with the present invention. Accordingly, targeted ad server 141a includes hardware platforms and software modules for a network operation of targeted ad server 141a as well as additional hardware platforms and software modules for implementing various methods of the present invention as will subsequently be described herein.

Figure 5:
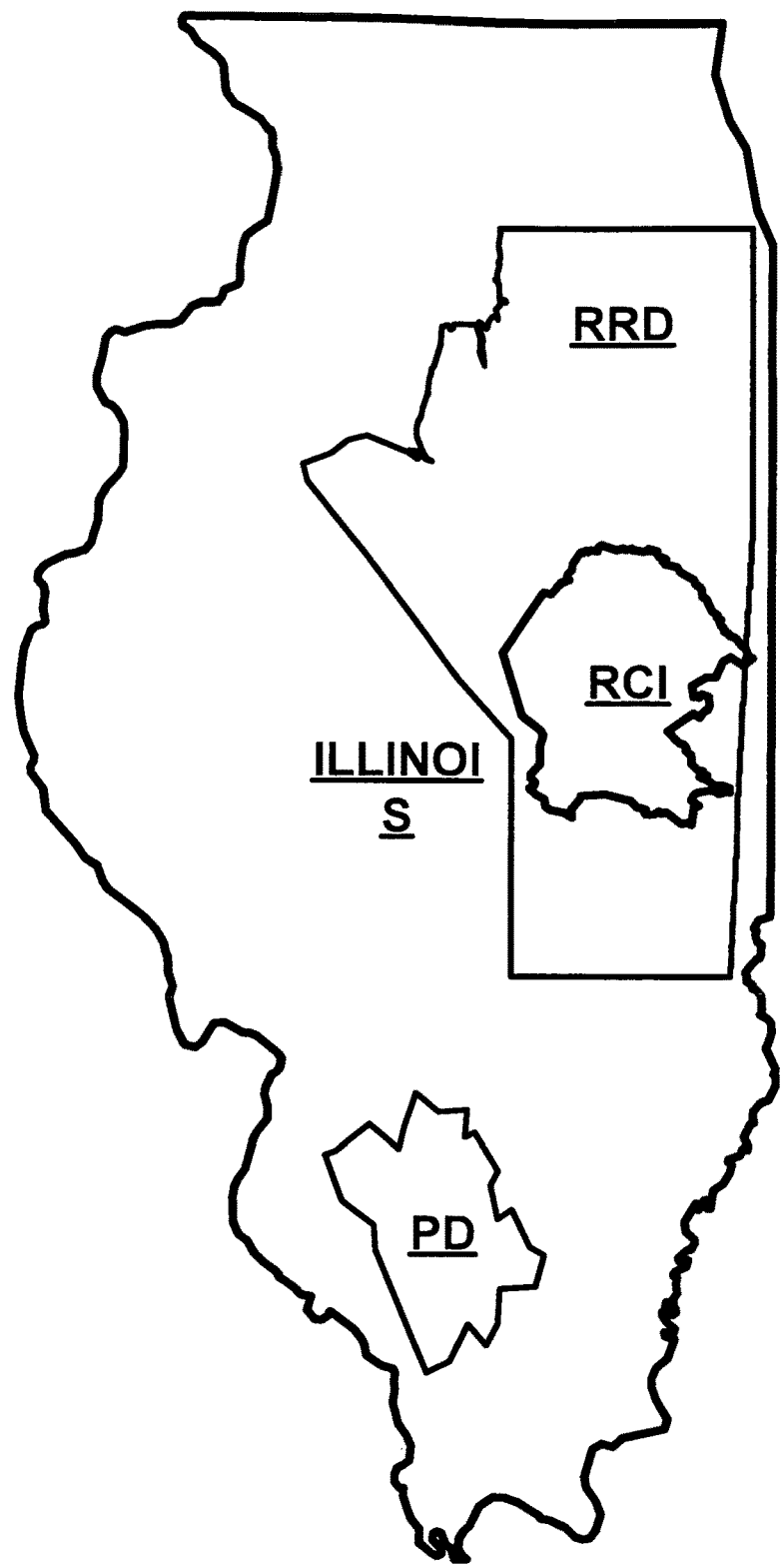
FIG. 5 illustrates fictitious advertising regions within the state of Illinois.

Concurrent with or alternative to content provider node 130 (e.g., third party ad server 131b and distributed media server 131c shown in FIG. 2), ad selection node 140 can further operate to communicate one or more advertisements with the requested information to user node 120. These advertisements can be managed by a database server 141*a* and associated databases DB5 and DB6 as illustrated in FIG. 3. In one embodiment, database DB5 contains information related to advertisers and their ads, where individual ads are associated with the zip codes in which they are to be served. Advertisers can purchase the advertising space for the individual advertisements based on a region of commercial or political influence. In one embodiment, zip codes, or other specified geographical area, within a selected region can be identified as part of the advertising area for that particular advertiser. For example, as exemplary shown in FIG. 5, a business wishing to introduce a new product or service campaign in the state of Illinois may wish to do so within a region of commercial influence (RCI) of a fictitious newspaper. The business would then have one or more related digitized advertisements designated to be served into zip codes within the RCI (e.g., 60200, 60203, 60204, 60206, 60208, and 60210). Also by example, an ad agency wishing to introduce a series of ads in the state of Illinois within a region of residential districts (RRD) such as the greater Chicago area would have one or more related digitized advertisements designated to be served into zip codes within the RRD. By further example, a political campaign wishing to introduce a series of campaign ads in the state of Illinois within a corresponding political district (PD) would have one or more related digitized advertisements designated to be served into zip codes within political district PD.

For every zip code in the United States, the databases maintain records identifying the advertisers that have purchased at least one impression in that zip code, where an impression is defined as the distribution of an advertising package to user node 120 (FIG. 1) through their interaction with a content provider node 130 and/or ad selection node 140 (FIG. 1). Each advertiser record includes a unique identifier for the advertiser, keys relating them to sold advertising packages, the date and time of each ad impression, the number of impressions that should be served in each recognized timeframe, and the maximum number of impressions that may be served in each recognized timeframe. A timeframe mentioned may include any span of time one wishes to distinguish. A timeframe may be a month, week, day, hour, etc. The advertisers are simply mapped into not only each zip code or other geographical area of importance, but also each time frame in which they would like to distribute impressions.

In one embodiment, database DB6 contains data gathered by the most recent U.S. census. This information is organized in records associated with each zip code in the United States. Each record within database DB6 includes several columns of information about each zip code. A first set of columns includes information related to the percentage of the total population within the zip code that has an ethnic designation of White, Black, Asian/Pacific, or Hispanic origin. A second set of columns includes information related to the percentage of the total population within the zip code that falls into the following age categories: 0-4; 5-9; 10-14; 15-19; 20-24; 25-44; 45-64; 65-84; 85; and older. Another column of information is related to the median age of the population within the zip code. An additional column includes information related to the male/female ratio within the zip code. A further column includes information related to the per capita income within the zip code. Another group of columns includes information related to the percentage of the total population within the zip code that falls into each of the following annual income categories: less than $15,000; $15,000 to $24,000; $25,000 to $49,999; $50,000 to $99,999; $100,000 to $149,999; and $150,000 or more. And a further group of columns includes information related to the percentage of the total population within the zip code making use of financial services such as home loans, automobile loans, investments, and retirement plans.

Referring again to FIG. 1, a user identification node 150 includes one or more servers 151 for communicating with the other nodes of telecommunication system 10. In one embodiment, user identification node 150 includes a geographic location server 151*a* and associated database DB7 for providing information indicative of a geographic location of the user to ad selection node 140 (e.g., a commercially available server by Quova, a global positioning system (GPS) enabled user node, or using cellular triangulation). In another embodiment, user identification node further includes a demographic profile server 151*a* and associated database DB8 for providing additional information indicative of a demographic profile of the geographic location to ad selection node 140 (e.g., a commercially available server containing the most recent U.S. Census or the like).

An advertiser node 160 of telecommunication system 100 operates to facilitate communications of advertisements in audio form and/or visual form between an advertiser and the ad selection node 140. Devices, apparatuses and systems, such as for example, a cell phone 161, a personal digital assistant 162, and a personal computer 163 as illustrated, can be utilized within advertiser node 160 to establish such communications. Other suitable devices, apparatuses and systems not illustrated include networked household appliances (e.g., televisions, refrigerators, etc.), digital or satellite radio systems, and others.

The advertiser may be the end advertiser of a product or service, a marketer, a publicist, a politician, any other similar party, or any party acting as an agent of the advertiser such as a media company, public relations company, advertising agency, or traditional publication.

While the nodes of FIG. 1 are illustrated and described as solely communicating using network 110, this is only to be considered a baseline mode, and not limiting. Various nodes, where possible, may communicate using other forms of communication including phone, fax, in-person meetings, mail, and others. Further, while the nodes, and further their component make-up (e.g. servers, databases), are described as operating independently and on separate platforms, it should be well understood by one skilled in the art that various functions of the node or functions of the multiple nodes may be performed on the same physical hardware, or spread in different configurations, arrangements and architectures among the various nodes.

Extranet Interfaces for Advertisers

Ad selection node 140 (FIG. 1), in particular targeted ad server 141*a* (FIG. 3) may include various interfaces for facilitating a communication of an advertisement to ad selection node 140 by an advertiser (FIG. 1) or its agent. The advertiser may be a traditional publication, such as The Glenview Announcements, which is a local newspaper for Glenview, IL The Glenview Announcements may be found to have a particular area of commercial influence. The region of commercial influence may be any combination of zip codes, cities, counties, states, or other geographical region. In one embodiment, the distribution area of the traditional media version of a publication may define the area of commercial influence for that publication. Commercial influence may be some region other than the distribution area of traditional media version of a publication as determined by market conditions, geographic preferences, or other business and economic factors. The Glenview Announcements may have, for example, an area of commercial influence of zip code 60025. Using various interfaces with ad selection node 140, personnel at the Glenview Announcements may create a digitized version of an advertisement that may appear in the traditional media version of its publication. The Glenview Announcements may also define that this advertisement should only be shown within its area of influence. In one embodiment, the advertiser may also define what sites or category of sites an advertisement may appear on. For example, the advertisement may only appear on news sites and the user (FIG. 1) may then access content provider node 130 (e.g., content server 131*a*) via user node 120. One example might be viewing the cnn.com website using a web browser on personal computer 123 (FIG. 1). If user identification node 150 (FIG. 1) determines that user is accessing the system from within zip code 60025, the digitized advertisement created by the Glenview Announcements may be served. This system may allow traditional publications to sell and broadcast network advertisements that may be displayed only within its region of influence.

The following FIGS. 6-11 illustrate various interfaces for creating a network-based advertisement. The illustrated interfaces may be omitted, rearranged, or added in a system of the present invention without straying from the intent of defining the properties necessary or useful for distributing an advertisement online. Advertisements may be directly entered into a database or software program, may be entered via web interface, or any other means known in the art.

Figure 6:
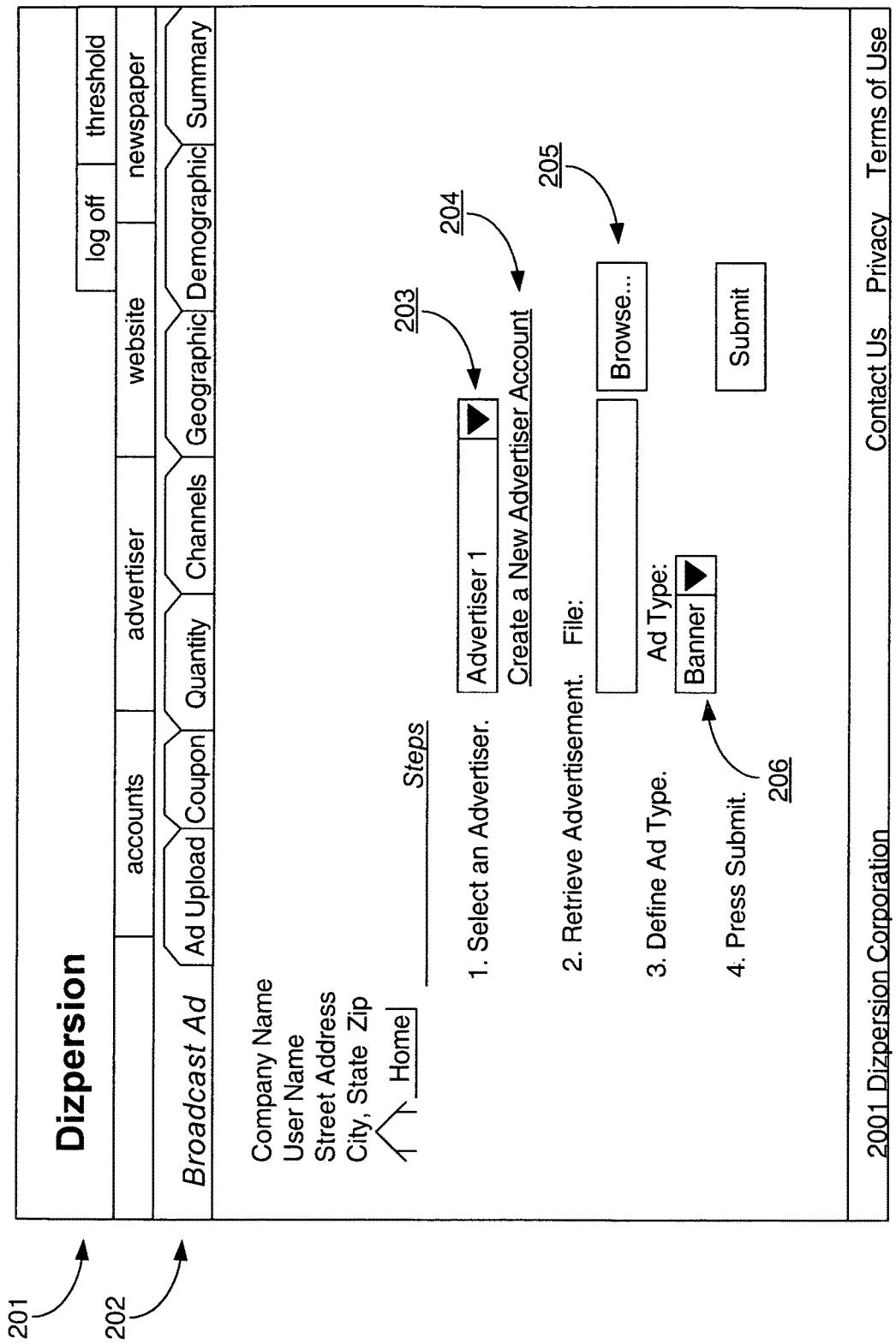
FIG. 6 illustrates one embodiment of an advertisement definition page.

FIG. 6 illustrates one embodiment of a web browser-based interface 200 for beginning the process of defining an advertisement. Below main header 201 is subheader and navigation system 202. Main header 201 and subheader and navigation system 202 may be shared throughout the advertisement definition process. Subheader and navigation system 202 may include text or image based hypertext links to each step of the advertisement definition process. The link's color, shading, shape, or some other feature may indicate the active page of the process. During the advertisement definition process, a user of the system may wish to change a selection or setting from a previous page, or skip ahead in the process. Subheader and navigation system 202 may allow the user to move to any portion of the process the user may edit. In one embodiment, some portions of the process may not be edited before others. A similar scheme to that indicating which page is active may be employed to indicate the steps of the process to which the user may navigate.

Below navigation system 202, an HTML form may present the user with options for defining an advertisement. Form input 203 may allow the user to select an advertiser for the advertisement being created. If an advertiser has not been defined in the system, and is not held in a database of advertisers in ad selection node 140, the user may be provided with a link 204, or some other means, to navigate to a form for the creation of a new advertiser. After the advertiser for the advertisement being created has been selected in form input 203, the user may define a file for use as, or in creation of, the advertisement in form input 205. A file may be specified directly in text, or a standard file-browsing dialog box may be employed. Files used may include images of the graphics interchange (GIF), joint photograph experts group (JPEG), or any other image file format. Files used may also include an HTML page, a portion of an HTML page such as a form, Flash executable, some form of streaming media, or any other file format that may be served over a network. After a file has been specified in form input 205, the user may define what type of advertisement they are creating by selecting from form input 206. Advertisement types may include banner, tower, pop-up, pop-under, SMS message, or any other type of advertisement. After the advertisement type is selected, the user may proceed to the next step of the advertisement definition process. Some form of client-side scripting, such as javascript, and/or server-side scripting may be employed to ensure that all required form inputs 204-206 contain some legitimate value. Similar client and/or server-side scripting may be employed throughout the advertisement definition process, and throughout any portion of the user interface employed in interaction with ad selection node 140.

Figure 7:
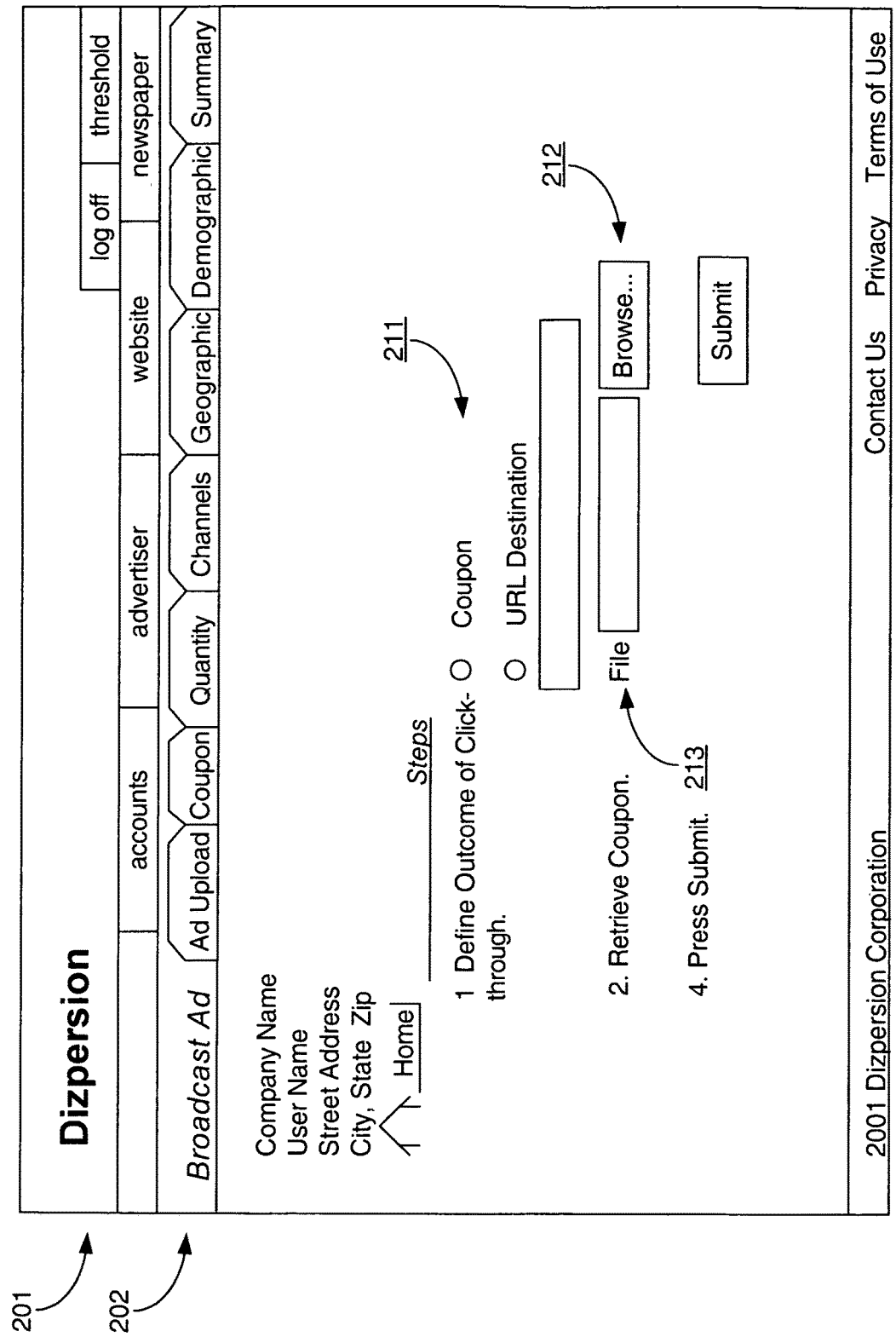
FIG. 7 illustrates one embodiment of an advertisement destination definition page.

FIG. 7 illustrates one embodiment of a web-based interface 210 for defining the destination of the advertisement. An advertisement may contain a hyperlink, may in some way redirect a user, or in some way provide a means for the user to be directed, to another network resource. This other network resource is the advertisement's destination. In one embodiment, the user may select that the advertisement has no destination. Other destinations may include a web page on the advertisers site, a web page on ad selection node 140, a web page on some other site, an email link, or any other network resource. One embodiment allows a coupon to be defined, which is a configurable page on ad selection node 140, the details of which will be discussed hereafter. On the web-interface, the user may select the type of network resource for the destination with form element 211. If the user selects a URL destination, the user may specify that destination in form element 212. If the user selects a coupon destination, the user may specify an image, or any other file type, for use in creating the coupon using form element 213. After the destination has been specified, the user may proceed to the next step of the advertisement definition process.

Figure 8:
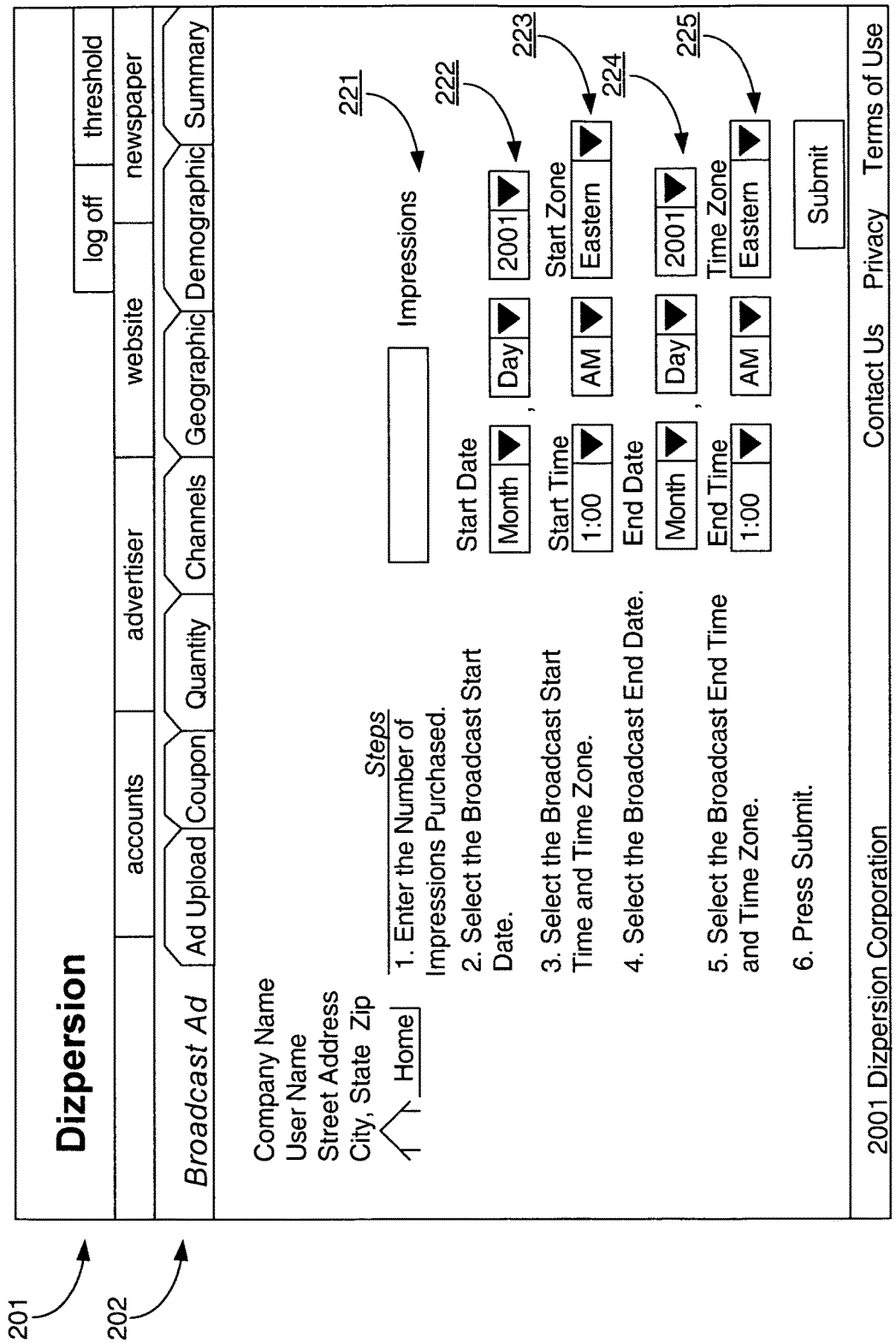
FIG. 8 illustrates one embodiment of an advertisement quantity and duration definition page.

FIG. 8 illustrates one embodiment of a web-interface 220 for defining the quantity and/or duration that an ad should be displayed on ad selection node 140. A standard method for defining the quantity and/or duration of a network advertisement is to specify a number of impressions, or the number of times the advertisement will be delivered. The user may specify the number of impressions in form input 221. In one embodiment of the present invention the user may select a start date, which is the date on which the advertisement will begin its broadcast on ad selection node 140. The start date may be entered using date selection form elements 222. In one embodiment the user may specify a start time, which is the time of day an advertisement will begin its broadcast on ad selection node 140. The start time may be entered using time selection form elements 223. In one embodiment of the present invention the user may select an end date, which is the date on which the advertisement will end its broadcast on ad selection node 140. The end date may be entered using date selection form elements 224. In one embodiment the user may specify an end time, which is the time of day an advertisement will end its broadcast on ad selection node 140. The start time may be entered using time selection form elements 225. In one embodiment, a time zone may be specified with the start time and end time so that those times reflect the selected time zone. In one embodiment the user may select that the start time and end time to be relative to the time zone the ad may be served in. In this embodiment, if the advertisement may be served in multiple time zones, the ad may actually have multiple start and end times. This would, in effect, cascade the start and end times in accordance with the selected time zones. In one embodiment, the user may specify only the number of impressions. In one embodiment the user may specify only a start and end time during which an ad will be broadcast. In one embodiment the user may select both the number of impressions and the start and end times. In this embodiment, should the advertisement be served up to the number of impressions prior to the end time, it may automatically stop being served.

Figure 9:
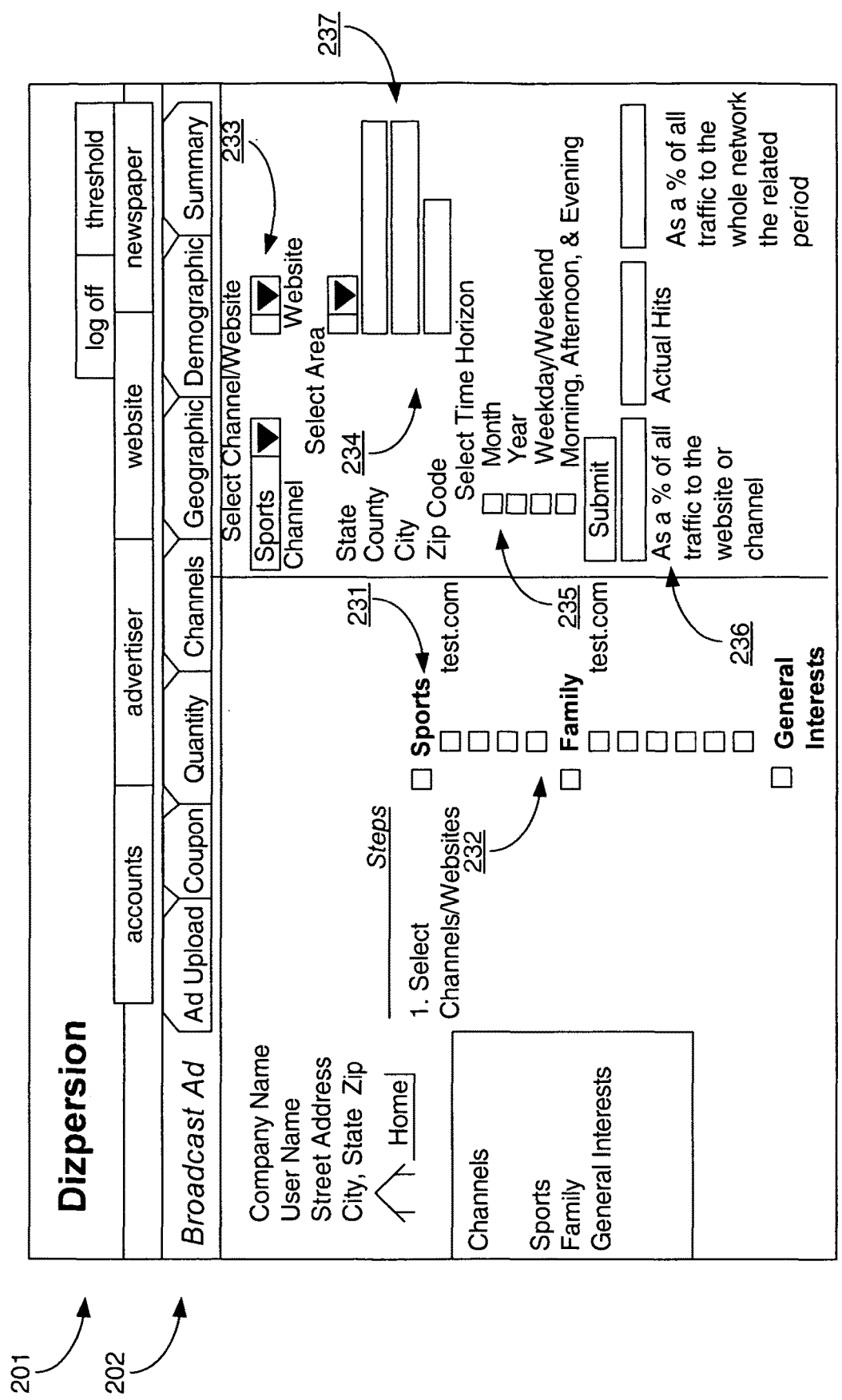
FIG. 9 illustrates one embodiment of an advertisement web site and category definition page.

FIG. 9 illustrates one embodiment of a web-interface 230 for defining the web sites or other network channels over which the advertisement may be displayed. In one embodiment the user may select any combination of sites and network channels available to ad selection node 140. In one embodiment only the sites and network channels that support the type of advertisement specified on web-interface 200 (FIG. 6) will be displayed. In one embodiment, web sites or network channels may be organized into categories based upon subject matter, user demographic, or some other method of categorization. The user may specify that all sites or network channels in a category may display the advertisement by selecting category form element 231. For example, the user may specify that their advertisement be displayed on all sports sites, or all sites relating to women, or all news sites. In one embodiment, selecting category form element 231 may cause individual web site and network channel form elements 232 to be selected. In one embodiment the user may deselect those websites and network channels of form elements 232 on which she does not wish to display the advertisement. When specifying the web sites, network channels, and categories over which an advertisement should display, it may be useful to have some means of estimating the anticipated traffic over those web sites, channels, and categories. In one embodiment, web-based interface 230 may contain or link to a web-based sub-interface 237 for estimating impression traffic levels on web sites, network channels, or categories. In one embodiment, sub-interface 237 may display a traffic level based upon the sites, channels, or categories selected on web-based interface 230. In one embodiment, the user may specify the sites, channels or categories for the traffic report based on those selected in form elements 233. In one embodiment, the traffic report may be more narrowly defined to a specific geographic area. In one embodiment, the geographic area may be that defined for the advertisement's distribution, the details of which will be discussed hereafter. In one embodiment, the geographic area may be defined using form elements 234. In one embodiment, the user may select the time period for which the traffic report should display using form elements 235. In one embodiment, the traffic report may include one or all of the following statistics as shown, for example, in form elements 236: total number of impressions, percent of the total site, channel, or category impressions over the defined time period that are displayed in the defined geographic area, and percent of total impressions served on ad selection node 140 that fit the criteria defined in sub-interface 237.

Figure 10:
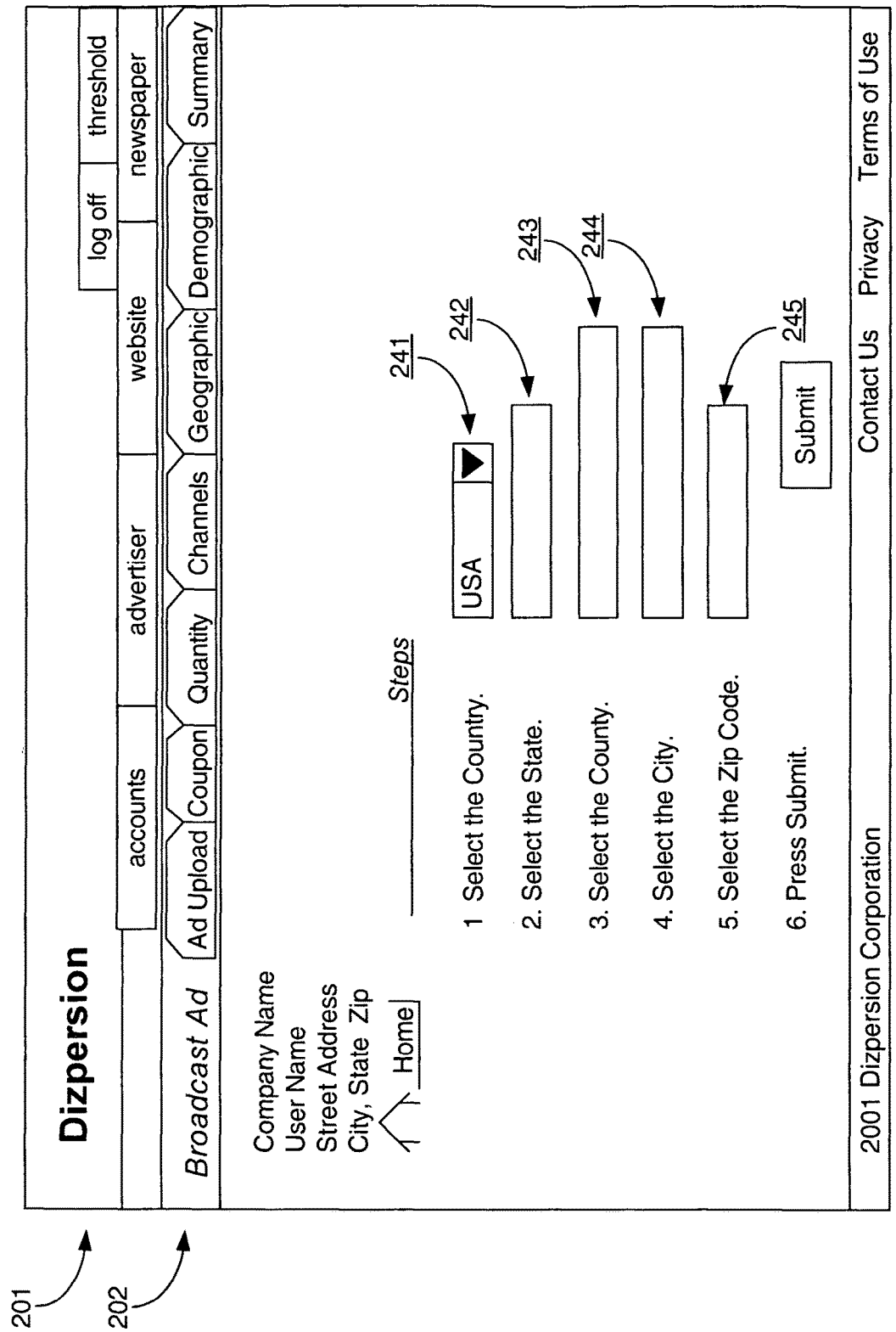
FIG. 10 illustrates a first embodiment of an advertisement geographic location definition page.

FIG. 10 illustrates one embodiment of a web-interface 240 for defining the geographic area over which the advertisement may be displayed. In one embodiment the user may select the country in which they wish to serve the advertisement using form element 241. Depending upon the country selected in form element 242, web-interface 240 may display in form element 242 the appropriate states, provinces, or other geographic regions contained within the country selected in form element 242. Again depending on the region selected in form element 242, web-interface 240 may display the next appropriate level of geographic regions within the area specified in form element 242. These may be displayed in form element 243. In one embodiment, the regions displayed in element 243 may be counties. This process may continue in a like manner to form element 244 which may display the appropriate cities, and to form element 245 that may display the appropriate postal or zip codes. In one embodiment, multiple elements may be selected at each of the form element levels 241-245. In one embodiment, only multiple zip or postal codes may be selected. In one embodiment, the user may stop at any point and the system will use the greatest level of geographic specificity indicated. In one embodiment, the user may specify an area and then choose to add another different area to the area already specified. In one embodiment, the user may save a defined area for use in later advertisement definitions. These defined areas may be made available on web-based interface 240. In one embodiment, web-interface 240 will only display the geographic areas the user may serve the advertisement into. These allowed areas may be based upon the primary or secondary status of the user's organization, or any other rules established on ad selection node 140.

Figure 11:
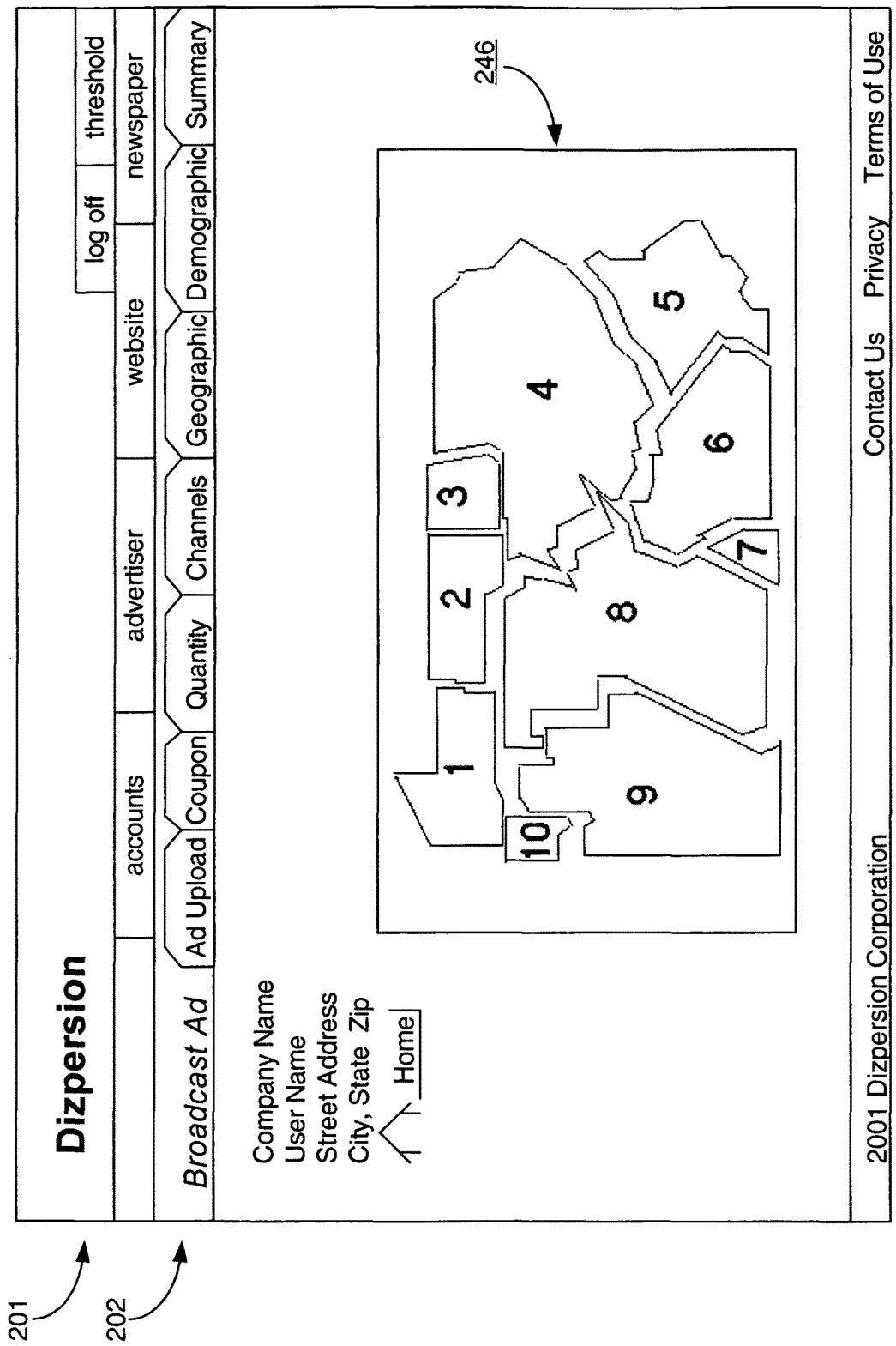
FIG. 11 illustrates a second embodiment of an advertisement geographic location definition page.

FIG. 11 illustrates an alternative embodiment of a web-interface 240' for defining the geographic area over which the advertisement may be displayed. This embodiment is designed to the specific needs of an agent of the advertiser in the form of an advertising agency. Advertising agencies may specify the geographic area over which the ad may be displayed using an interface that breaks a region into Designated Market Areas (DMAs). DMA, a convention of the Nielson Media Research, is defined by television viewing patterns, and is a commonly used geographic definition by advertising agencies. It is common practice in advertising to run a copy test of a particular advertising campaign in a designated geographic area, providing a mix of direct mail, television, radio, and other advertising mediums to gauge consumer response prior to a national or global rollout of the campaign. Often the designated geographic areas for the copy test are defined by DMA. Without the capability to geographically target networked advertising, advertising agencies have been unable to include this medium effectively in their copy testing. By providing a geographically targeted ad server along with an interface breaking geography down into DMAs, advertising agencies not only are able to include networked advertising in their copy testing, but may do so in a manner that more closely and easily maps to their current practices. Accordingly, interface 240 may be provided, supplying a graphical method, which may be in the form of a clickable map 246, of specifying the DMAs over which their advertisements should be displayed. Alternatively, a clickable area may include campuses, airports, or a certain proximity to a business or other type of location.

Figure 12:
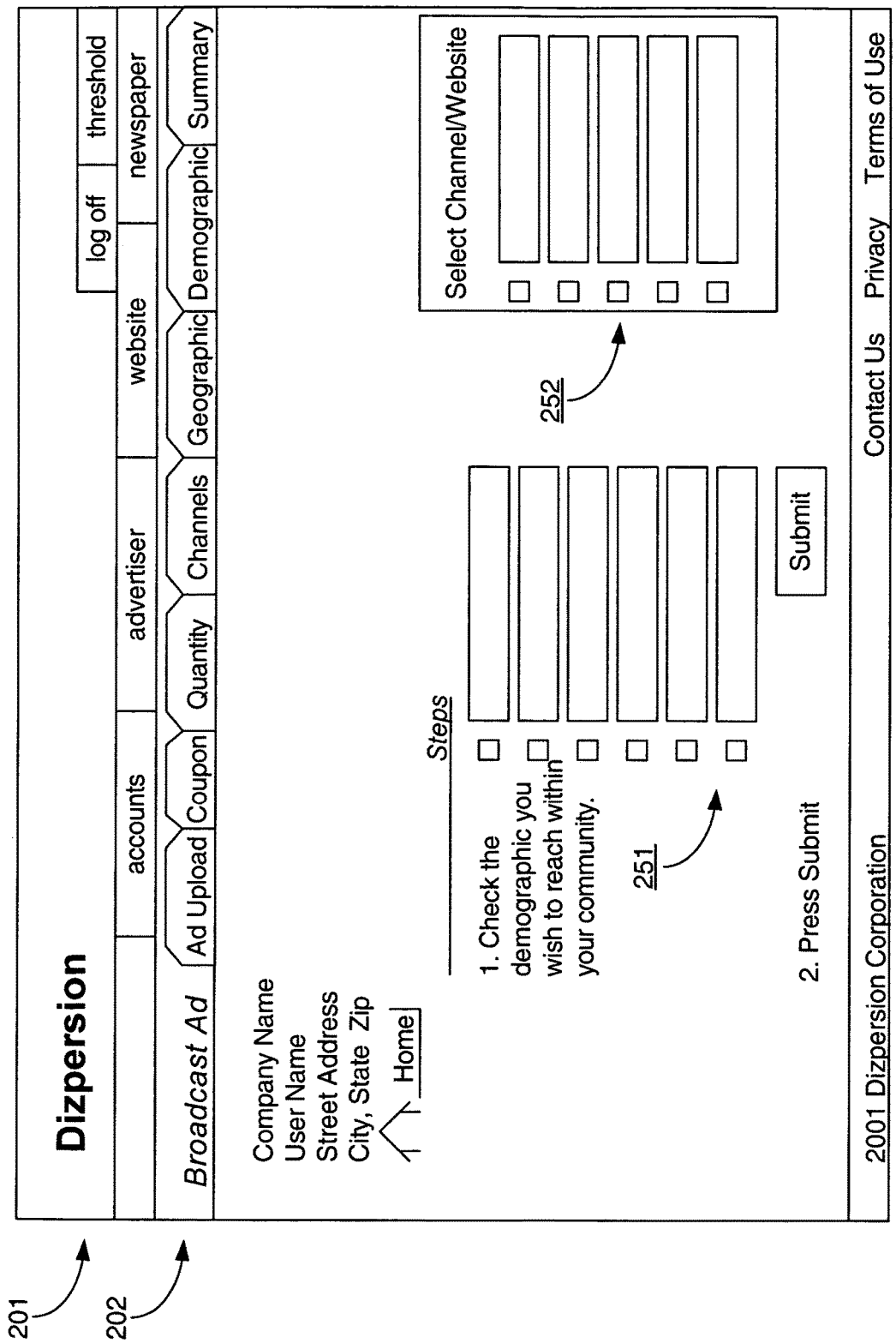
FIG. 12 illustrates one embodiment of an advertisement demographic definition page.

FIG. 12 illustrates one embodiment of a web-interface 250 for defining the end user demographics over which the advertisement may be displayed. The United States Census Bureau (USCB), among other similar international bodies and certain commercial enterprises, collect and distribute demographic information. In one embodiment, ad selection node 140 may hold demographic information, such as the USCB census data, and may make it available to the user. This data may be used during the definition of an advertisement to specify the demographics over which the advertisement may be displayed. In one embodiment the user may specify the demographics they wish to target for the advertisement under inputs 251, and ad selection node 140 may use the USCB census data to select for the user the geographic areas in which the selected demographics are prevalent. In one embodiment, these selected demographics may narrow the geographic area defined on web-based interface 240. In one embodiment, the user may choose not to indicate a geographic area specifically, but may only select the demographics they wish to target. Web-interface 250 may contain or link to a web-based sub-interface 252 that may display the demographics associated with selected web sites, channels, or categories such as those in web-based interface 230.

Many of the advertisers using telecommunication system 250 may not have an active network presence. Advertisers may wish to specify some network location as the destination for their advertisement even in the case that they do not have an active network presence. In one embodiment of the present invention the user defining the advertisement may wish to specify a coupon as the destination of the advertisement as shown in form elements 605,615 on web-based interface 210 of FIG. 7.

Figure 13:
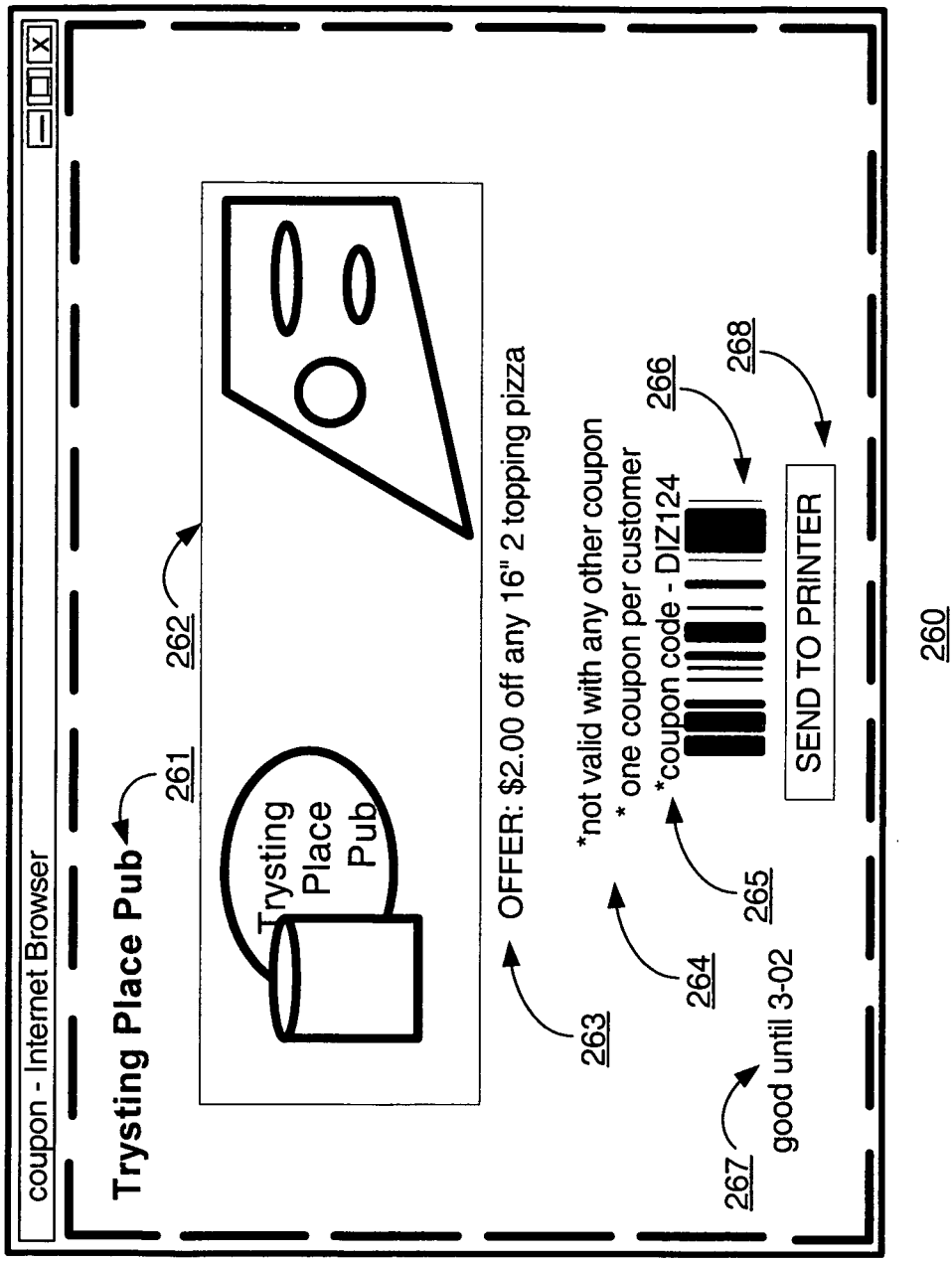
FIG. 13 illustrates one embodiment of an advertisement coupon page.

One embodiment of a coupon 260, is illustrated in FIG. 13. In one embodiment, a coupon may contain any combination of elements including; the advertiser's company name 261; an image or multimedia file 262; a specific offer from the advertiser 263; restrictions 264 such as "not valid with other coupons," or "one coupon per customer"; a coupon code 265 or a bar code 266 that may be used by the advertiser for general campaign tracking or the for tracking the specific use of that coupon; a valid or expiration date 267; a link or print image 268 that may cause the coupon to be printed. In one embodiment, ad selection node 140 may track and record data relating to what advertisements are served, what advertisements are clicked on, and in the case of coupons, what advertisements are printed out. In one embodiment, the tracking data may include a timestamp representing when the advertisement was served, clicked on, printed, etc. The timestamp may be used to determine the most effective times to display advertisements, where effectiveness is measured by response level.

Figure 14:
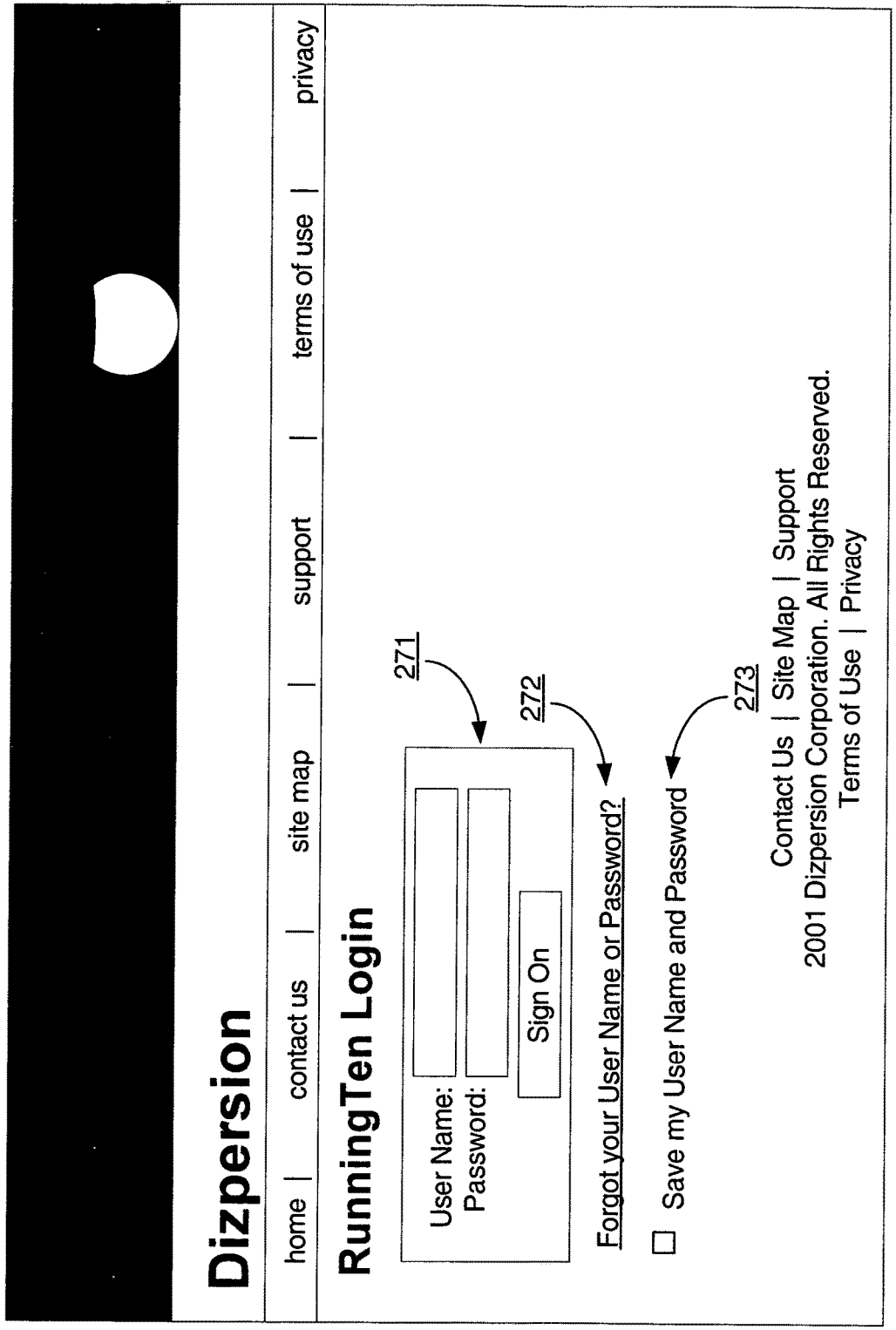
FIG. 14 illustrates one embodiment of a client extranet login page.

Several types of end-users may access ad selection node 140. Administrators or employees of consumer web sites, or any other source of content being served to the end user node of telecommunication system 100, may wish to create, update or view information relating to their participation in the system. Administrators or employees of media companies, publications, or advertisers may wish to create, update or view information relating to their participation in the system. Administrators or employees of ad selection node 140 may wish to create, update or view information relating to their participation in the system. End users may wish to create, update or view information relating to their participation in the system. Many means may be provided allowing full or restricted access to information on ad selection node 140 including software application, direct access to the command line or operating system interface, web-based interface, or any other means of interaction or interfacing. FIGS. 6-12 illustrated web-based interfaces, all of which may be collectively gathered into a secure web-based client extranet. In one embodiment, this may be a collection of HTML pages, accessible only when an appropriate user name and password combination is supplied. FIG. 14 illustrates a web-interface 270 that may act as a log in page to the web-based client extranet. Web-interface 270 may include form elements 271 where the user may submit a user name and password. A user name and password recollection link 272 may be provided to help the user remember her user name and password. In one embodiment, ad selection node 140 may email the user name and password to the user. Web-interface 270 may also allow the user to specify that the system automatically log them in on following occasions by selecting form element 273.

As noted previously, various individuals, companies or other entities may be allowed access to the ad server to define ads for network publication. In addition to the interfaces described for the newspapers and other traditional media companies, an interface may be provided specifically for promotional or image and branding advertising agencies, individual branches of companies such as franchise owners or dealership owners, and any of these interfaces may be provided or accessed through an in-house website, or by portal sites such as Yahoo.com and AOL. Access may be granted and interfaces to the ad server may be provided to all of the above, any combination of the above, or none of the above. Advantages may be gained by specializing the interfaces to any or all of these entities.

One such specialized interface may include a design for use in the political or government arena. A page that may be implemented in a different manner, for use in the political or government arena, is web-interface 250 for defining the geographic area over which the advertisement may be displayed. For example, a congressional candidate may be presented with a web-interface that allows her to select the geographic area for an ad based on congressional district. In one embodiment, the geographic selection and other selections may be more graphically based, so as to ease the user definition process. The geographic selection may be done by selecting regions on a map. The map may be broken down into the appropriate regions based upon the user-state, congressional district, MSA, etc. As another example of a specialized interface, web-interface 250 for defining end user demographics may especially focus on key political demographic information such as political party affiliation.

Other special needs may be associated with ads for political candidates, or other advertisers. For example, the calls to action for user might be to donate money, volunteer, or find out more information regarding the advertisers view or opinion on an issue. Interfaces and processes may be in place as part of ad selection node 140 that allow an advertiser to set up predefined or custom pages that achieve such ends as contact information collection for volunteers, credit card processing for donations, or audio or video feeds. Continuing with the political candidate example, templates for a web page, portion of a web page, or whole site may be supplied to the advertiser along with the ability to input, edit, and delete information regarding themselves, their parties, or their candidacy.

The interface and process of selecting site, geographic and demographic targeting information may be done separately, or in some degree of conjunction. In one embodiment, the user may simply provide a demographic selection through demographic interface. Using census data and/or demographics associated with websites, the geographic area in which to serve ads may be determined. For example, a user might not be presented with the opportunity to specifically select the content sites they wish to have their ad appear on, but ad selection node 140 may select these sites based on the demographics of the desired audience, or based on the geographic selection and what sites most consistently have heavy traffic from that geographic area. In another embodiment, geographic information might not be specifically defined, but ad selection node 140 may select the geography based on the selected demographics and demographic data associated with various geographic regions. The more information ad selection node 140 holds, gathers, receives, or gleans regarding the relationships between sites, geography, and demographics, the more powerful the interface may become. Demographic information regarding a site's visitors may be determined, through survey, poll, subscription information or other means. Demographic information regarding a geographic location may be determined through use and analysis of census information, poll data, or other sources. As ad selection node 140 collects impression logs it may also develop further information stores relating to the relationship between individual site traffic and the geographic origination of the ad requests. This geographic information relating to site traffic may be analyzed in conjunction with the previously mentioned census information, etc. Each of these relationships may be used to expand, refine, or define the audience for a particular advertisement.

For example, a political candidate may be more familiar with the demographics of the audience she wishes to reach, and the geographic area of her constituency, rather than the sites on which she wishes to have her message displayed. For the purpose of this example we will say the message relates to "a woman's right to choose" and is geared toward a female audience. In this embodiment, the candidate may specify the geographic area of her constituency, and specify that the ad should be targeted towards women. Ad selection node 140 may then specify that this ad should be served on sites such as iParenting.com, as iParenting.com has collected demographic information relating to their audience that suggests that 98% of their audience is female. A more complicated decision regarding the audience for this message might be including in the audience a geographic location outside of the area of constituency based on information such as the fact that an all-women's college exists in that geographic location, and based on the assumption that it is close enough to the specified geographic location that it may be considered likely that some of the women there actually live in the area of the constituency or may have some influence over someone who does live in the constituency. When making recommendations or decisions such as these wherein the advertiser has not specified some aspect of the ad serving parameters, the recommendations or decisions may take place without the advertiser's knowledge or control, or may be presented as suggestions, or may be available for editing to the advertiser.

By way of another example, consider a branch of the Hispanic Dental Association (HDA) wishing to advertise the availability of Hispanic dentists in their region. An interface may be provided on which the branch of the HDA specifies only their geographic region and that they wish to target Hispanics. Ad selection node 140 may narrow the geographic region covered based upon a set or advertiser defined population concentration of Hispanics. In other words, the ad might only be served into zip codes with a population consisting of at least 10% Hispanics. The sites on which the ad will be broadcast may be selected in a manner similar to that described above, specified by the advertiser, or in any other manner.

Interfaces may also be defined that allow the advertiser or agent of the advertiser to specify predefined areas of particular note. For example, they may be allowed to select geographic regions surrounding points of note such as college campuses or airline hubs. Using such information a political candidate, for example, might specify that they wish to have a request for volunteers message sent out around the college campuses in their area. Other areas may be defined for specific advertisers such as for the areas surrounding each of their stores, outlets, or franchise locations. For example, an interface might be created for Subway® giving them the option to advertise surrounding individual restaurant locations or groups of locations.

Various arrangements may also be implemented between the company holding ad selection node 140 and potential advertisers. Examples of potential advertisers may include: publications, media companies, web sites, advertising agencies, government bodies, corporations, franchisees of companies, divisions of companies, individual locations of a larger company, single location companies, organizations, charities, clubs, local retailers or service providers, or even individuals not in any direct affiliation with a commercial or political venture. In one embodiment, the company holding ad selection node 140 may maintain all interfaces for these potential advertisers. In another embodiment, some or all of the interface may be held and or maintained by other internet sites, such as portals like yahoo.com, or they may be managed by advertising agencies, or managed by franchised companies for their franchisees, or by companies for their use or use by their subsidiaries, individual divisions, branches or locations. Accounts on any of these interfaces may be automatically created at the request of the potential advertiser, or may be configured by an administrator of ad selection node 140 or an administrator of any service supporting interfaces with ad selection node 140, or may be created by advertising agencies for their clients.

The process and interfaces described above for defining advertisements may allow for the party defining the ad to identify very specific terms under which the ad may be served, and also may specify with a level of acuity other aspects of the desired audience. In one embodiment, a local owner of a franchise, for example McDonald's®, may have access to a site for creating ads held directly on ad selection node 140 and configured by its administration, or in another embodiment, the site may be available via a site run by an advertising agency or a section of ad selection node 140 configured by an advertising agency. The advertising agency may have no affiliation with said franchise, may be their advertiser of record, or may be employed specifically for their capacity to set up such interfaces to ad selection node 140 for franchisees. The local owner of a McDonald's may wish to advertise a new sandwich we will term the McCrispy. Using an interface to ad selection node 140 the local franchise owner may select to only advertise in the immediate geographic area. This may be based upon zip codes, city names, may be a predefined area for that particular local franchise location, or any other means of specifying that area. In order to reach consumers when they are most interested in the McCrispy, it may be specified that the ad run, for example, only between 10:00 am and 2:00 pm, to attract a lunch crowd. The time of advertisement may be based on a situation such as this where it caters to consumer needs, directly opposed to consumer needs in order to speed up slow times, by the local franchise owner based upon internal factors such as availability of employees to handle any additional customer traffic, or any other reason. In one embodiment the local franchise owner may also create a coupon destination for the McCrispy ad that may be printed out and brought to that franchise only, or it may be a coupon usable at all participating McDonald's locations. To further encourage a time specific response the coupon might have a time limitation on it. For example, good between 10:00 am and 2:00 pm on the following dates, February 4-February 11.

In another embodiment, a company such as a commercial airline may have access to an interface for ad selection node 140. Some means for advertising "last-minute" availability of seats may be found in the art, such as on the airline's web site, or via promotional emails. These both require consumers to have interacted with the airline previously. One means for overcoming this disadvantage would be for the airline to be able to advertise last-minute availability of seats using standard internet advertisements on a variety of sites. Previously this would have been a shotgun approach, the message reaching only a very few of the consumers who might take advantage of such availability. Using an interface to ad selection node 140 the airline may specify that an advertisement only be broadcast in the origination and destination cities for the available flight. In addition to this, the airline may wish to specify websites or categories of websites on which their advertisement may be broadcast. This selection may be based on historical demographics of the site's or category of site's users, or whatever other basis chosen by the company creating the ad. As noted, commercial airlines may have last-minute fares they wish to advertise, or business class specials, or frequent flier miles specials. Continuing the example, the airline might wish to advertise the last-minute fares or business class specials not only to the origination and destination cities, but may also wish to advertise only to a business crowd demographic. Using an interface on ad selection node 140 the airline may view historical demographics of various sites and categories and may, for example, select to advertise on news sites and stock information sites based upon the information available on said interface indicating that these sites are primarily viewed by working people ages 25-40. In another embodiment the airline may wish to create a coupon destination for their advertisement. This coupon may be, for example, a voucher for a free beverage, a class upgrade, may have a specially generated code required to redeem the offer on the airline's site, or whatever the airline chooses to create.

In another embodiment, companies with disperse locations may wish to advertise on the Internet. This may be companies such as health clubs (e.g. Bally Fitness), or vehicle manufacturers (e.g. Ford, GM). A company such as Ford holds sales both at the manufacturer level and at the dealership level. Using an interface to ad selection node 140, Ford may specify the distribution areas covered by each of their dealerships as well as then aggregate the area over which all their dealerships are easily accessible. These area definitions may be preloaded by an administrator of ad selection node 140, by an advertising agency working on behalf of Ford, or by any other entity. Using these defined areas, Ford may then advertise sales at specific dealerships, or allow their dealerships to access ad selection node 140 and advertise the sales themselves. Advertisements with a dynamic portion may be created so that, based upon the determined location of the person viewing the advertisement, an area in the advertisement is generated which indicates the closest dealership. A coupon destination may also be employed for such purposes.

Any variety of interfaces may be designed, making most easily available to the particular business user the features of ad selection node 140 most valuable to them. These features may include or exclude any of the ad definition pages described previously. When used in concert, the various capabilities may allow for extremely targeted advertising in the online arena. For example, a day care center in Evanston, IL may wish to advertise their services. Using an interface for local advertisers this company might select to advertise only in zip code 60201, and then might also select to only advertise on iParenting.com, a site that has historically been trafficked 98% of the time by women. Selecting only these two factors the day care center has essentially narrowed the advertisements audience to women in Evanston.

FIG. 15 illustrates one embodiment of a site and category selection interface 280 for helping advertisers determine which site or category of sites they may wish to advertise on. The available sites may be broken down into categories such as family 281, in which an individual site 282 or sites may be listed, such as iParenting.com. If one clicks on one of the available sites 282, the historical demographics 283 for that site may be displayed, such as the gender distribution, median age, education level, occupation, or others. Again, these demographics may be used in conjunction with time specificity and geographic location to finely identify and target a desired audience.

In one embodiment, access to an advertisement definition section, as illustrated in FIGS. 6-11, may only be given to advertisers, publications or media companies registered with ad selection node 140. In one embodiment, advertisers may be given access to the advertisement definition section. In one embodiment, if an advertiser is given access to the advertisement definition section, an administrator of ad selection node 140 may approve or reject an advertisement before it is activated on ad selection node 140. It may be useful, in the event that advertisers are given access to the advertisement definition section, to provide a simplified or more graphical interface for this section. In one embodiment, the interface may include a map displaying the regions in which an advertisement may be served. A user may be allowed to select different ways in which the map may be broken down. In one embodiment, the user may select to view the map from different focus levels, zooming in to state or city levels or zooming out to a global view. In one embodiment, the user may select to have the map broken down into regions representing demographics that may allow them to, for example, select the regions in which there is a concentration of senior citizens, or the regions in which there is a strong Hispanic population. Other aspects of advertisement definition, such as the selection of time zone, may be simplified using graphical representations. In one embodiment these interfaces may be made available to the advertisers, publication and media companies as well.

Extranet Interfaces for Administrators

FIGS. 16-23 illustrate an administrative extranet may be provided for the administrator of ad selection node 140.

Figure 16:
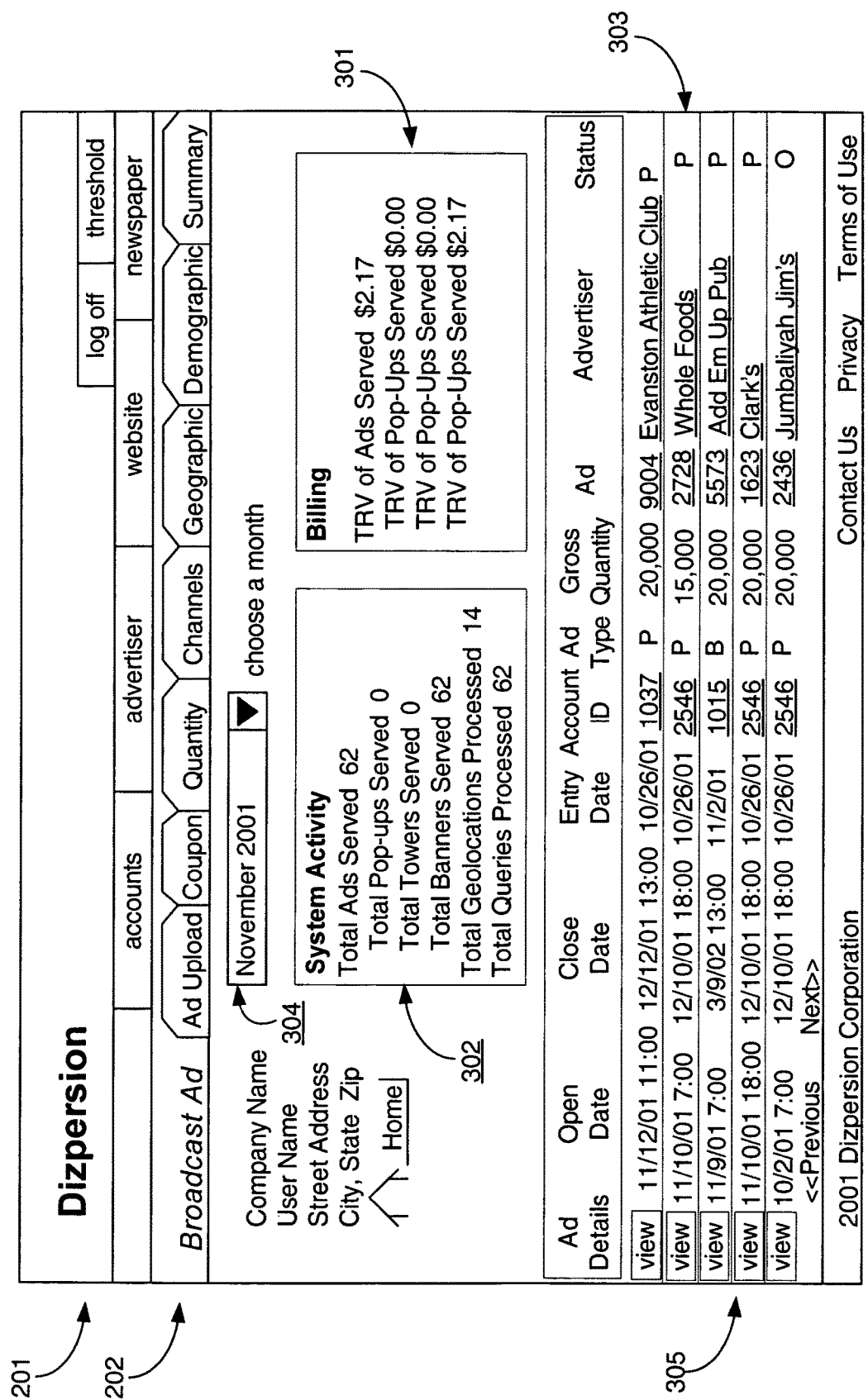
FIG. 16 illustrates one embodiment of an administrative extranet home page.

FIG. 16 illustrates one embodiment of an administrative extranet home page 300. In one embodiment the administrator may view the following: system activity 302 such as total ads served, ads served by category, geolocations processed, or similar such information; billing information 301 such as the total retail value (TRV) of all ads served, the TRV of ads served by category, or similar such information; advertisement records 303 that may include information such as open date and time, close date and time, entry date and time, advertisement type, impressions purchased, advertiser company name, advertisement status, or any similar such information. In one embodiment, the advertisement records 303 may contain an advertisement details link 305 to view further information about the advertisement, including ad impression details. In one embodiment, the extranet home page 300 may only display system activity that relates to the current month or to a month selected in form element 304.

Figure 17:
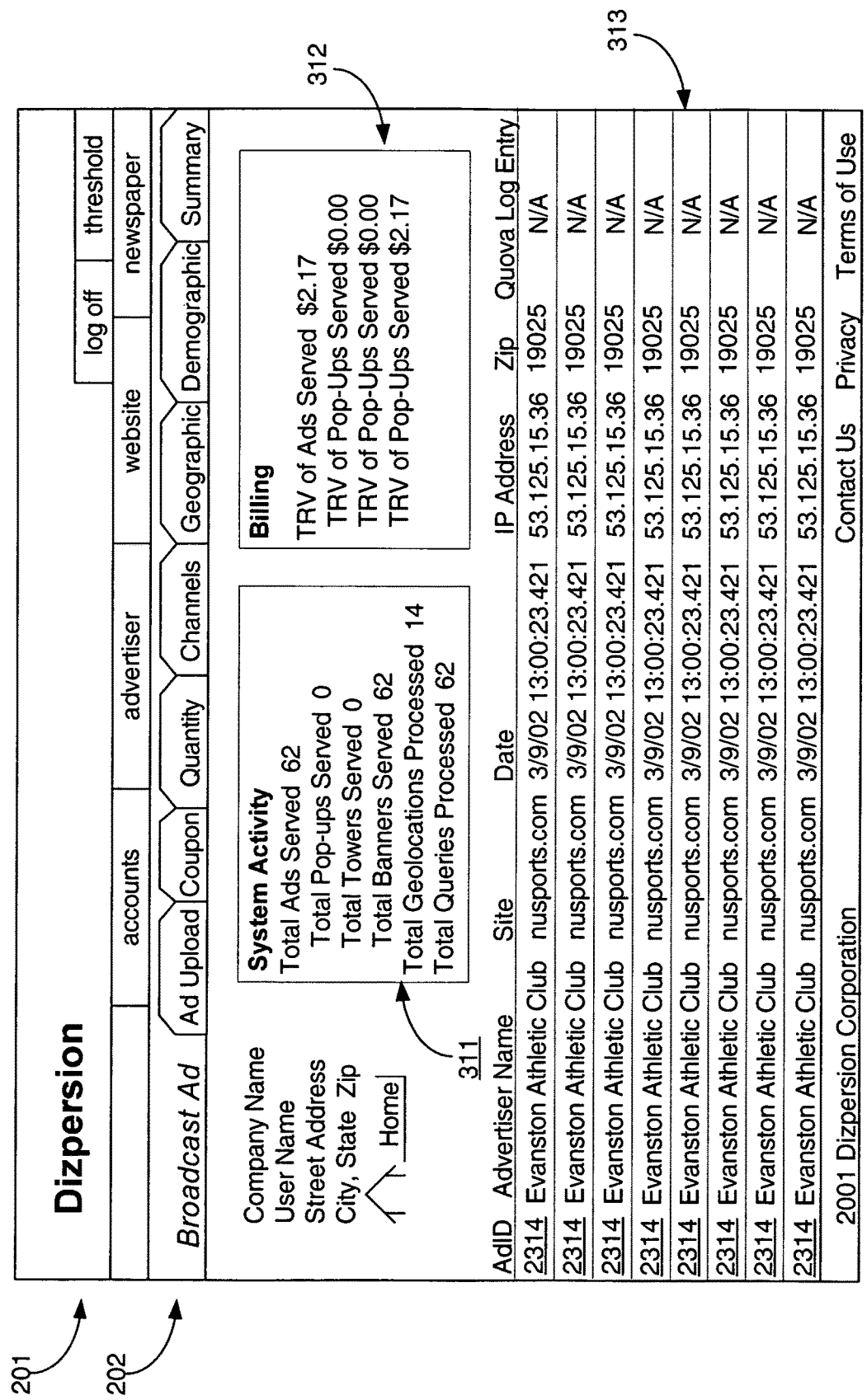
FIG. 17 illustrates one embodiment of an advertisement details page.

FIG. 17 illustrates one embodiment of an advertisement details page 310 as may be reached through the advertisement details link 305. In one embodiment, advertisement activity information 311 similar to that of system activity 301 may be displayed, but relating only to the selected advertisement. In one embodiment, advertisement billing information 312 similar to that of billing information 302 may be displayed, but relating only to the selected advertisement. In one embodiment, ad impression records 313 may be listed including information relating to individual impressions served such as: advertiser name, the site on which the advertisement was served, the date and time the advertisement was served, the IP address to which the ad was served, location information such as zip code relating to where the ad was served, and a link to further details (if available) relating to the processed geolocation information. In one embodiment, a page similar to advertisement details page 310 may be available with geolocation information including any or all details returned from a request to geographic location server 151a.

Figure 18:
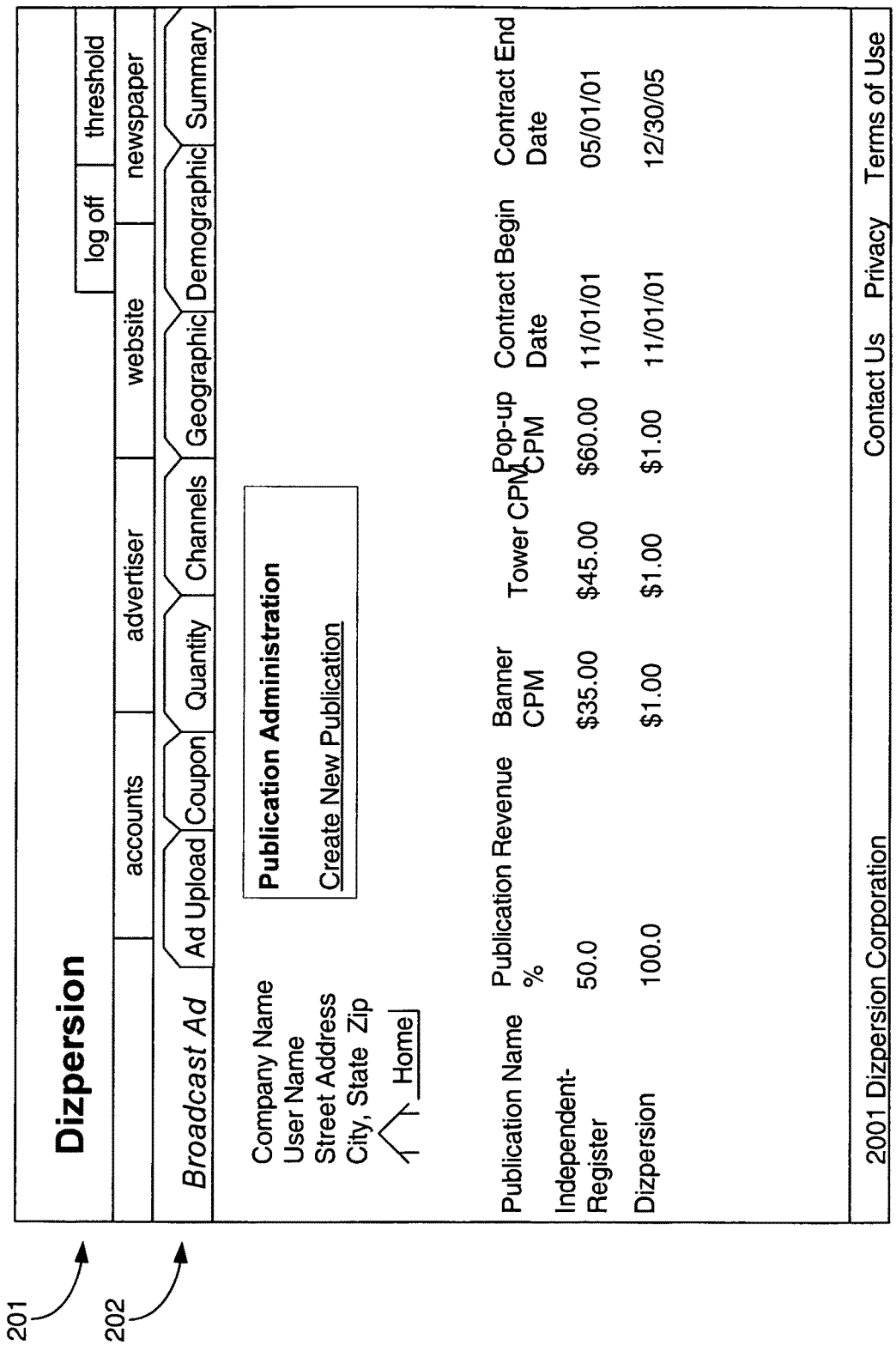
FIG. 18 illustrates one embodiment of a publication details page.

FIG. 18 illustrates one embodiment of a publication details page 320. Publication details page 320 may provide the administrator with information relating to the advertisers, publications or media companies having access to ad selection node 140. This information may include contract information such as the determined revenue split, cost per thousand impressions (CPM), and beginning and end dates. Publication details page 320 may contain or link to a page for viewing further information, editing information, or inserting new information relating to publications.

Figure 19:
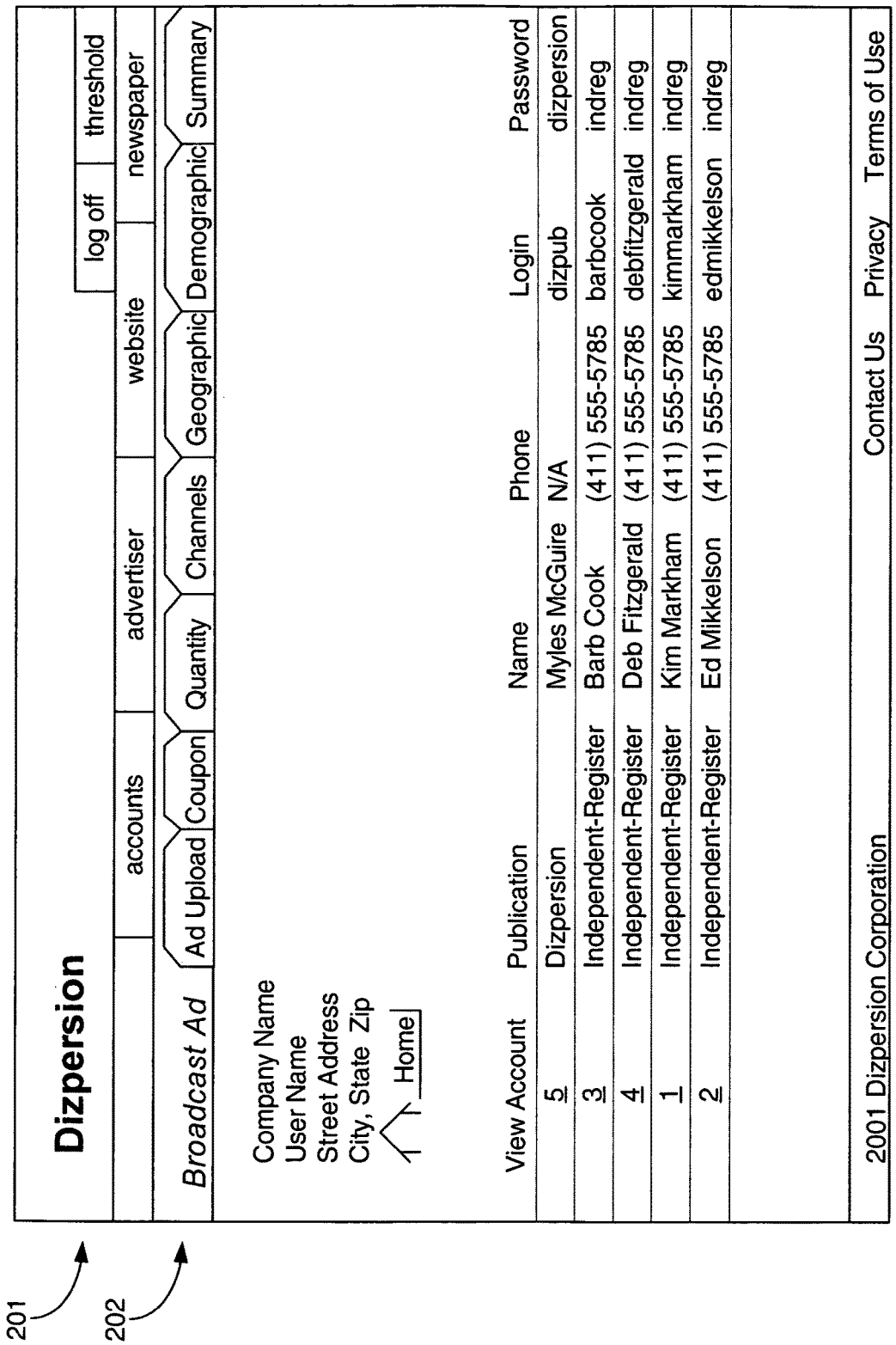
FIG. 19 illustrates one embodiment of an account details page.

FIG. 19 illustrates one embodiment of an account details page 330. Account details page 330 may provide the administrator with information relating to the advertiser users, publication users, media company users, website administrative users, or any other users who have login name and password access to view, update or edit information on ad selection node 140. The information displayed may include the affiliated company name, the user's name, user contact information, login name, password, and other information relating to the account. Account details page 330 may contain or link to a page for viewing further information, editing information, or inserting new information relating to user accounts.

Figure 20:
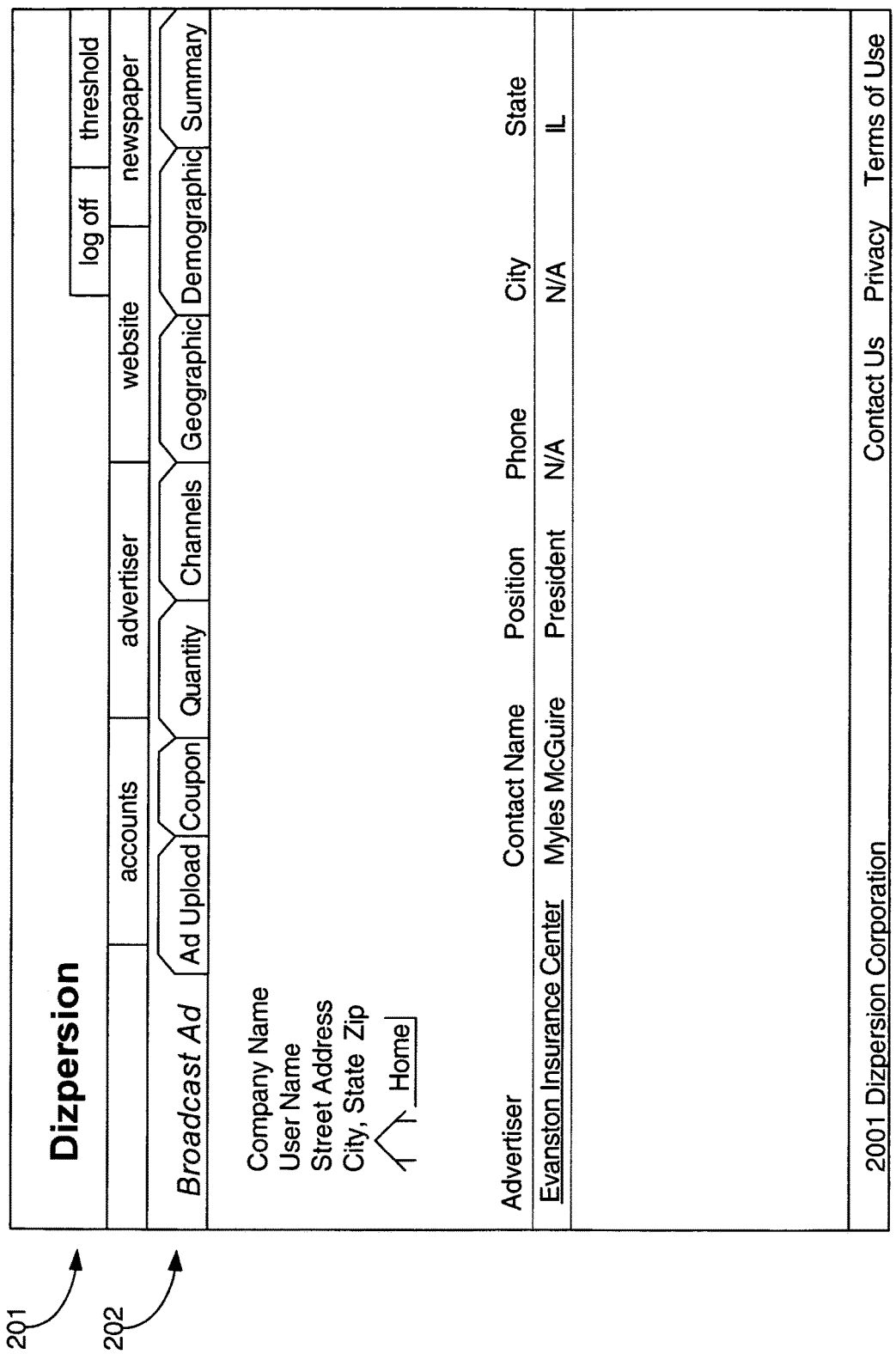
FIG. 20 illustrates one embodiment of an advertiser details page.

FIG. 20 illustrates one embodiment of an advertiser details page 340. Advertiser details page 340 may provide the administrator with information relating to the advertisers registered on ad selection node 140. Information displayed may include advertiser company name, contact information, advertising history, or other such advertiser details. Advertiser details page 340 may contain or link to a page for viewing further information, editing information, or inserting new information relating to registered advertisers.

Figure 21:
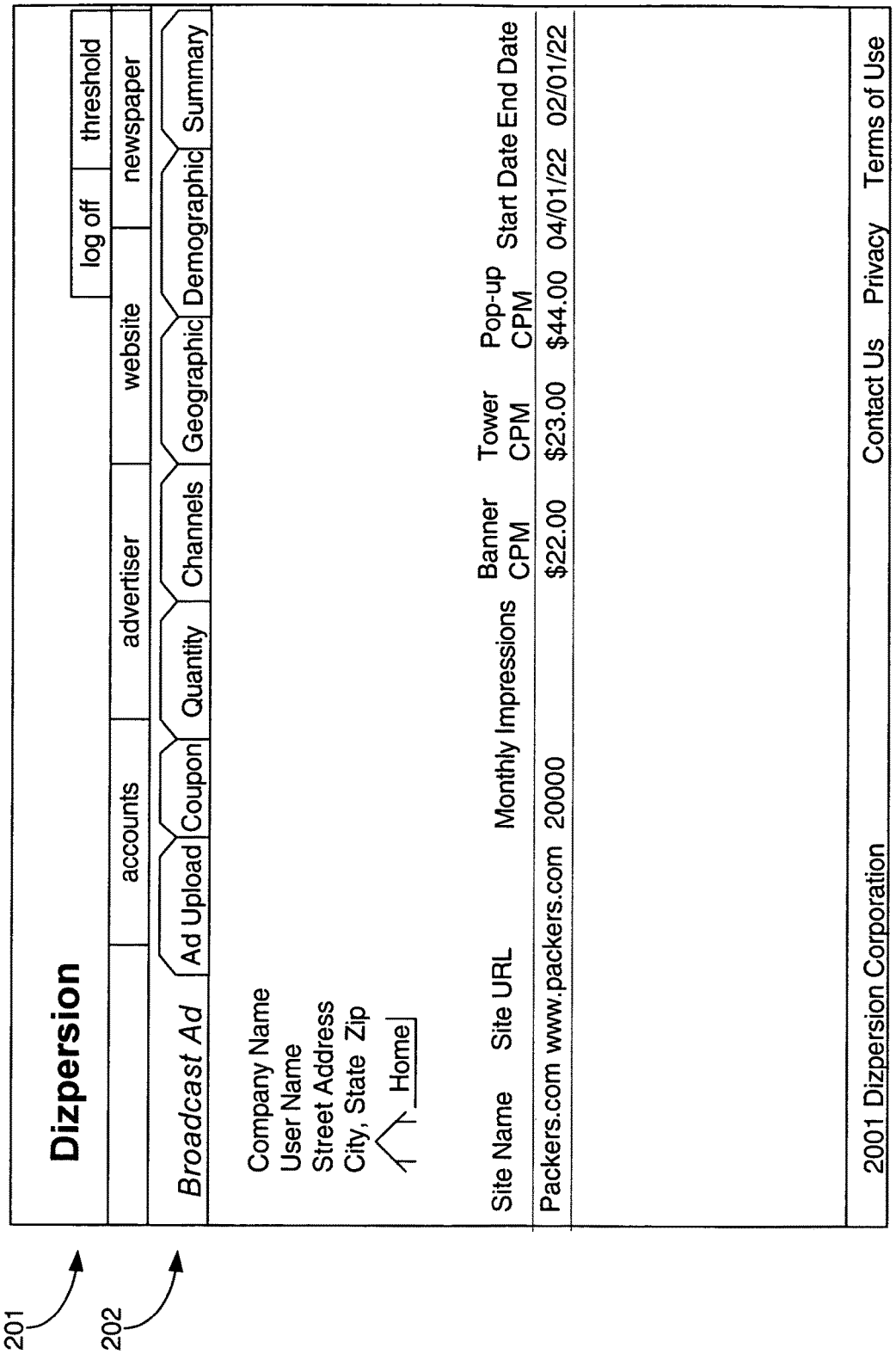
FIG. 21 illustrates one embodiment of a web site details page.

FIG. 21 illustrates one embodiment of a web site details page 350. Web site details page 350 may provide the administrator with information relating to the web sites registered on ad selection node 140. Information displayed may include company name, web site URL, monthly impressions contracted, contracted CPMs for different ad types, and other company, impression record, or contract details. Web site details page 350 may contain or link to a page for viewing further information, editing information, or inserting information relating to registered web sites.

Figure 22:
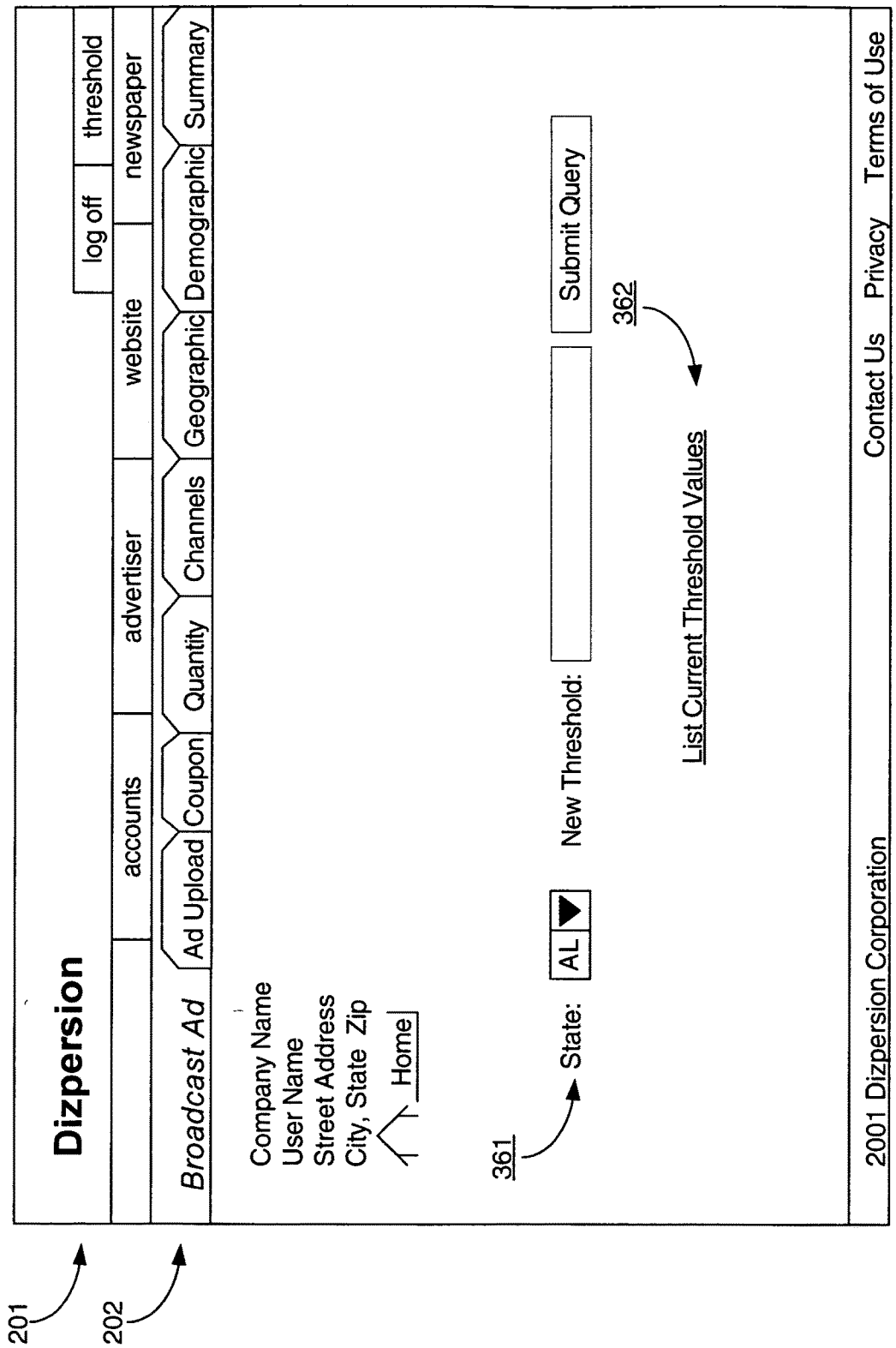
FIG. 22 illustrates one embodiment of an administrative utility page.

FIG. 22 illustrates one embodiment of an administrative utility page 360. Ad selection node 140 may contain many settings relating to its function, such as rules for its interaction with geolocation server 140. Geolocation server 140 may return confidence levels associated with the geolocations it provides, these confidence levels indicating the level of confidence geolocation server 140 has that it is providing accurate geolocation information. Different levels of confidence may be deemed acceptable, and a means of setting and editing past settings of required threshold levels of confidence may be required. Administrative utility page 360 may contain form elements 361 that may allow an administrator to set and edit the threshold levels of confidence. Link 362 may provide a page for viewing all current setting for threshold levels. Similar administrative utility pages may be employed for any of the various settings involved in the operation of ad selection node 140.

Much of the information contained in FIGS. 14-22 may be useful not only to the administrator of ad selection node 140, but also to other users. Similar pages and interfaces may be used in the design of extranets for publications, media companies, advertisers, or any other user of the system.

Figure 23:
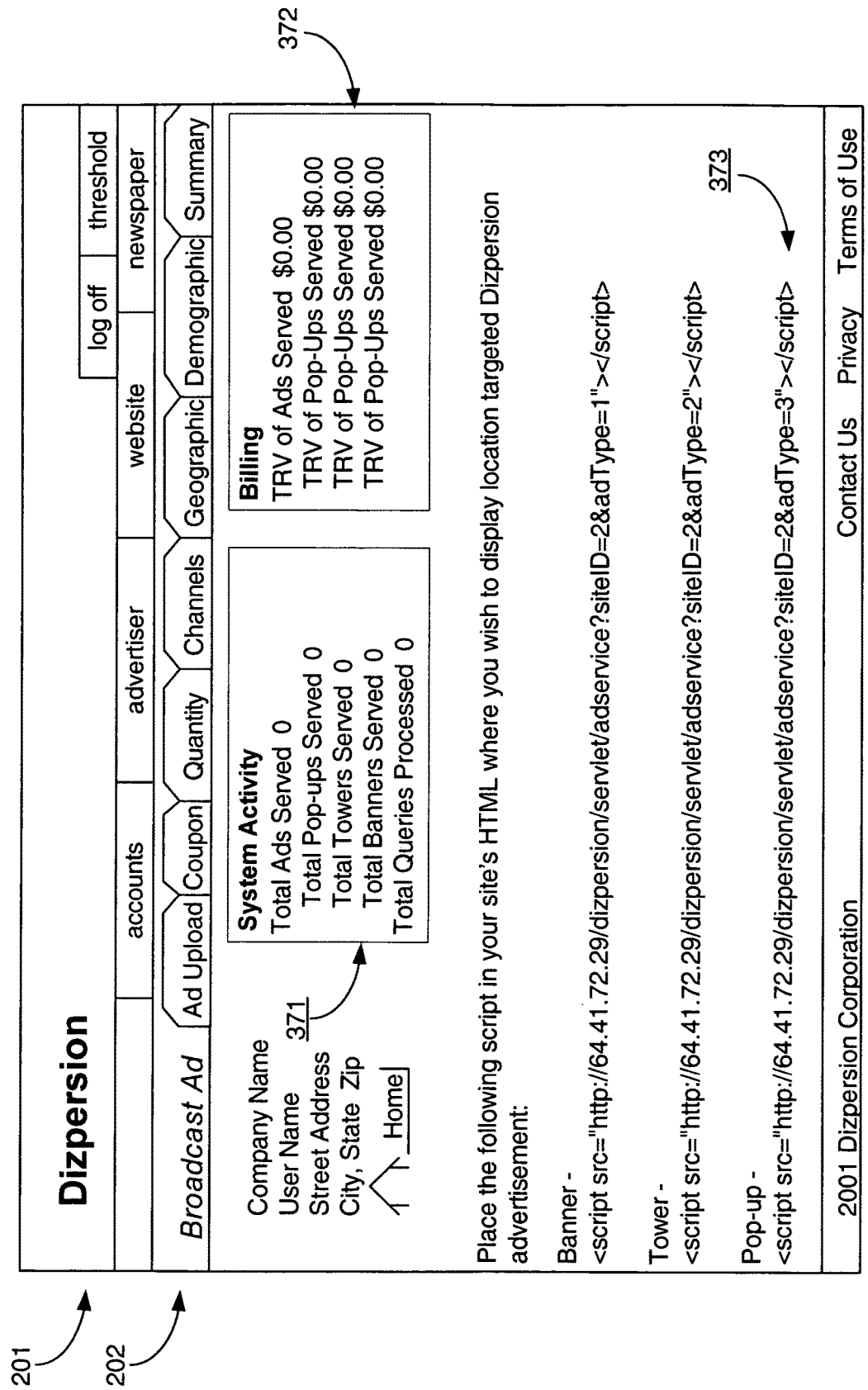
FIG. 23 illustrates one embodiment of a web site administrator's page.

FIG. 23 illustrates one embodiment of a web site administrator page 370. Web site administrator page may be designed specifically for use in an extranet provided for the consumer web sites in content provider node 130 of telecommunication system 100. Web site administrator page 370 may include system activity 371, such as total ads served or ads served broken down by ad type, or billing information 372, such as the TRV of ads served or TRV broken down by ad type. Web site administrator page 370 may also include instructions and/or insertable code 373 to demonstrate to the web site administrator how to utilize ad selection node 140 on their consumer web site.

Base Advertisement Delivery Method

Figure 24:
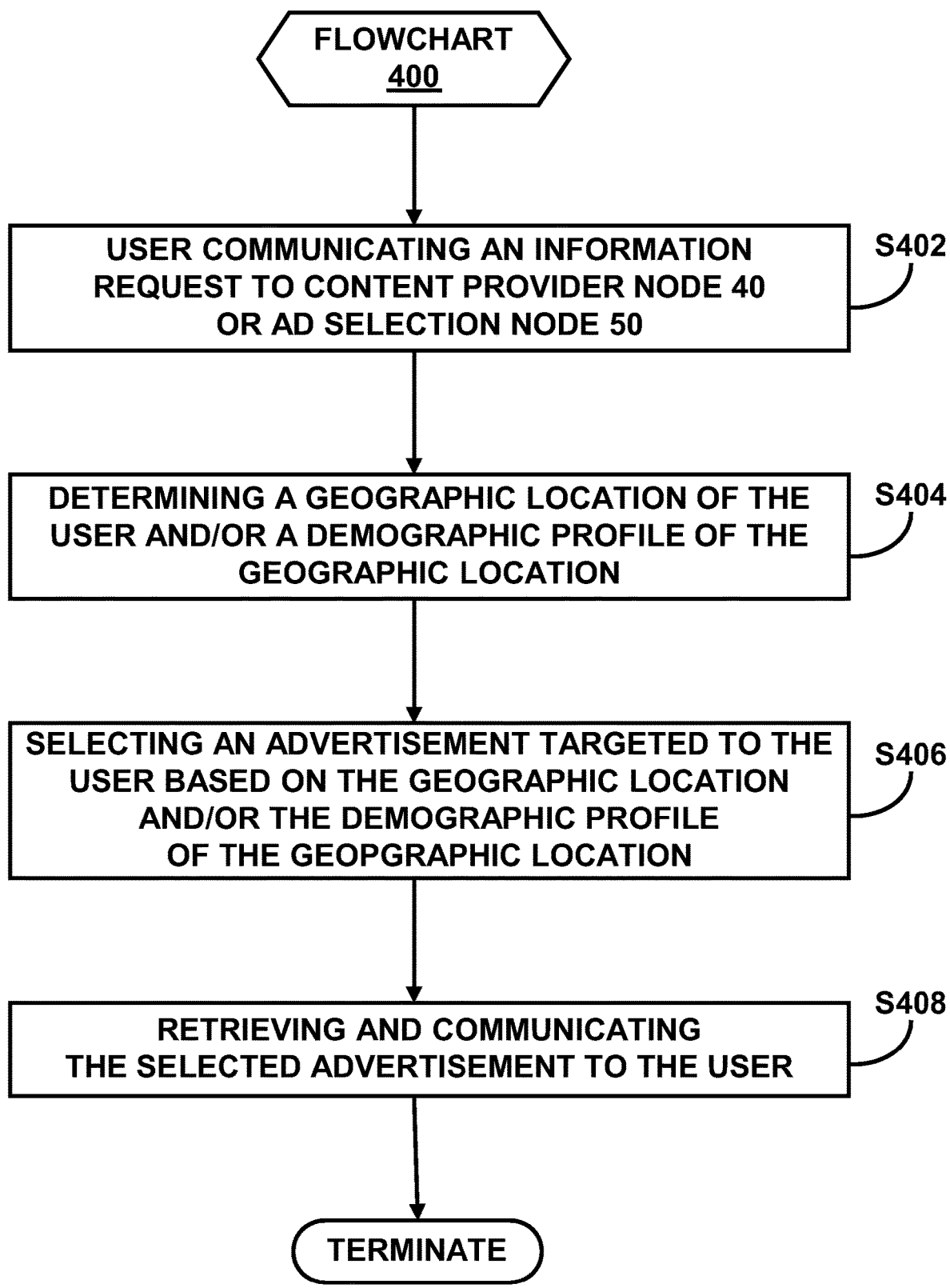
FIG. 24 illustrates a flowchart representative of a base advertisement delivery method of the present invention as implemented by the FIG. 1 telecommunication system.

FIG. 24 illustrates a flowchart 400 representative of a base advertisement delivery method of the telecommunication system 100 in accordance with the present invention. During a stage S402 of the flowchart 400, the user (FIG. 1) utilizes one of the devices, apparatuses or systems of user node 120 (FIG. 1) to communicate an information request to content provider node 130 (FIG. 1) and/or to ad selection node 140 (FIG. 1). As previously stated, the information request can be in a variety of forms.

Figure 4:
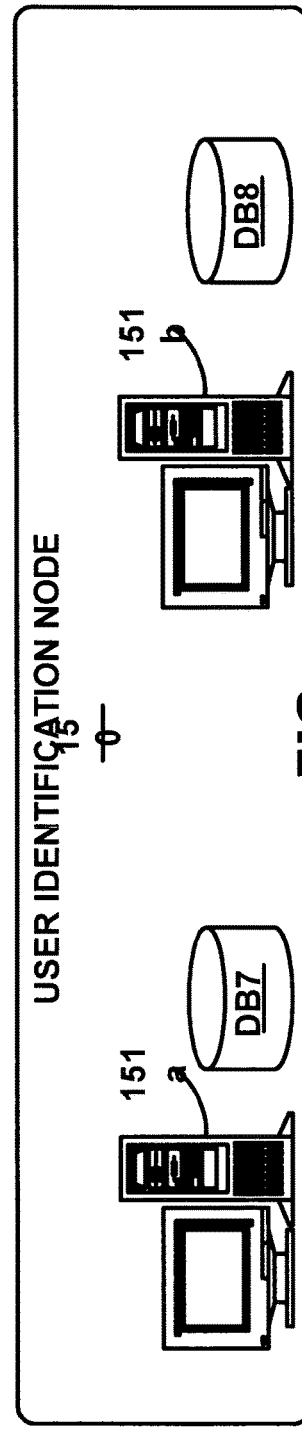
FIG. 4 illustrates a schematic diagram of one embodiment of a user identification node of the FIG. 1 telecommunication system.

Upon completion of stage S402, telecommunication system 100 proceeds to a stage S404 of the flowchart 400 where ad selection node 140 manages a determination of a geographic location of the user and/or a demographic profile of the geographic location. Data serving as a basis for such a determination can be stored within ad selection node 140 (e.g., databases DB5 and DB6) and/or in user identification node 150 (e.g., databases DB7 and DB8). In one embodiment, targeted ad server 141a (FIG. 3) communicates with database server 141b (FIG. 3), geographic location server 151a (FIG. 4) and/or demographic profile server 151b (FIG. 4) to obtain the required data.

Upon completion of stage S404, telecommunication system 100 proceeds to a stage S406 of the flowchart 400 where ad selection node 140 manages a selection of one or more advertisements targeted to the user based on the determination of the geographic location of the user and/or the demographic profile of the geographic location. Ad selection node 140 may use any number of algorithms to select what advertisement is to be communicated to user node 120.

Upon completion of stage S406, telecommunication system 100 proceeds to a stage S408 of the flowchart 400 where ad selection node 140 manages a retrieval and a communication of the targeted advertisement to the user via user node 120. The advertisement retrieval can be performed by content provider node 130 and/or the ad selection node 140. Ad selection node 140 may employ any means communicating the ad to user node 120.

One embodiment includes communicating the ad information to a java server page (JSP), an active server page (ASP), or any other such dynamically generated web page, resource, or service.

Telecommunication system 100 terminates flowchart 400 upon a completion of the stage S408. While the description of stages S402-S408 herein is based on a sequential execution of stages S402-S408, an execution of stages S402-S408 can be performed in an order including concurrent execution of two or more stages.

Embodiments of Flowchart 400

Figure 25:
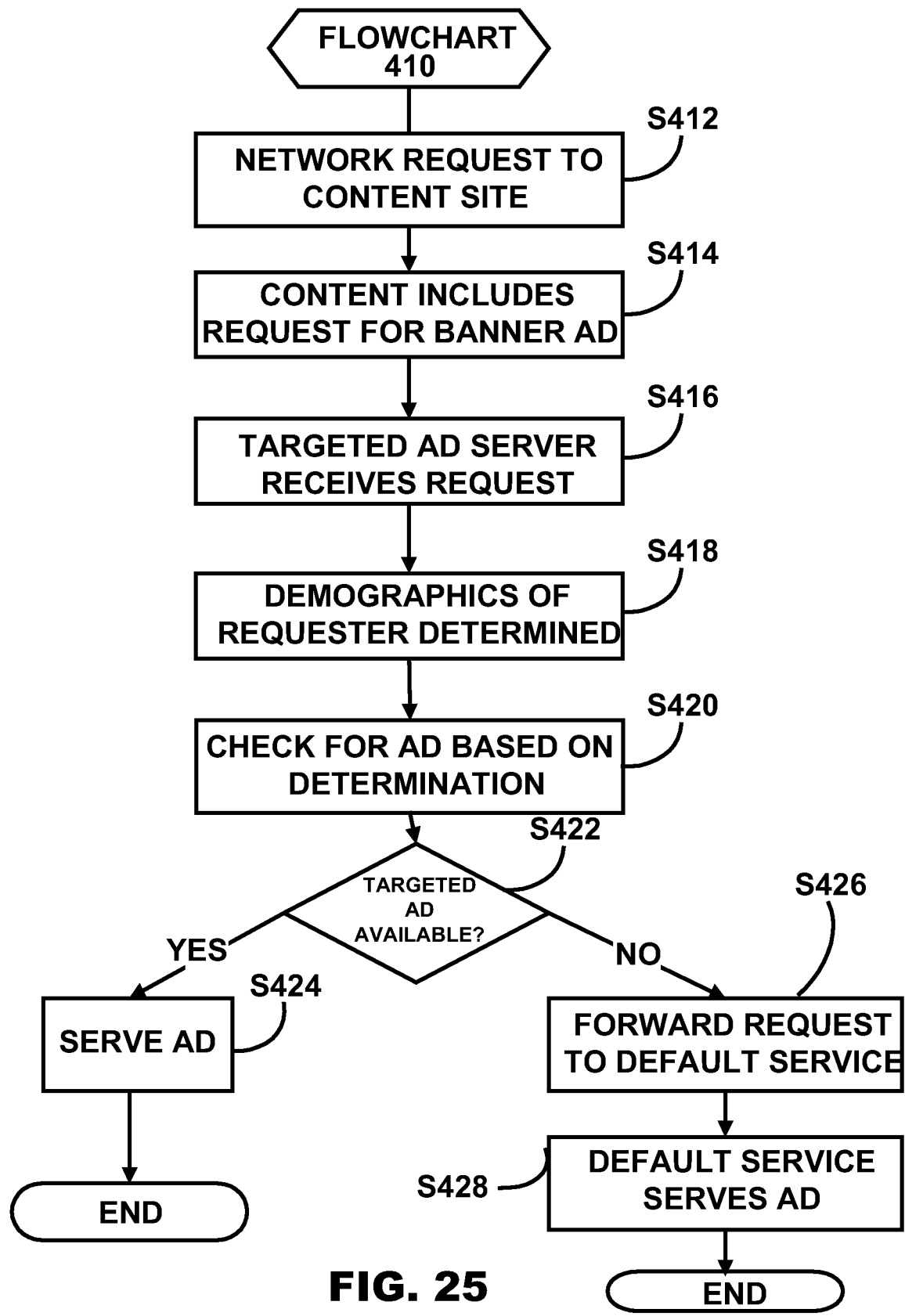
FIG. 25 illustrates a flowchart representative of a web-based advertisement delivery method of the present invention as implemented by the FIG. 1 telecommunication system.

FIG. 25 illustrates a flowchart 410 representative of a method in accordance with the present invention for serving an ad when the content is requested from content provider node 130 (FIG. 1). One example of such a process would include accessing a web page over the Internet. User accesses a website on the Internet by making a network request to content provider node 130 during a stage S412 of the flowchart 410. This may be achieved using a personal computer 123 (FIG. 1) and entering a universal resource locator (URL) in a standard browser such as Microsoft's Internet Explorer, or Netscape Navigator. In the content received from content provider node 130 is code that represents a request for a banner ad during a stage S414 of the flowchart 410, such as:

<iframe height=60 src="http://ads.dizpersion.com/adservice.aspx?sid=9&at=9" width=468 frameborder=0 marginwidth=0 marginheight=0 hspace=0 vspace=0 scrolling="no" bordercolor="#000000"><img src="/images/default.gif"></iframe>

This code requests an ad from an ad selection node 140 found at the network address represented by http://ads.dizpersion.com. The page adservice.aspx receives the request during a stage S416 of the flowchart 410. A determination of demographic information related to user is then made during a stage S418 of the flowchart 410. More will be discussed relating to the determination of demographic information later. Based on the demographic determination, ad selection node 140 checks for an ad based on the demographic information during a stage S420 of the flowchart 410. During a stage S422 of the flowchart 410, a search of the targeted add within an inventory of ad selection node 140 is accomplished. If an appropriate targeted ad exists in the inventory for ad selection node 140, the ad may be served during a stage S424 of the flowchart 410. If an appropriate targeted ad does not exist in the inventory, ad selection node 140 may forward the request for an ad to a default service from content provider node 130 during a stage S426 of the flowchart 410. Ad selection node 140 may allow the request to pass to a default service by outputting code such as:

<iframe height=60 src="http://ads.tpas.net/adservice.html" width=468 frameborder=0 marginwidth=0 marginheight=0 hspace=0 vspace=0 scrolling="no" bordercolor="#000000"><img src="/images/default.gif"></iframe>

Again, an iframe may be used to provide content from a different server, service, or different page on the same server. In this example code, the default ad service is a TPAS accessed via network address http://ads.tpas.net/adservice.html. Alternatively, ad selection node 140 may directly connect to the default ad source and display the content, as opposed to sending code instructing the client, or node in use by user, to connect to the source. As was discussed previously, the control over which default service is selected to serve the ad, or from where the default ad will be served, will vary based upon the embodiment of system 100 that is employed. In one embodiment, if an ad does not exist in the ad selection node 140 inventory, no ad will be served into content provider node 130. If a default service is specified, this default ad service may serve an ad during a stage S428 of the flowchart 410.

While this embodiment was described as a request for a web page, it will be apparent that similar processes may be used in the delivery of an ad sent over WAP or any other network protocols based on content requests.

An example of one possible implementation of the ad serving mechanism of ad selection node 140 and its relationship with a content provider node 130 is in the form of a consumer web site on content server 131a (FIG. 1), which can be a standard web site made up of HTML pages accessible on the Internet by web browsers such as those commercially available by Netscape, Microsoft, and Opera. An example of the HTML surrounding and including an ad, the request for which may appear as follows:

```
<table width="490" align="center" border="0">
    <tr>
        <td>
            <center>
            <script src="http://diz.com/adservice?S=1&A=1">
            </script>
            </center><br>
        </td>
    </tr>
</table>
```

The ad request to ad selection node 140 begins and ends in the standard HTML "script tag." All other HTML may be presentational material of consumer web site.

One embodiment may include passing values with the ad request for an ad identifying the consumer web site, as demonstrated above in the HTML get method included in the portion of the uniform resource locator (URL), "S=1". This may indicate that the request for an ad originates from a content provider node 130 that has been assigned an identification number of "1" by database server 141a, or some other portion of the ad selection node 140. In FIG. 1, various servers 131 of content provider node 130 may be assigned different identification numbers, or non-numerical identifiers. Alternatively, various pages or sections of content of servers 131 may be assigned different identification numbers, or non-numerical identifiers, or even multiple identifiers. Using the HTML get method and identifiers is just one example of how information may be passed with the ad request and should not be viewed as limiting. Any means may be employed to pass such information.

The content served by ad selection node 140 may be in the form of a portion of or a complete hypertext markup language (HTML) web page, a portion of or a complete web page containing dynamic content as might be provided by a technology such as Flash, an advertising tag or banner for a networked service such as instant messaging, a portion of or a complete short messaging service (SMS) advertising message, a portion of or a complete wireless application protocol (WAP) site or service, or any other form of advertising on a consumer networked site or service.

Another example involves a distribution of targeted ads when the user selects to receive broadcast information from content provider node 130. One example of such a process would include receiving audio content and an audio ad, sent over satellite radio, broadcast into a mobile vehicle. In one embodiment, a multiplexing scheme may be employed to send multiple different signals representing advertisements over the same radio channel. One such multiplexing scheme might include TDMA. Using this scheme a variety of time slots may be specified, each intended for a specific demographic. If a targeted ad exists for one of the demographic slots, ad selection node 140 may send it on that slot. If no targeted ad exists, ad selection node 140 may pass on serving into that slot, allowing a general or default ad to be sent. User at some point tunes in to the broadcast channel on which this system 100 is running. The broadcast includes a segment in which an advertisement will be played, and the broadcast signal may indicate that an ad is to be served. Alternatively, and potentially based upon the multiplexing scheme employed, the radio receiver used by user may automatically determine that an ad is being served without it being specifically indicated in the broadcast signal. The radio receiver, or a device available to the radio receiver then determines the current demographics associated with the network node it represents. This demographic determination might include information about user taken at the time of subscription to the satellite radio service that is stored or programmed into the receiver or associated device. Also, the receiver or associated device may include global positioning system (GPS) capability, and a determination of current location may be used in part or solely in the demographic determination. Based on the demographic determination, the radio receiver or associated device can select the appropriate signal out of the multiplexed signal, decoding a particular ad signal. The user may then receive the decoded ad signal as an ad.

While this embodiment was described as a satellite radio broadcast, it is apparent that similar processes may be used in the delivery of an ad sent over digital television, or any other network broadcast.

Figure 26:
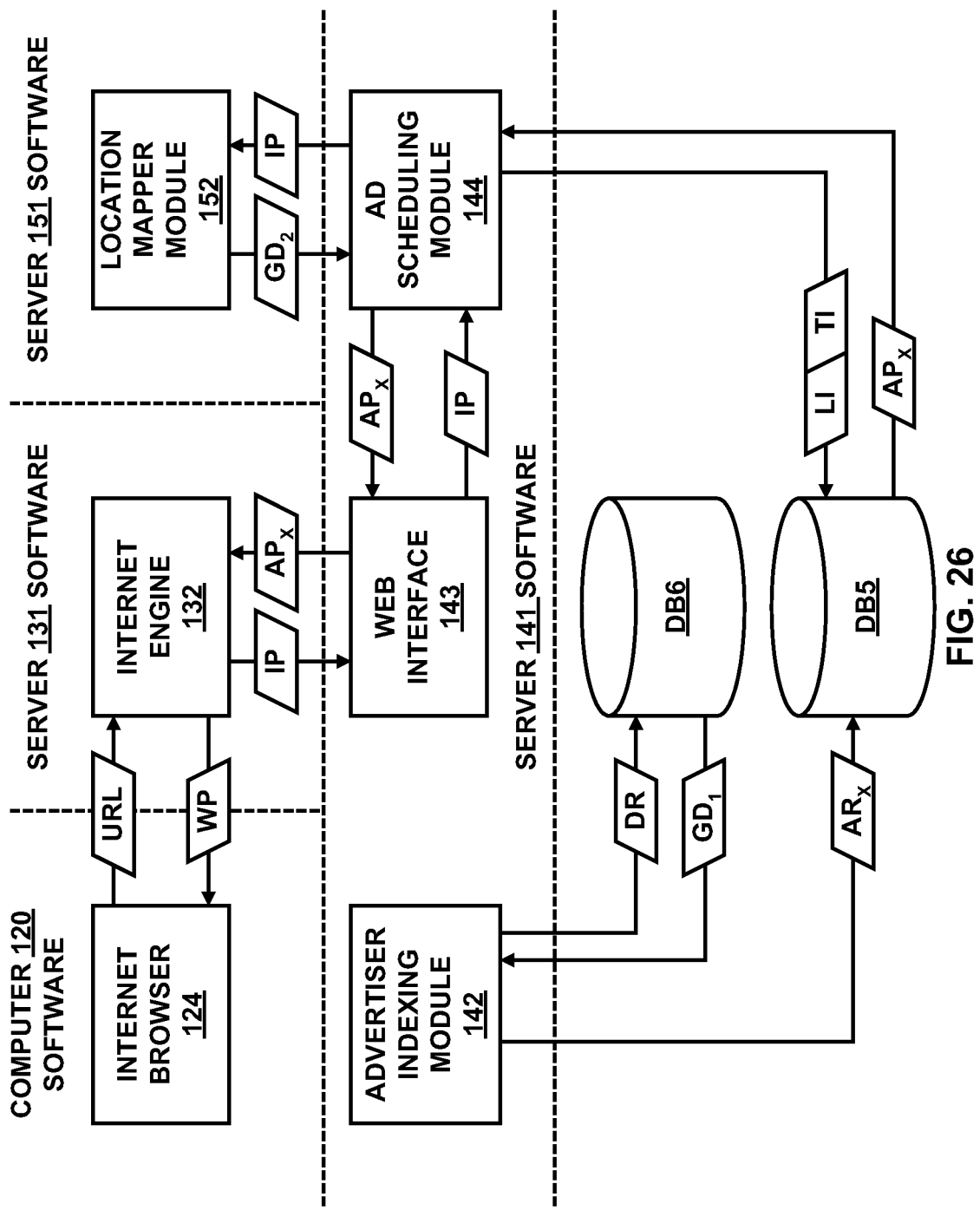
FIG. 26 is a block diagram of one embodiment in accordance with the present invention of computer software employed in the FIG. 1 telecommunication system.
Figure 27:
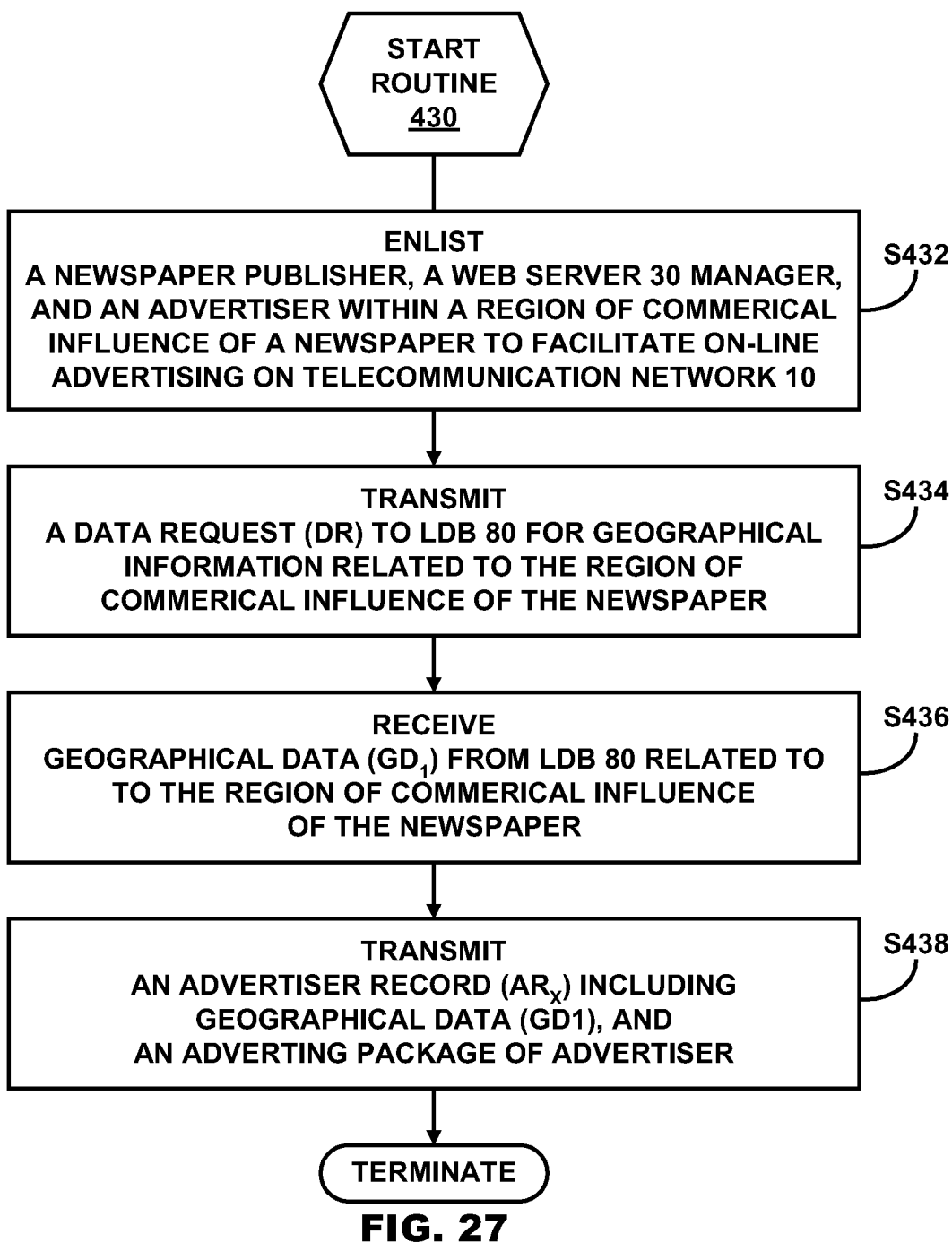
FIG. 27 illustrates a flow chart of a first embodiment of an advertiser indexing routine in accordance with the present invention.

FIG. 26 illustrates computer software employed in the telecommunication system 100 of FIG. 1. An advertiser indexing module 142 is a unique software package of server 141 for implementing several stages of an advertiser indexing routine 430 as shown in FIG. 27. During a stage S432 of routine 430, a newspaper publisher of a newspaper having a region of commercial influence (e.g., region RCI in FIG. 5), a manager of web server 131, and ad advertiser of the newspaper are enlisted to facilitate an on-line advertising of one or more advertisements of the advertiser on telecommunication system 100. In one embodiment of stage S432, the newspaper publisher contacts each advertiser of the newspaper to ascertain any interest in advertising on web pages of content providers of telecommunication system 100 such as content server 131a.

During a stage S434 of routine 430, module 142 transmits a data request DR to DB6 seeking geographical information related to the region of commercial influence of the newspaper. In one embodiment of stage S434, the data request DR specifically seeks all zip codes within the region of commercial influence of the newspaper. During a stage S436 of routine 430, module 142 receives geographical data $GD_1$ from DB6 that is related to the region of commercial influence of the newspaper. In one embodiment of stage S434, the geographical data $GD_1$ includes all zip codes within the region of commercial influence of the newspaper.

During a stage S438 of routine 430, module 142 transmits an advertiser record $AR_X$ to DB5 that includes geographical data $GD_1$ and an advertising package of the advertiser to be displayed in telecommunication system 100. In one embodiment of stage S438, advertiser record $AR_X$ further includes a unique identifier for the advertiser, a pointer to the appropriate advertising package, the date and time of the last impression, the number of impressions made in this timeframe, the minimum number of impressions that should be made in each recognized timeframe, and the maximum number of impressions that may be made in each recognized timeframe. Module 142 terminates routine 430 upon completion of stage S438. Those having ordinary skill in the art will appreciate the efficiency, convenience, and cost benefits of routine 430 to newspapers, web site servers such as server 131, and advertisers involved with the display of ads on telecommunication system 430.

Figure 28:
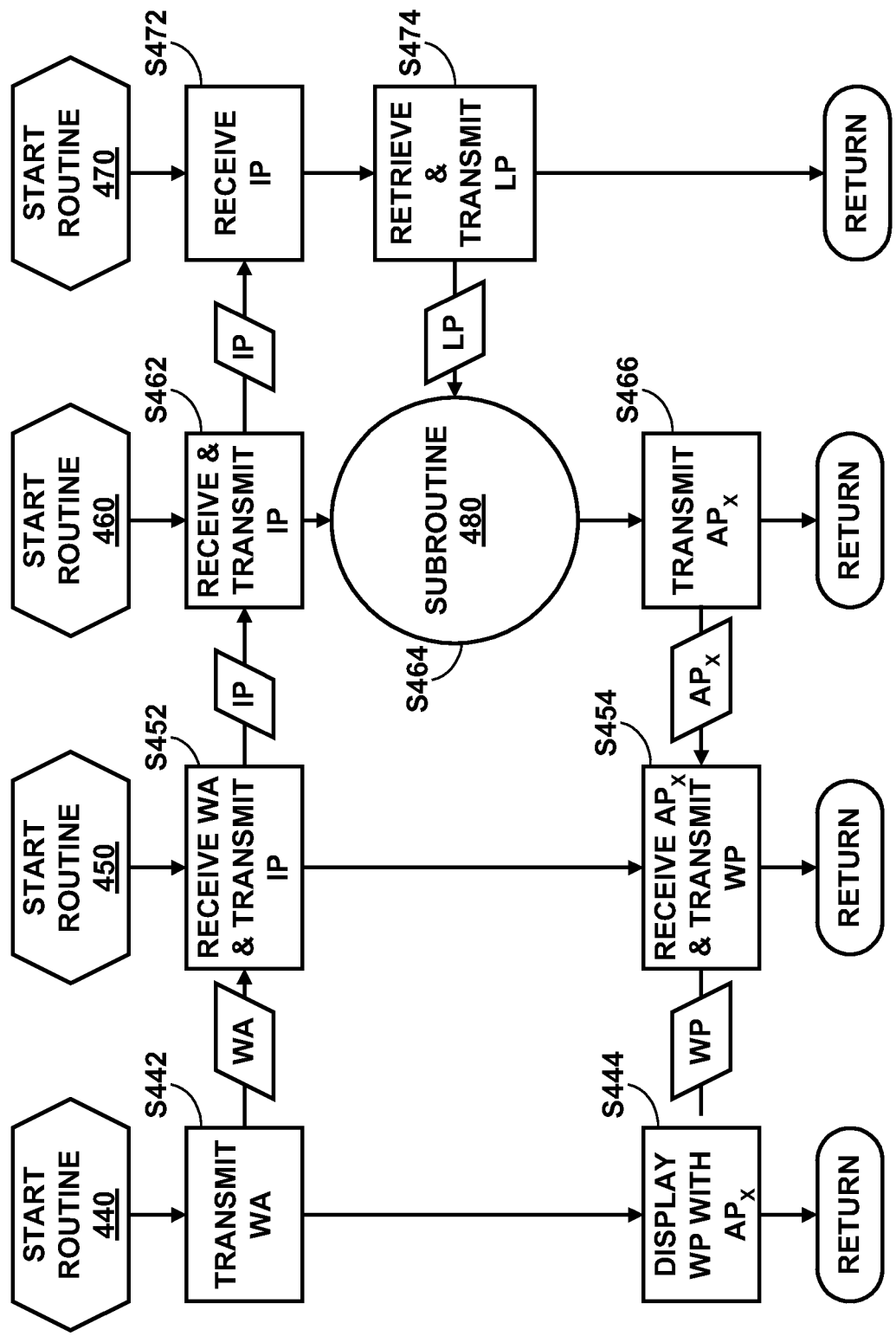
FIG. 28 illustrates various flow charts of a first embodiment in accordance with the present invention for displaying advertisements within the FIG. 1 telecommunication system.

Referring again to FIG. 26, an Internet browser 124 is a software package of workstation 123 for implementing a routine 440 (FIG. 28) that enables consumer to provide a web address in the form of a Uniform Resource Locator (URL) corresponding to website server 131 during a stage S442 of routine 440 whereby the consumer can download information over a web page WP from website server 131 during a stage S444 of routine 440. An Internet engine 132 is a software package of website server 131 for implementing a routine 450 (FIG. 28) that provides a user signal in the form of an Internet Protocol address IP to server 141 in response to a reception of Uniform Resource Locator (URL) during a stage S122 of routine 120 whereby web site server 131 can transmit a web page WP having an advertisement package $AP_X$ therein during a stage S124 of routine 120.

A web interface 143 and ad scheduling module 144 may be unique software packages of server 141 for implementing a routine 460 (FIG. 28) that provides the Internet Protocol address IP to server 151 in response to a reception of the Internet Protocol address IP during a stage S462 of routine 460 whereby module 144 can transmits advertising package $AP_X$ in digitized form including images, animations, videos, text, software, and/or sounds during a stage S466 of routine 450. Location mapper module 152 is a software package such as that provided by Quova, Inc., for implementing a routine 470 (FIG. 28) that maps Internet Protocol address IP to corresponding geographical information to thereby return geographical data $GD_2$ including a description of a presumed geographical location of personal computer 123 during a stage S474 of routine 470 in response to a reception of Internet Protocol address IP during a stage S472 of routine 470. In one embodiment of module 152, geographical data $GD_2$ includes information related to the presumed geographical location of personal computer 123 such as the continent, the time zone, the U.S. state (if appropriate), the city, the latitude, the longitude, the U.S. zip code (if appropriate), the Designated Market Area (DMA), the Metropolitan Statistical Area (MSA), and the Primary Metropolitan Statistical Area (PSMA).

Figure 29:
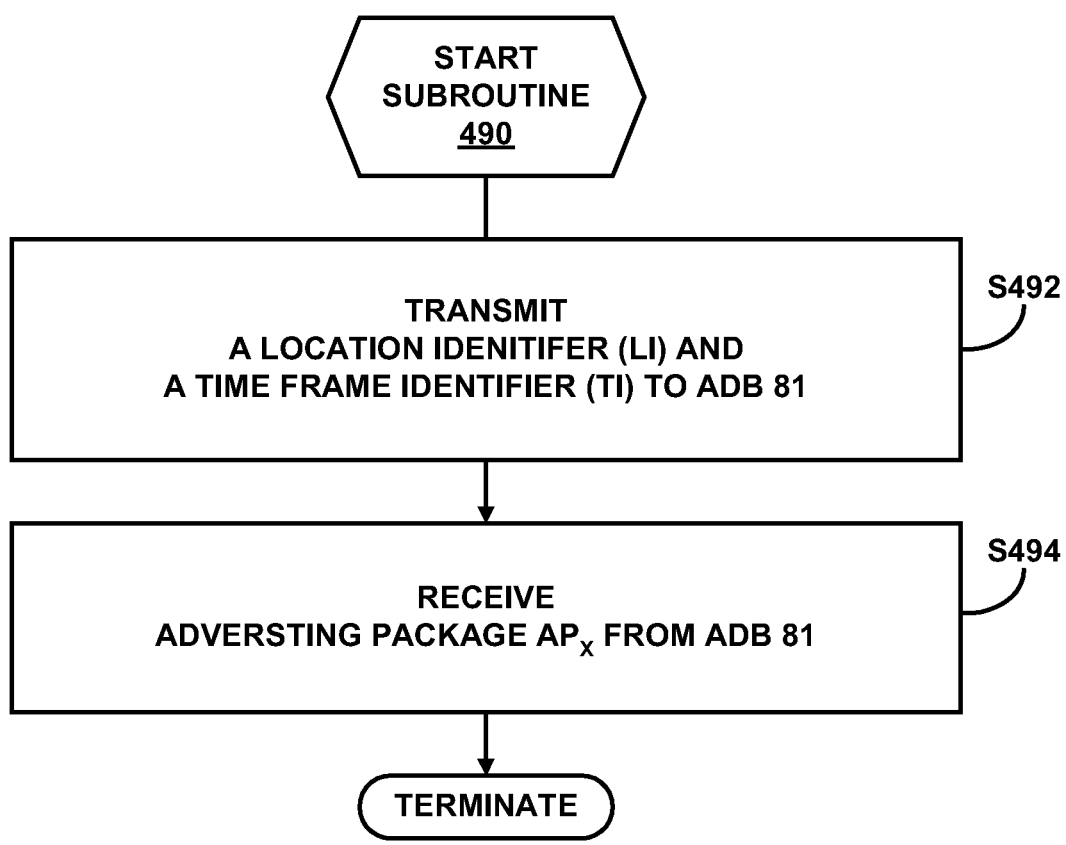
FIG. 29 illustrates a flow chart of a first embodiment of advertisement selection routine in accordance with the present invention.

Module 144 implements a subroutine 480 during a stage S464 of routine 470 in response to a reception of the geographical data $GD_2$ from server 151 to identify and retrieve advertising package $AP_X$ from DB6. One embodiment of subroutine 480 is shown as subroutine 490 in FIG. 29. During a stage S492 of subroutine 160, module 144 transmits a location identifier LI and a timeframe identifier TI to DB6. In one embodiment of stage S492, location identifier LI identifies all zip codes contained within geographical data $GD_2$ as received by module 144. Additionally, timeframe identifier TI identifies the timeframe (e.g., a day and an hour) upon which interface 143 and module 144 received Internet Protocol address AP from server 131.

During a stage S494 of subroutine 490, module 144 receives advertising package $AP_X$ from DB5. In one embodiment of stage S494, one or more advertiser records corresponding to identifier LI and timeframe identifier TI are listed within DB5 with a marking indicating the date and time of the last impression. As a result, advertising package $AP_X$ is retrieved from an advertising record that is marked as the next record to be displayed. Module 144 terminates subroutine 490 upon completion of stage 164. Those having ordinary skill in the art will appreciate the efficiency, convenience, and cost benefits of routine 440, routine 450, routine 460, and routine 470 to consumers, newspapers, web site servers such as server 131, and advertisers involved with the display of ads on telecommunication system 100.

In one embodiment, content provider node 130 may continue to serve advertisements of their choosing if ad selection node 140 can not ascertain the location of the end user node 120 or if ad selection node 140 does not contain an advertisement for the location of the end user node 120. In one embodiment, the default advertisement, that which is chosen by content provider node 130, will be served automatically by ad selection node 140. In one embodiment, ad selection node 140 may select a non-location based advertisement in the event that ad selection node 140 cannot ascertain the location of the end user node, or if ad selection node 140 does not contain an advertisement for the location of the end user node. In one embodiment, no advertisement may be served in the event that ad selection node 140 cannot ascertain the location of the end user node, or if ad selection node 140 does not contain an advertisement for the location of the end user node.

In one embodiment, multiple advertisements may be available in ad selection node 140 for a web site and location combination. In one embodiment, all available advertisements for a web site and location combination may be served in a round robin manner. In one embodiment, the round robin will be over all impressions entering the system. In one embodiment, the round robin may be over only impressions served to an individual end user node. In one embodiment, statistical weights, or numbers associated with a greater or smaller statistical likelihood that an advertisement will be served, may be assigned to each advertisement. When multiple advertisements are available for a web site and location combination, the statistical weights of all available advertisements may be used in conjunction with a random number generator to choose which advertisement may be served. In one embodiment, advertisements sold by a primary may be given a higher statistical weight than that of a secondary. In one embodiment, advertisements sold by a primary may be given a higher statistical weight when being served inside of that primary's area of commercial influence. In one embodiment, advertisements that are to be served within a defined time frame may be given heavy statistical weight to provide greater probability that the advertisement will be served during the defined time even if other advertisements are available. In one embodiment, an advertisement may be given different statistical weights on different web sites or web site categories. In one embodiment, combinations of defined time and primary status may be given higher statistical weight than one without primary status. Many algorithms and statistical weight assignments may be employed to give priority to preferred advertisements, be that preferment based on advertiser, broker of the advertisement sale, location, time sensitivity, or any combination of these or other factors.

For example, ad selection node 140 may hold the following advertisements: an advertisement A0, sold on a total number of impressions basis, to be served anywhere; an advertisement A1 sold by a secondary, sold on a total number of impressions basis, to be served in Chicago, IL; an advertisement A2, sold by a primary, sold on a total number of impressions basis, to be served in Chicago, IL; an advertisement A3 sold by a secondary, sold on a total number of impressions basis, to be served in zip code 60614 only; an advertisement A4 sold by a primary, sold into a particular time block, to be served in Chicago, IL; and an advertisement A5 sold by a primary, sold into a particular time block, to be served in zip code 60614 only. When a user node hits the system from zip code 60614 during an overlapping of time blocks of A4 and A5, any of the above listed ads may be served. The statistical weighting may be handled in the following manner. A0 may be assigned a weight of 1, as it is at a global level and sold by a secondary. A1 may be assigned the higher weight of 3, as it is sold at the city level, which is a more precise location than required by A0. A2 may be assigned a weight of 6, as it is both at the city level and sold by a primary as opposed to a secondary. In this example, advertisements sold by a primary may receive a multiplier of 2 over the weight they would receive as sold by a secondary. A3 may be assigned a weight of 5, accounting for greater precision than A1, but lower than A2 as it was not sold by a primary. A4 may be assigned a weight of 600, as it must be served only within a particular time frame it must be heavily weighted. In this example, time sensitive advertisements may receive a multiplier of 100 over the weight they would receive if sold on a number of impressions basis. A5 may be assigned a weight of 250 as it is both time sensitive and requires a high level of location precision. All of these weights may be added together (1+3+6+5+600+250) to create the total statistical pool, or the size of the advertisement lottery, so to speak. The total size in this case is 865. On a statistical basis this means that over time A5 may be served 250 out of every 865 times, or approximately 29% of the time. A4 may be served 600 out of every 865 times, or approximately 69% of the time. And so on for the other advertisements. All of this statistical weighting may be based on a defined set of adjustable business rules and may be automatically and dynamically assigned before or during the ad serving process.

In another embodiment, the statistical weighting may take into account the price paid for the advertisements. For example, an advertisement that was purchased at a $5 CPM would not be as likely to be served as one purchased at $10 CPM. In another embodiment, the pricing for the individual advertisement may be calculated based solely or in part on the statistical weighting associated with it. For example, an advertisement that is only able to be served into a single zip code and only during a one hour period on a single site would cost significantly more than an advertisement that could be broadcast anywhere in an entire state, or over a period of weeks.

The concept of preferential serving into geographic locations was discussed previously. Another embodiment of the invention allows for preferential serving to any of the other definable characteristics of an advertisement. A company might be given preferential placement on an individual site or category of sites, such as the Green Bay Packers website, www.packers.com. In another embodiment, a company might be given preferential placement based on a time, such as ESPN requesting late night preferential placement of a Sports Center advertisement. In another embodiment, a company might be given preferential placement based on one or more demographics, such as the NAACP may be given preferential placement in geographic locations with higher concentrations of African Americans. Combinations of these factors may also describe a preferential placement, such as Comedy Central requesting preferential placement on the Green Bay Packers and other NFL websites, during the hours preceding and during the Super Bowl to advertise an alternative halftime show on their channel. Preferential placement arrangements may be handled on an individual ad basis using some statistical method, such as the ones described above. Preferential placement arrangements may be also granted on a larger scale for advertisers, in a manner similar to primary area classifications, such as those described above.

As has been previously noted, there are a variety of business relationship and network configuration possibilities in terms of the implementation of ad selection node 140. Several embodiments have been described in which the code requesting an ad from ad selection node 140 is hardcoded into the pages on content provider node 130. Ad selection node 140, regardless of whether an ad is in inventory, must handle the request. In another embodiment, some determination as to the availability of a targeted ad may be made prior to the request being passed to ad selection node 140. For example, an XML service may be enabled that allows code on content provider node 130 to check the availability of an ad at ad selection node 140 for a received request. This may be achieved by making a direct request for this information with each ad request received at content provider node 130. Alternatively, some or all of the information relating to the availability of ads may be stored locally at content provider node 130. This information may be stored in memory, held on disk in a variety of formats, stored in a local database table, or any other method as would occur to one of ordinary skill in the art. This information may also be cached in memory on ad selection node 140 to speed retrieval. This information may be updated based on either a time period passing, a number of impressions occurring, a rate at which impressions are occurring, a combination of these, none of these, or other factors.

In one embodiment, data transfers, such as with XML and perhaps using SOAP or another protocol, may be employed to transfer information regarding demographics, advertisements, and the availability of advertisements between the TPAS, targeted ad server and content site nodes. Exemplary data transfer models would enable previously described portions of the business logic to be pushed to these various nodes. Hardware, software and platform specific packages may be designed such that it is unnecessary to pass each request to the primary targeted ad serving node. In one embodiment, a client application package on a content site could access a data package representing the availability of geographically and/or demographically targeted ads for a partial or complete set of the possible geographic and demographic combinations. This data package may represent those ads available only for that particular content site, limiting the size of the data package that must be transferred and held by the client application package on the content site. In one embodiment, the targeted advertisements, or references to the targeted advertisements may be additionally stored on the client application package. In one embodiment, the client application package may be installed on the content site's servers. In an alternative embodiment, targeted ad server may supply the content site with a package to be run on a separate server local or at least dedicated to that content site. The separate server may be owned and operated by either the targeted ad server, the content site, or managed in conjunction.

In the embodiment that enables such data transfers, a pull and push system for information updates may be defined by an API, and implemented using any variety of business rules. In one embodiment, a data push and/or pull of the availability of advertisements, and possibly a record of impressions received by the content site, are performed in a time-scheduled manner. In an alternative embodiment, the push and/or pull may be performed based on a threshold number of advertisement impressions served by the content site. The advantage achieved by pushing information relating to the availability of ads for a particular content site, geographic, and demographic closer to the content site is that it allows targeted ad server to handle requests that result in a higher percentage of targeted advertisements served.

Further, ad selection node 140 is capable of passing other information to and from other nodes of telecommunication system 110. For example, information regarding ad impressions, click-throughs, printing of coupons, or other details related to serving of ads may be passed immediately or asynchronously to any other nodes.

Right of First Refusal

Figure 31:
FIGS. 31-36 illustrate a variety of the business arrangements between servers of the ad selection node and the content provider node of the FIG. 1 telecommunication system.

FIGS. 31-35 illustrates a variety of the business arrangements and combinations of services that may be involved in the function of targeted ad server 141a (FIG. 3), content server 131a (FIG. 2) and third party ad server ("TASP") 131b (FIG. 2). For example, FIG. 31 illustrates an embodiment in which targeted ad server 141a may own or operate some form of content server 131a. In such an embodiment, the content, and all ad serving is handled through the targeted ad server.

Figure 32:
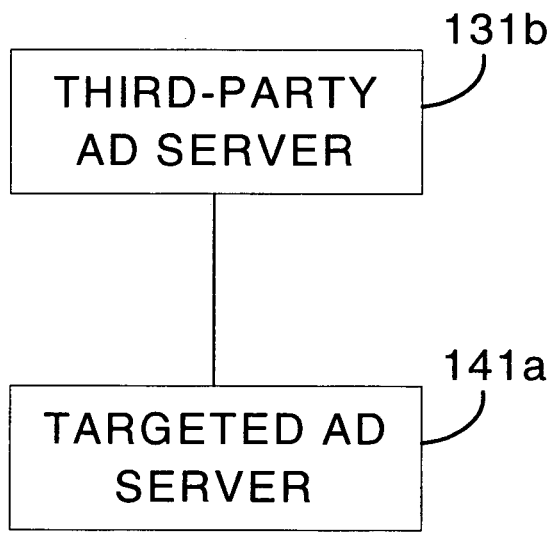

In another embodiment as illustrated in FIG. 32, targeted ad server 141a may again own or operate some form of content server 131a, but in this embodiment a relationship exists with TPAS 131b. The content site owned or operated by targeted ad server 141a may pass a request for an ad to the portion of targeted ad server 141a that determines whether a targeted ad exists in its inventory for the given network request. The determination process to be discussed in greater detail later. Based on the determination, targeted ad server 141a may serve an ad from its inventory or pass the request on to TPAS 131b.

Figure 33:
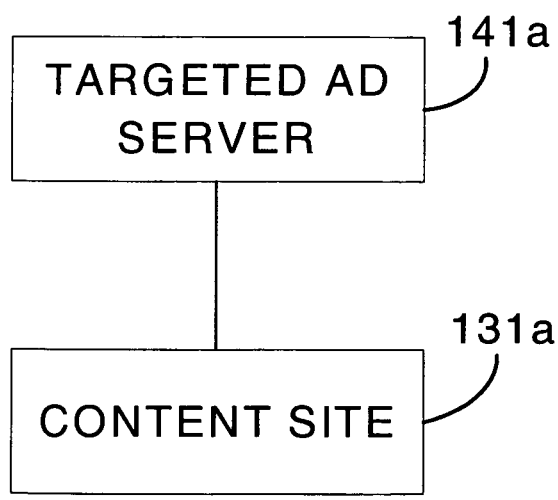

FIG. 33 illustrates a first embodiment that includes a separate content server 131a. This embodiment is essentially similar to FIG. 31, but the content server 131a is not owned or operated by targeted ad server 141a.

Figure 34:
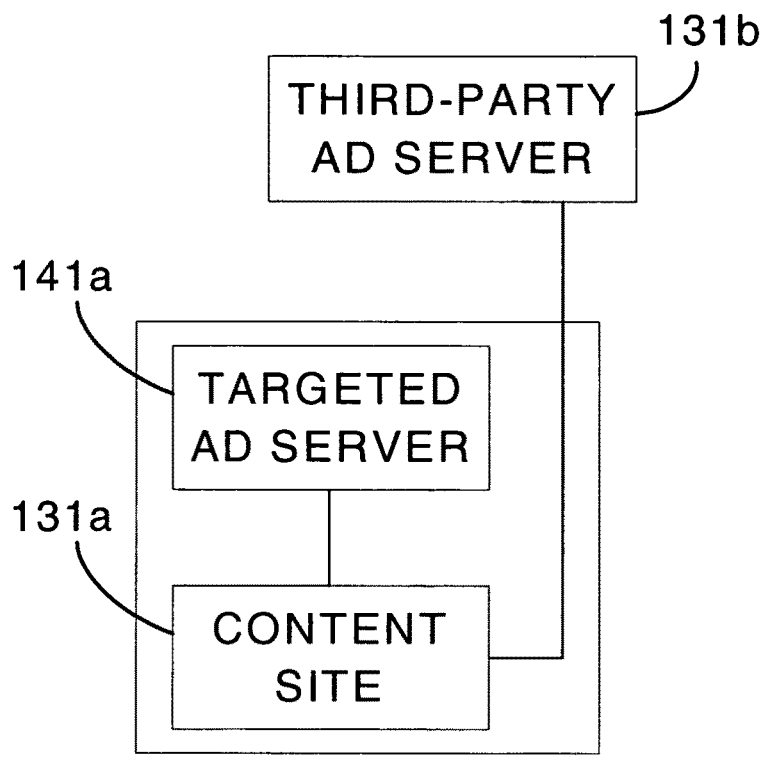

FIG. 34 illustrates an embodiment in which content server 131a has a relationship with targeted ad server 141a and TPAS 131b. In this embodiment, the content server 131a might be a web site including at least one web page that includes code requesting an advertisement from targeted ad server 141a. Every request for an ad may be passed to targeted ad server 141a, or the requests may be on some periodic, rotational, or statistically calculated basis. Upon receiving the request, targeted ad server 141a determines whether a targeted ad exists in its inventory for the given network request. Based on this determination, targeted ad server 141a may serve an ad from its inventory or pass the request on to a page hosted on content server 131a defining a default ad to serve, or passing the request directly to TPAS 131b as specified by content server 131a.

Figure 35:
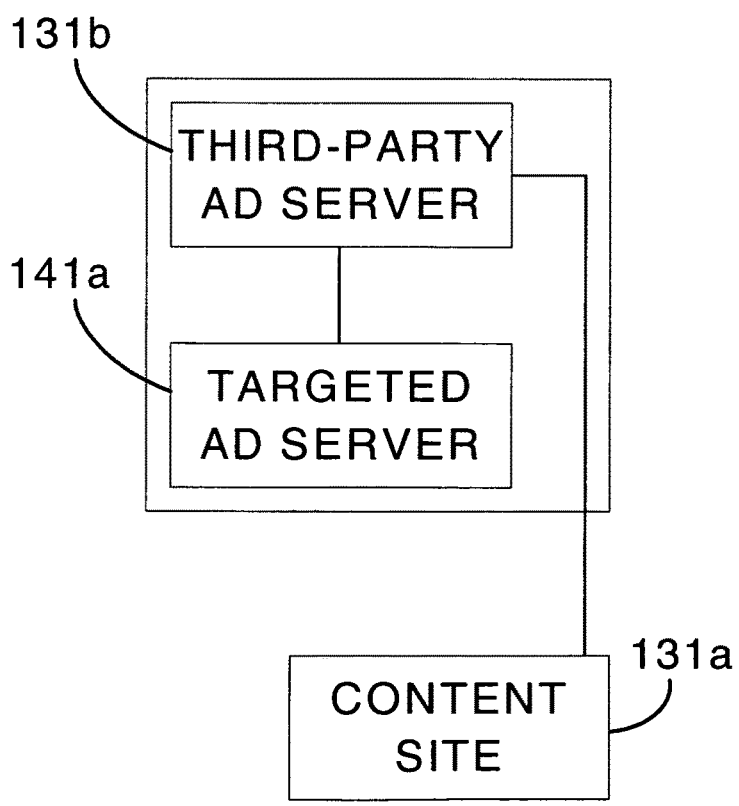

FIG. 35 illustrates another embodiment, this time wherein TPAS 131b and targeted ad server 141a have a relationship. In this embodiment, content server 131a may be unaware of the existence of targeted ad server 141a. Its relationship may be with TPAS 131b. Content server 131a requests an ad from TPAS 131b. The request to TPAS 131b may actually in effect be a request to targeted ad server 115. This might be achieved by masking the direct request to the targeted ad server by using a domain name of TPAS 131b pointing to a server running targeted ad server 141a. Alternatively, TPAS 131b may receive the ad request, call targeted ad server 141a, and serve an ad from one of the two servers based on the availability of a targeted ad. Again, every request may be passed to targeted ad server 141*a*, or they may be passed on some periodic, rotational, or statistically calculated basis.

Figure 36:
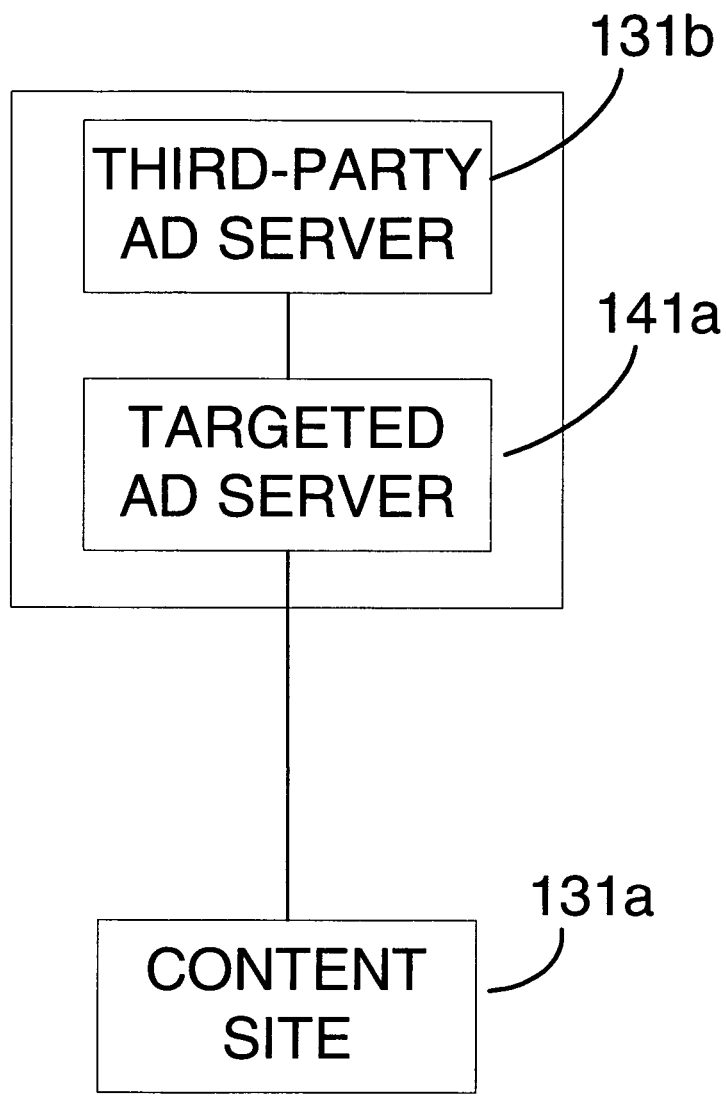

FIG. 36 illustrates an embodiment very similar to FIG. 35, but in this case content server 131*a* has a relationship with targeted ad server 141*a*, and content server 131*a* may be unaware of the relationship that exists between targeted ad server 141*a* and TPAS 131*b*. In this embodiment, targeted ad server 141*a* receives the ad requests first. Again using the example of an ad served with web content, content server 131*a* might include code requesting an ad from targeted ad server 141*a*. Targeted ad server 141*a* then determines whether an appropriate ad exists in its inventory, and based on this determination it serves either a targeted ad or forwards the request to TPAS 131*b*.

Some content sites use content management systems, or other software to manage ad serving in-house. In one embodiment, targeted ad server 141*a* may work in conjunction with the producer of the content management system to provide means to more easily enable managing default ads when employing the targeted ad system. Such means might include automatically supplying a URL for a default request, supplying a back door page or program to receive information such as click-through registering for hits as they occur, or other such conveniences.

The embodiments shown in FIGS. 31-36 illustrate targeted ad server 141*a* as a concept and product that may be described as a right-of-first-refusal ad server (RFRAS). For the purposes of this application RFRAS is defined as an ad server that, based on some rule set, makes a determination as to whether it should serve a targeted ad or pass on the opportunity. In one embodiment, targeted ad server 141*a* is an RFRAS, and in this case may be referred to as RFRAS 141A.

RFRAS 141A exists to facilitate the cooperative uses of the advertiser, agent of the advertiser, content server 131*a*, and TPAS 131*b*. By acting as an intermediary, RFRAS 141A allows each entity to continue to focus on core competencies. In other words, the advertiser may now be offered network advertising, interfaces for interacting with the creation and definition of network advertising, all in a targeted manner previously unavailable for network advertising. Agent of the advertiser, in the case that they are a traditional publication, may continue to focus their ad sales on a geographic area relevant to their standard advertising clients. Minimally, they are provided with an additional outlet to sell advertisements for. Content server 131*a* may benefit from higher revenues related to the higher revenues anticipated for the sale of targeted advertising. Content server 131*a* may also see intangible benefits related to more a more satisfied user, as the advertising messages presented to user may be more relevant. Allowing content server 131*a* to continue to use their existing ad serving solution in the event that there is no ad available on RFRAS 141A may ensure that there is no loss involved in employing the RFRAS solution. TPAS may continue to focus on selling and providing general advertisements, or advertisements focused in a similar or different manner than those on RFRAS 141A.

Depending on the type of device and network user employs, RFRAS 141A may use two primary methods to serve targeted ads. In the one case, user may request content from content server 131*a*, in the other case user may choose to receive broadcast information from content server 131*a*.

In an embodiment wherein content provider node 130 dynamically generates its content, much of the logic described as being performed in ad selection node 140 may be may be pushed to the content provider. In the case of providing web content, and in the case that the content is not dynamically generated, an iframe allows ad selection node 140 to reserve our position in the page to serve an ad. By serving up another iframe as the content provided by ad selection node 140, the control of that ad position is effectively passed on to another server. Using this method, any content site using standard html may employ the RFRAS system of ad selection node 140.

In one embodiment the request for an ad received by the targeted ad server may include instructions relating to what default ad service should be called in the event no ad is available, or at least may include parameters to be passed to the default ad service.

Demographic Determination Process

The ad selection node 140 and the content provider node 130 may be designed and configured in any form that may lead to the serving of an ad. This may be done by a request to a common gateway interface (CGI) script, java servlet, or any other means known in the art. One embodiment may include a page request to an ad service servlet that may pass the request on to an internal ad serving program. The request to ad selection node 140 and the content provider node 130 may include the IP address of the user node 120, and this information may be passed on to ad serving program. Ad serving program may pass the IP address to user identification node 150 and may receive geographic location information back from user identification node 150. One embodiment of the present invention provides for multiple alternative means of establishing the location of an end user node. In one embodiment, a cookie may be dropped associated with the ad server that holds zip code, city, state, or any other standard or custom designation of location. The cookie may also hold some confidence level associated with how strongly the system may assume that the given location is accurate. In one embodiment, the end user may designate the location of an end user node specifically, or the location may be specified by some service holding end user information such as, for example, Hailstorm, which is currently under commercial development by Microsoft. In one embodiment, after the location of an end user node has been established, by whatever means chosen, the location information may be stored in temporary memory on the ad server for a period of time. This temporary storage may be associated with the individual user by IP address, and may be released after a configurable period of inactivity from that IP address. In one embodiment, the location information may be stored in a database associated with ad serving program, whether that information was collected from a geolocation service like Quova, Inc. or Hailstorm, from the end user herself, or by any other means known in the art. In one embodiment, any number of the above techniques may be employed together, or individually. When multiple means are used, the ad serving program may use any system to select which means to use or in what order they are checked. In one embodiment, the ad serving program may first check for an in memory session associated with the end user node. If no location is ascertainable by this means the program may check an internal database holding previously established mappings between IP address and location. If again no location is ascertainable by this means the program may call the Quova, Inc. geolocation service. The geographic location may be passed by ad serving program in a request to ad selection node 140. Many pieces of information may be passed to ad selection node 140 including, but not limited to, the IP address of the user node that may have made the initial request from content provider node 130, information identifying content provider node 130 as an additional source of the request, geolocation information returned by user identification node 150, geolocation provided by content provider node 130, or by end user node 120.

Previously examples were given of code included on content provider node 130 that requests an ad from ad selection node 140. It should be recognized that even using such static code, many more pieces of information may be passed from content provider node 130 to ad selection node 140. Information passed along with the ad request might include the section of a site or the page of a site on which the ad is to be displayed. The information might include information held on the site regarding the user, this information gathered in a profile, collected from a form, or just an identifier used by the site to identify said user. The information might include URLs that may indicate the desired location for ad redirect in the event ad selection node 140 selects not to serve an ad, or may indicate the desired location for a call to indicate to content provider node 130 that the user interacted with a served ad (submitted a form, clicked a banner, printed a coupon, etc.). These pieces of information are only exemplary, and others may occur to one skilled in the art.

The passing of information from content provider node 130 to ad selection node 140 may be achieved using querystring variables, variables sent using the post method, or using a different means of communications such as an XML data transfer or request. Alternatively, other protocols or means of communication over network 110 or out-of-band communication may be employed to transfer information relating to the user.

If a complete table of IP Address to geographic locations is maintained as the primary means of determining the geographic location (i.e. ad selection node 140 looks up this information from the table on every impression), the geographic locations associated with the IP Address may be updated using a variety of means. If using Quova, or a similar service, the update may be based on the threshold returned, if a certain period of time has passed since the information was established, or may be pushed or pulled when the initial source or some other source has a potentially more accurate and updated location associated with one of the stored values.

Reporting Process

As a value added, the ad selection node 140 may communicate to the content provider node 130 the geographic location, or other user information stored on the targeted ad server 141*a*. This may be done immediately on reception of the request, may contain some key to indicate to the web site which of their users it is, and may be communicated over public networks, private networks, or private session (VPN).

In one embodiment, telecommunication system 100 may also provide a data service to participating consumer web sites. Data from the USCB or some other source may be incorporated with advertisement impression and location information. Together this packaged data may give consumer web sites an indication of their impression distribution by location, and by demographic data associated with those locations. This information may be given or sold to the consumer web sites participating in telecommunication system 100.

Billing Process

One embodiment of the current invention provides a method for dividing the revenue earned through advertisement delivery. In one embodiment the revenue earned may vary based upon advertisement type, the location into which the advertisement is served, and the advertiser, publication or media company that sold the advertisement. In one embodiment, an advertisement may not be sold into a primary area by a publication, media company, or advertiser that does not hold the primary status in that area. In one embodiment, an advertisement may be sold into a primary area by a publication, media company, or advertiser that does not hold the primary status in that area, but the company that purchased the advertisement may be charged a flat fee or percentage of the overall advertising revenue to serve into that primary area. In one embodiment, a database and software solution may automatically calculate any charges or credits relating to primary and secondary status. The database and software solution may automatically generate billing statements for advertisers, publications and media companies registered with ad selection node 140.

Figure 30:
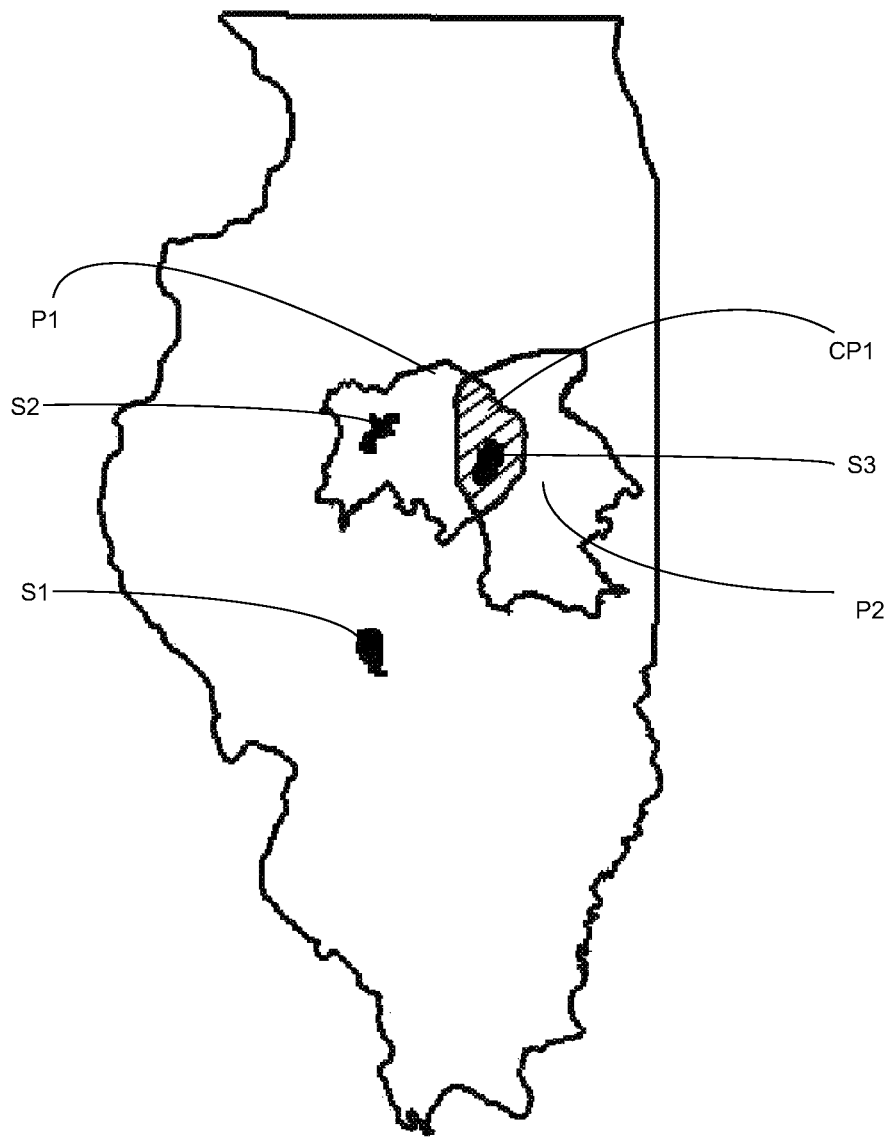
FIG. 30 illustrates fictitious advertising regions within the state of Illinois.

FIG. 30 is a map of the state of Illinois containing outlined areas of commercial influence for five fictitious advertisers or publications. One embodiment of the invention may provide publications with certain distribution advantages associated with advertisements served on the network 110, these advantages being referred to as holding primary status over an area. Those advertisers or publications that have been awarded such advantage may be referred to as primaries in recognition of their primary status. Those advertisers or publications not holding primary status over their area of influence may be referred to as secondaries. Area P1 and area P2 represent the areas of commercial influence for two primaries. Area CP1 represents the overlapping areas of commercial influence for the primaries holding areas P1 and P2. Areas S1, S2, and S3 represent the areas of influence for three secondary advertisers or publications.

In one example, a billing statement for the advertiser or publication with area of influence P1 may include billing information for advertisements that were served in areas P1, P2 (the portion not in CP1), CP1, and S1. In one embodiment of this example, the advertiser or publication with area of influence P1 may receive full income for advertisements served in areas P1 and S1 because those areas are within the advertiser's or publication's primary area or are not in a primary area at all. Areas P2 and CP1 may be handled in multiple ways. In one embodiment, advertiser or publication with area of influence P1 would not be charged for serving into areas P2 or CP1 solely because it is a primary. In one embodiment advertiser or publication with area of influence P1 may be charged for serving into area P2 because that is another advertiser or publication's primary area. Advertisements served into area CP1 by advertiser or publication with area of influence P1 may be charged because it is within another advertiser's or publication's primary area, or may not be charged because it is still within the primary area of P1.

In another example, a billing statement for advertiser or publication with area of influence S1 may include billing information for advertisements served in areas P1, CP1, and S1. In one embodiment advertiser or publication with area of influence S1 may serve within area S1 without incurring any charge. In one embodiment, the same flat fee or percentage may be charged to advertiser or publication with area of influence S1 for serving into areas P1 or CP1 because at least one advertiser or publication holds primary status over each area. In one embodiment, a double charge may be placed on advertisements served into area CP1 because it is within both primary area P1 and primary area P2.

In another example, a billing statement for advertiser or publication with area of influence S2 may include billing information for advertisements served in areas P1 (not in S2), S2, and S1. In one embodiment, advertiser or publication with area of influence S2 may not be charged for serving into area S1 because it is not within a primary area. In one embodiment, advertiser or publication with area of influence S2 may be charged for serving into area P1 (not in S2) because it is within a primary area. In one embodiment, advertiser or publication with area of influence S2 may be charged for serving into area S2 because it is within primary area P1. In one embodiment, advertiser or publication with area of influence S2 may not be charged for serving into area S2 because it is within that advertiser or publication's area of influence.

In another example, a billing statement for advertiser or publication with area of influence S3 may include billing information for advertisements served in area S3. In one embodiment, advertiser or publication with area of influence S3 may not be charged for advertisements served into area S3 because it is within that advertiser or publication's area of influence. In one embodiment, advertiser or publication with area of influence S3 may be charged a flat fee or percentage for serving into area S3 because it is within at least one advertiser or publication's primary area. In one embodiment, advertiser or publication with area of influence S3 may be charged a double flat fee or percentage for serving into area S3 because it is within two advertiser or publication's primary areas.

The database and software solution may implement any of the above embodiments, any combination of the above embodiments, or other possible embodiments in calculating billing information for each advertiser or publication or media company. In one embodiment, a bill may include separate sections for categories such as: advertisements served into the advertiser or publication's primary area or a non-primary area, sold by that advertiser or publication; advertisements served into the advertiser or publication's primary area by another advertiser or publication; and advertisements served into another advertiser or publication's primary area.

While the above method of defining primary areas and the accounting methods associated with those primary areas has focused on publication and media companies, similar concepts may be applied in a variety of ways. Primary status over an area may be held by other companies, individuals or other entities that may claim a specifiable area of influence. Primary status may also be granted regardless of area of influence, but on a purchasable basis-set fee or auction based—or by some other means of determination. For example, one embodiment might allow a franchisee to hold primary status over the area in which they retail products or services. In another embodiment, primary status over an area may be held by a local government in their area of jurisdiction. Primary status over an area, as it may include a percentage of earnings for any ad broadcast into that area, may be viewed as a purchasable and/or tradable commodity, may be granted indefinitely or only over a specific time period, and may be granted on a transferable or non-transferable basis. The sale of primary status, on the basis of its potential future revenues, may also be used as an alternative means to raise capital, as opposed to selling equity in the ad serving company itself.

Additional Embodiments

Telecommunications system 100 as described above includes many various methods and uses of sending targeted ads. Further examples will now be described to detail some of the additional features and capabilities of such as system.

In one embodiment, multiple advertising package opportunities may be available to an advertiser on ad selection node 140. While there are many different options, four possible scenarios are as follows:

First, advertisers who distribute and/or provide their goods or services exclusively from a single geographic location within an individual Metropolitan Statistical Area (MSA), and seek to advertise such goods and services exclusively within said MSA, ad selection node 140 may provide a method by which the advertiser may advertise such Client's goods or services, and/or promotions and the like relating to such goods or services, on web sites signed up within the advertising network when such web sites are visited by persons physically located within such MSA exclusively.

By way of example, advertisers with passenger airlines as clients, such as United, American or Delta, who offer their air transport services to the population of an entire MSA from a single location, such as General Mitchell International Airport in Milwaukee, WI, could conduct a promotion(s) on the airline's behalf through said method which may publicize the sale of an airfare from Milwaukee to a remote destination, such as Phoenix.

Second, advertisers who distribute and/or provide their goods or services from more than one geographic location within an individual MSA, and seek to advertise such goods and services exclusively within said MSA, ad selection node 140 may provide a method by which the advertiser may advertise such Client's goods or services, through intra-MSA location-specific or intra-MSA location-agnostic promotions, and/or promotions and the like relating to such goods or services, on web sites signed up within the advertising network when such web sites are: (1) visited by persons physically located within such MSA exclusively; or (2) visited by persons physically located within a select distance from one or more of said advertiser's geographic locations.

By way of example, advertising agencies with fast food restaurants as clients, such as McDonald's, Burger King or Wendy's, who offer their food products to the populations of entire MSAs through multiple locations, such as McDonald's of Evanston, IL, McDonald's of Wilmette and McDonald's of Winnetka, could conduct location-specific promotions on the restaurant's behalf through said method, which could publicize, for example, a "Buy One Get One Free Hamburger—only at McDonald's of Winnetka" available exclusively at the McDonald's of Winnetka location. Alternatively, the advertising agency could conduct a location-agnostic promotion, such as "Buy One Get One Free Hamburger—at any participating Chicago-area McDonald's", whereby said promotion could be advertised on the web sites of the advertising network to the entire MSA viewing area.

Third, advertisers who distribute and/or provide their goods or services exclusively from a single geographic location within an individual Metropolitan Statistical Area (MSA), and seek to advertise throughout multiple MSAs, ad selection node 140 may provide a method by which the advertiser may advertise such Client's goods or services, and/or promotions and the like relating to such goods or services, on web sites signed up within the advertising network when such web sites are visited by persons physically located throughout multiple MSAs.

By way of example, advertisers with passenger airlines as clients, such as United, American or Delta, who offer their air transport services to the populations of multiple MSAs from single locations within each individual MSA, such as General Mitchell International Airport in the Milwaukee, WI, MSA and O'Hare International Airport in the Chicago, IL, MSA could conduct a promotion(s) on the airline's behalf through said method which would publicize that all United flights will provide gratuitous in-flight meals from May 1 through September 1, irrespective of where the flight originates or arrives.

Fourth, advertisers who distribute and/or provide their goods or services from more than one geographic location within an individual MSA, and seek to advertise throughout multiple MSAs, ad selection node 140 may provide a method by which the advertiser may advertise such Client's goods or services, through inter-MSA location-specific or inter-MSA location-agnostic promotions, and/or promotions and the like relating to such goods or services, on web sites signed up within the advertising network when such web sites are: (1) visited by persons physically located throughout one of the multiple MSAs; or (2) visited by persons physically located within a select distance from one or more of said advertiser's geographic locations across multiple MSAs.

By way of example, advertising agencies with fast food restaurants as clients, such as McDonald's, Burger King or Wendy's, who offer their food products to the populations of entire MSAs through multiple locations, such as McDonald's of Evanston, IL, McDonald's of Wilmette and McDonald's of Winnetka, could conduct MSA-agnostic promotions on the restaurant's behalf through said method, which could publicize, for example, a "Free Beenie Baby w/Every Purchase" available exclusively for a limited time at any participating McDonald's in the Midwest, or other participating locations.

Targeted Ad Wrapper System

Using the same technologies, as discussed above, but by rearranging the roles of the various nodes, targeted advertisements may be supplied in a different manner.

As previously discussed, code may be supplied to a content site allowing it to take part in the RFRAS system. Example code supplied to the content site was given as:

<iframe height=60 src="http://ads.dizpersion.com/adservice.aspx?sid=9&at=9" width=468 frameborder=0 marginwidth=0 marginheight=0 hspace=0 vspace=0 scrolling="no" bordercolor="#000000"><img src="/images/default.gif"></iframe>

Or another example was given as:

<script src="http://diz.com/adservice?S=1&A=1>

In each instance a unique identifier is supplied with the code (sid=9 and S=1) that may be associated with the particular site hosting the code. In addition to determining what ads in the RFRAS system may be served on that site, the unique identification of the site may also be required to determine what default ad is to be served. Another method of supplying advertisements using similar technologies may be described as a targeted ad wrapper server (TAWS) system. In a TAWS system, additional flexibility may be provided to the advertiser by allowing them to serve on any content site of their choosing. The TAWS system again uses code distributed to web sites, but in this case the unique identifier is for one or more specific ad campaigns.

Figure 37:
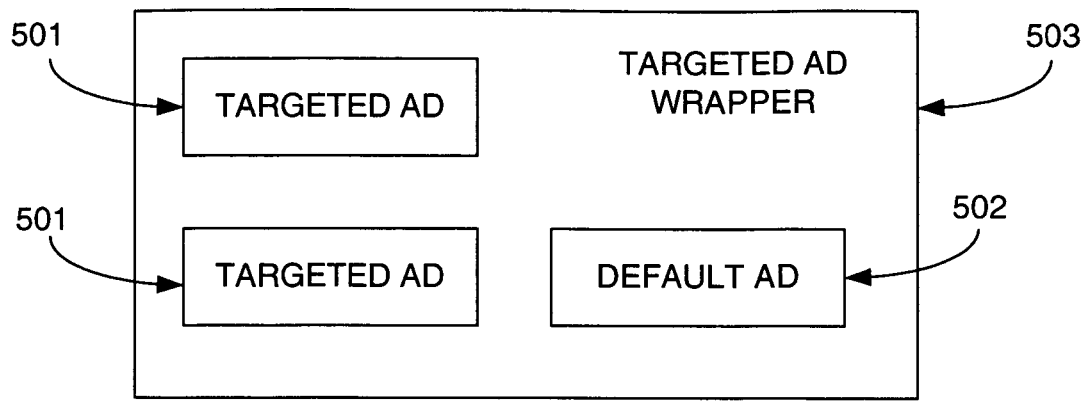
FIG. 37 illustrates a targeted ad wrapper.

For example, FIG. 37 illustrates a targeted ad wrapper 503. A targeted ad wrapper may be described as a distributable, packaged RFRAS system. A RFRAS system serving targeted ads must have a default ad arrangement with each web site. Without prior arrangements with each web site participating in the RFRAS system, the RFRAS system can not perform in its preferred mode. Regardless of how a targeted advertising campaign is technically achieved, as long as an ad must be served there must be a default ad to serve in the case that the ad request does not fit with the one or more targeted ads in the campaign. So whereas the RFRAS system requires an arrangement with web sites to handle the default ad, a TAWS system includes the default in the ad wrapper itself.

Targeted ad wrapper 503 comprises one or more targeted ads 501 and one or more default ads 502, which are recognized by an identifier unique to that combination of ads. This is similar to the site identifier in the RFRAS system. The code identifying that particular combination of targeted and default ads may be distributed to any content site, regardless of whether it is participating in a RFRAS system or not. This allows the one or more advertisers, or representatives of the one or more advertisers, to deal with any content site, or ad inventory aggregator, with which they are able to negotiate an ad inventory purchase.

More concretely, if a credit card company wished to advertise NFL (NFL a trademark of the National Football League of New York, New York) branded credit cards, they may wish to geographically target ads to highlight the home team of each franchise city. The credit card company may, for example, create an ad wrapper that specifies a targeted ad for a Bears logo card (Bears logo a property of the Chicago Bears of Chicago, IL) for the Chicago metropolitan area, an Eagles logo card (Eagles logo a property of the Philadelphia Eagles of Philadelphia, PA) for the Philadelphia metropolitan area, etc., and a default advertisement displaying a variety of logos and cards for non-franchisee markets. In order to achieve this, the ad creative materials representing the targeted ads 501 are associated with the desired geographical locations—in a manner as previously described—and then included with these targeted ads, a default ad 502 is supplied and stored in DB4 of ad selection node 140. The credit card company may then distribute code similar to that hosted by the content site in a RFRAS system. In this manner a TAWS system advertisement allows an advertiser to package together targeted and non-targeted advertisements, and to distribute the result to any content site of its choosing.

Figure 38:
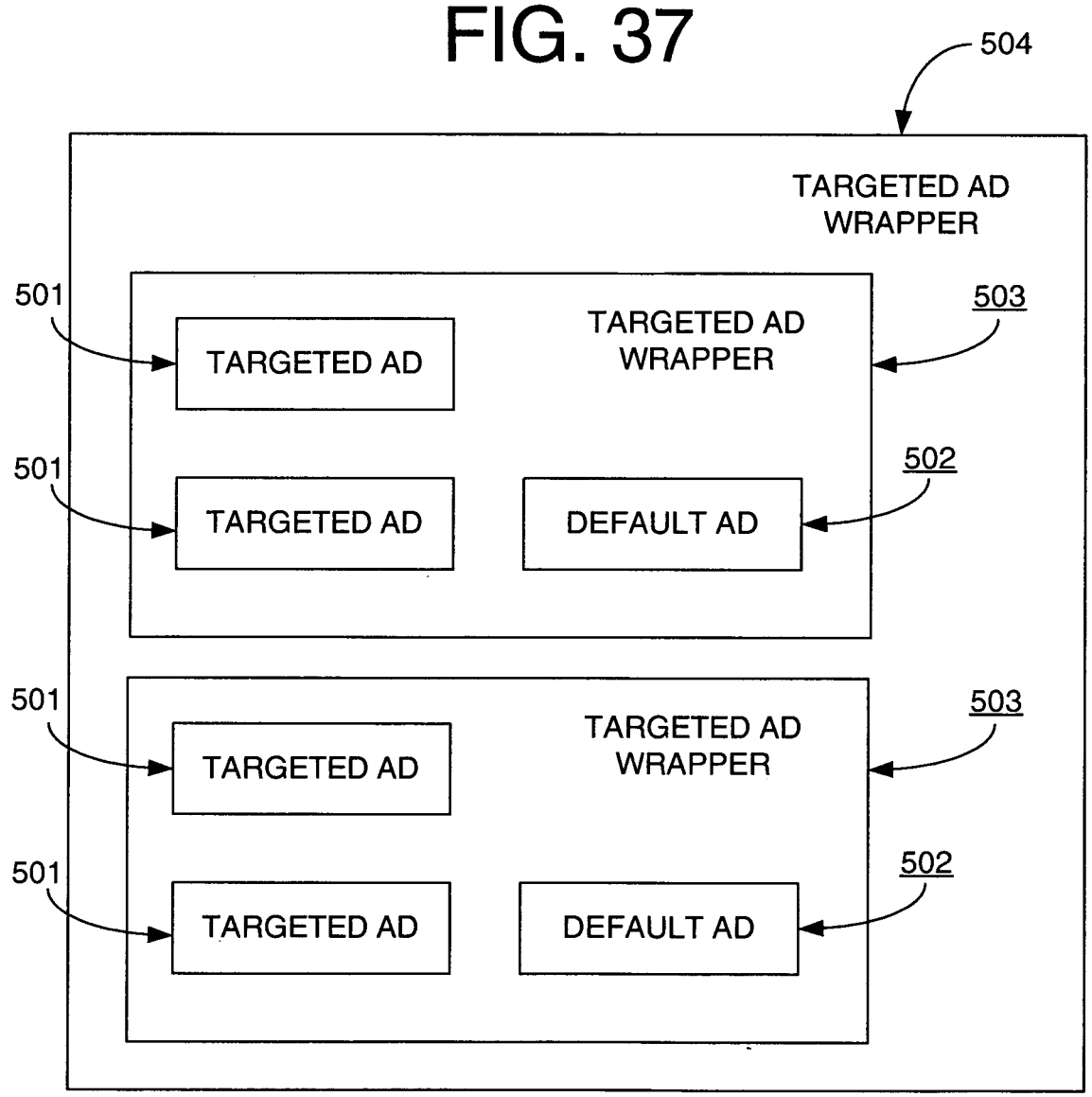
FIG. 38 illustrates a multiple layer targeted ad wrapper.

In another embodiment, a TAWS wraps together multiple wrapped ads, as is shown in FIG. 38. This may be achieved in several ways. In one embodiment, an outer-targeted ad wrapper 504 may encapsulate multiple targeted ad wrappers 503. Which targeted ad wrapper 503, held within outer-targeted ad wrapper 504, is served may be determined using, for example, a round-robin selection process or any ad selection algorithm known in the art. In one embodiment, one of the targeted ad wrappers 503 must be defined as the default. In this manner the outer-targeted ad wrapper 504 would be able to function in a manner almost identical to the targeted ad wrapper 503. The TAWS system may in that case check the location associated with the impression to be served, and if none of the targeted ad wrappers 503, other than the default targeted ad wrapper, correspond to a given area, then the default targeted ad wrapper may be served.

There is no limit to how many ads or wrappers may be placed in a wrapper or how many layers deep that wrapper may go. The technological implementation may be handled in various ways. For example, each targeted ad wrapper may be maintained as an independent unit, represented by code that would display that wrap only. Serving an ad would then be a process of stepping through the layers of the wrapper as each level of code is displayed in an iframe, or some similar manner. Alternative to this recursive approach, when an outer-targeted ad wrapper 504 is defined, the geographies covered by targeted advertisements, their statistical weightings (if they exist), the defaults, and all other logistics of the ads contained in the outer wrapper may be pre-calculated by DB4 of ad selection node 140. Targeted ad wrappers may be highly complex in their composition, containing multiple default ads, multiple ad campaigns for a single company, or even multiple campaigns for multiple companies.

Figure 39:
FIGS. 39-41 illustrate one embodiment of a method for displaying the contents of a targeted ad wrapper.
Figure 40:
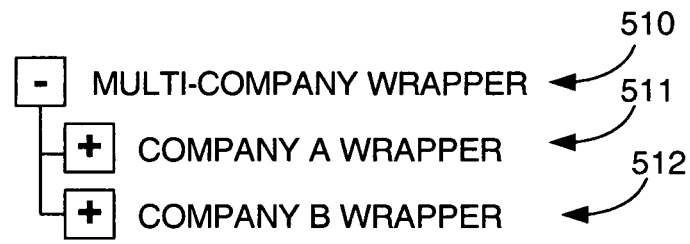
Figure 41:
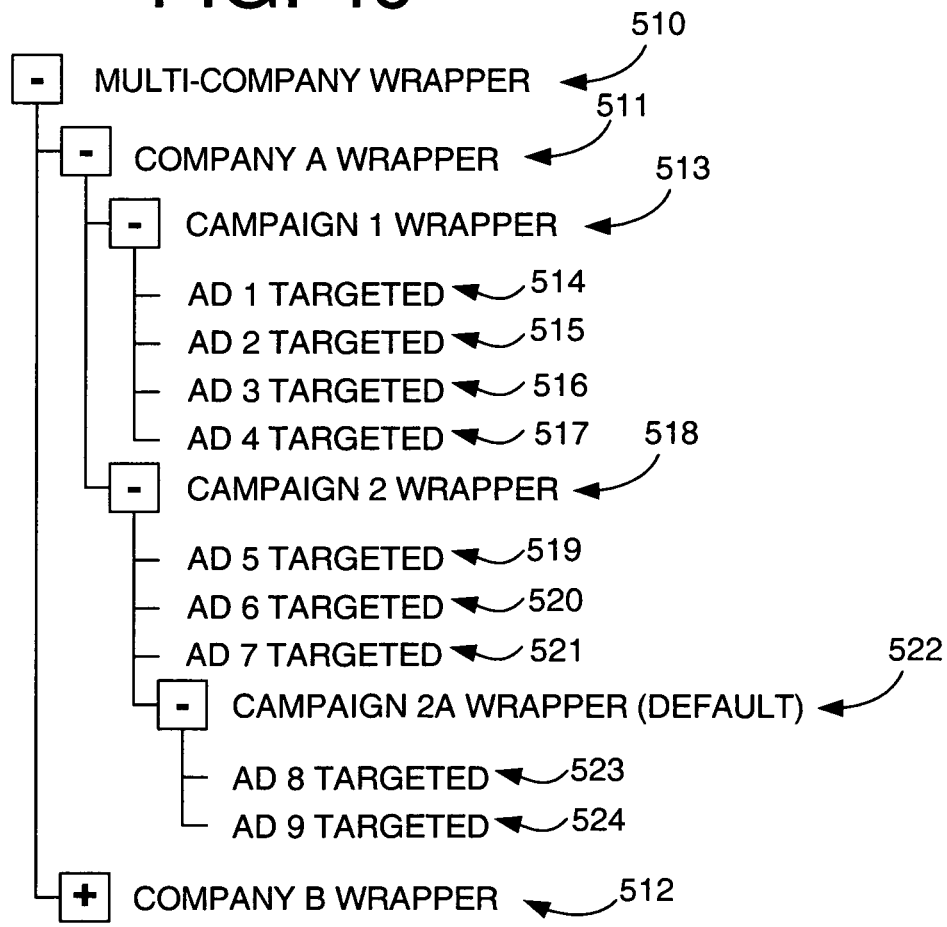

Various interfaces may be provided to an advertiser or representative of an advertiser to facilitate the creation and view the contents of a targeted ad wrapper. An example of one such interface may be seen in FIGS. 39-41. FIG. 39 illustrates one example of how a targeted ad wrapper may be represented. A plus sign link and wrapper title represents the highest-level wrapper, Multi-Company Wrapper 510. If a user wished to view the contents of Multi-Company Wrapper 510 they may click on the plus sign or title and see an expanded view as displayed in FIG. 40. Here it is apparent that Multi-Company Wrapper 510 is composed of Company A Wrapper 511 and Company B Wrapper 512. Further expanding Company A Wrapper 511 in a similar manner might result in a display such as that shown in FIG. 41. In this example Company A Wrapper holds two top-level ad campaigns 513 and 518, contained within are targeted ads, default ads, and a separate campaign 522 under campaign 518.

Figure 42:
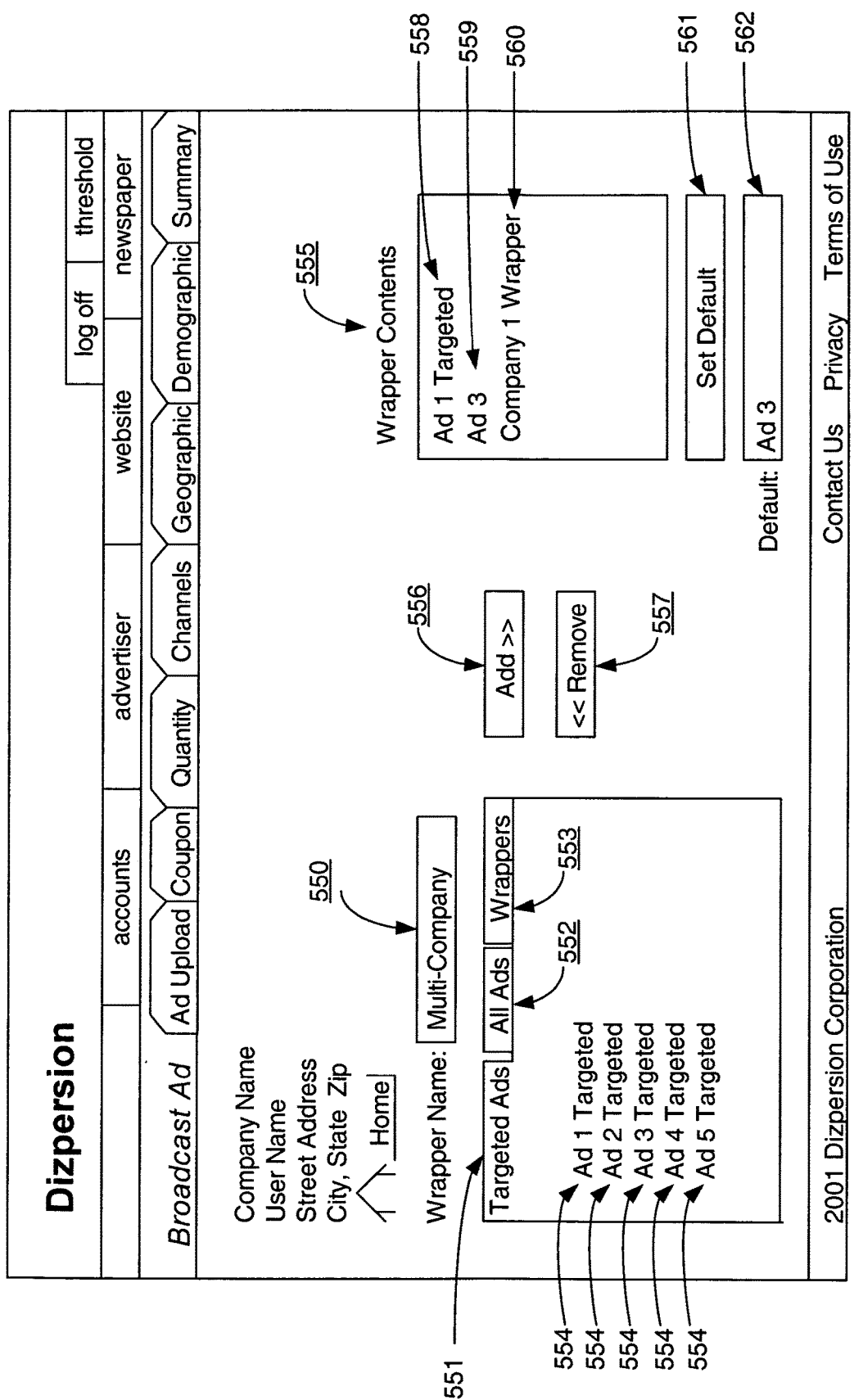
FIG. 42 illustrates one embodiment of a targeted ad wrapper creation page.

Another interface may be created such as that illustrated in FIG. 42. Interface 420 may be used in conjunction with the interfaces described in FIGS. 6-12. After an ad has been entered into the system, an advertiser may choose to create an ad wrapper. For convenience sake a name may be provided in a text box 550. The advertiser may be presented with their existing ads and wrappers categorized and presented in separate tabs such as targeted ads tab 551, all ads tab 552, and wrappers tab 553. In this illustration the targeted ads tab 551 is selected and multiple targeted ads 554 are displayed. In one embodiment, the advertiser may select one or more of the multiple targeted ads 554 and then click an add button 556. The selected ads or wrappers may then be displayed in the list of wrapper contents 555. In this illustration the targeted ad wrapper named "Multi-Company" is currently being defined, and it includes ads and wrappers 558-560. Ads and wrappers may be selected in the list of wrapper contents 555 and then removed by clicking remove button 557. In order to select the default ad, an ad or wrapper in wrapper contents may be selected and set default button 561 may be clicked. The currently selected default may be displayed as shown in default display box 562. Alternatively, the default ad may be displayed in a different color, font, or labeled by some other symbol or indicator where it is displayed in the list of wrapper contents 555.

Other conveniences may be provided by means of the interface. For example, hovering over the title of a targeted ad wrapper may pop open a box displaying its contents. Alternatively a "view" hyperlink may be provided to display the same.

The code distributed to web sites for a targeted ad wrapper directs the ad request to ad selection node 140. As control over ad selection and display is maintained at this central and singular node, and not distributed to the web site, the contents of an ad wrapper may be established and locked prior to an ad run or they may be edited during the ad run. In one embodiment, an advertiser may create an ad and specify that it may be served to any geographic location. This is a generic ad request, and the requesting advertiser may be termed a generic advertiser. As a generic ad now exists in the system, targeted ads may be wrapped with it using the TAWS system. The TAWS system may provide information relating to the available space for targeted ads to the advertiser that made the generic ad request or to any other advertiser. This availability information may include the web site designation for the default ad request, in other words indicating on which sites the default ad and other ads in the wrapper may be displayed on. The availability information may also include geo-target availability. Geo-target availability may be based on historical statistical data from one or more sources; this will be discussed in greater detail later. In one embodiment child advertisers of the generic advertiser may be, for example, the only parties allowed to see the availability information. A child advertiser may be, for example, a division of the company that ordered the generic ad run, a marketing branch, an individual product, service or location for that company, or any other sectioned or associated individual or business entity related to the generic advertiser.

Based on the availability information, an advertiser may request a targeted ad be included in the ad wrapper. The target information may include geographic, demographic, and time-based targeting.

Providing availability information may be done in a variety of ways with a variety of accuracy and convenience levels. Availability information may indicate only that ads may be run. It may further indicate the sites on which the ads may be run. Further still, estimations may be provided for the number of ad impressions that will fit certain targeting profiles. For example, if an ad wrapper has been run on a site, certain statistical projections may be made for future ad wrappers based on the information recorded. This historical statistical data might include traffic levels for a site and traffic information including time of day, geographic location, and any other relevant data collected from each ad impression. Specifically, a targeted ad request might include geo-target information requesting that the ad be served into New York City only. If during a previous ad campaign, using the same web site designation, 25% of the traffic came from New York City, the following equation may be used to calculate availability information:

(number of generic ads+number of possible target ads)
   *0.25=number of possible target ads If the generic ad run included a request for 300 impressions, it is reasonable to include 100 impressions for New York City in the targeted wrap and expect that close to that number might be served. Other means of statistical analysis and projection, including but not limited to the use of standard deviations and regression analysis, may be employed. So in this case, the availability information may specify 100 impressions for New York City. The accuracy of the statistical model used to present availability information will vary, among other things, with the amount of data available for modeling. Sites make experience spikes in traffic or unusual patterns in geographic, demographic, or time of day based on anything from scheduled events to breaking news to technical difficulties on competing sites. The more historical statistical data that is used, and the greater number of predictable events that are taken into account in modeling expectations, the more accurate the availability information will be.

After availability information has been provided and targeted ads requested, a media buy output may be determined. The media buy output is information indicating what number of ad impressions should be purchased on what web sites.

The TAWS system may be employed by and its contents arranged in a number of ways. For example, a national-level party or political interest group, such as the Democratic National Party, could make an ad inventory purchase. The details of this purchase must include both quantity and web site designation. Web site designation again comprises a web site or group of categorized web sites on which the ad, and any ads wrapped with it, will be shown. The default ad supplied in the ad wrapper may be, for example, an ad encouraging people to "get out and vote," further labeled, "sponsored by the Republican Party." Then, within that wrapper any number of ad copies may be included for individual candidates, each ad copy including target ad run input specifying only the geography of their constituencies. It is worth noting that the contents of an ad wrapper need not be completely established or considered locked at the point of creation or distribution to a content site. New ads may be added, ad copies may be edited, ads may be removed, new ads may be set as the default, and any other aspect may in fact be changed. Once the ad inventory purchase has been made and its associated generic ad run commenced, no new code needs to be sent to the content site as all changes are made on the TAWS system. If the generic ad run is to cover more than one content site, the target information for the targeted ads may include specific designation for which of those sites the ad should be run on. One or more interfaces may be created to assist organizations such as political parties in allowing the further distribution of the ad inventory within an ad wrapper. For example, the organization may be able to provide login accounts to each campaign allowing them to access ad definition and reporting pages such as those previously described. These accounts would then simply include the defined ad within an ad wrapper for the parent organization.

A similar system could be employed for companies such as franchises and conglomerates that may wish to provide interfaces to their subsidiaries. To call on a previous example, McDonalds® might set up a targeted ad wrapper and then allow each regional market and/or franchisee to access the system through individual login accounts. Again, generic McDonalds® ads would be displayed except in geographic markets in which the regional management or franchisees have specified their own ads.

In the case of a business conglomerate, there is a multitude of options and opportunities presented by the TAWS system. Companies such as, for example, Proctor and Gamble® already make a regular habit of varying advertising messages by geography. By employing a TAWS system, a company such as Proctor and Gamble® might achieve lower advertising costs by aggregating online media buys across product lines. Also, a company could mimic offline advertising methods such as testing price elasticity over different geographic locations, varying the product messages by location, practicing product differentiation where necessary, and running localized product introductions. Similar capabilities are available in the RFRAS system, but using a TAWS system each individual company may maintain control over the entirety of the media buying process.

Many different criteria and methods for targeting advertisements with the TAWS system have been discussed, with varying levels of desirability and value to advertisers. Little has been said of purchase and payment methods for generic and targeted ads, but there are numerous possibilities. For any systems described herein ad price may be set per impression, vary based on the level of targeting, may be priced through an auction process, or any other method of ad pricing known in the art.

Subject and Key Word Targetting

Figure 43:
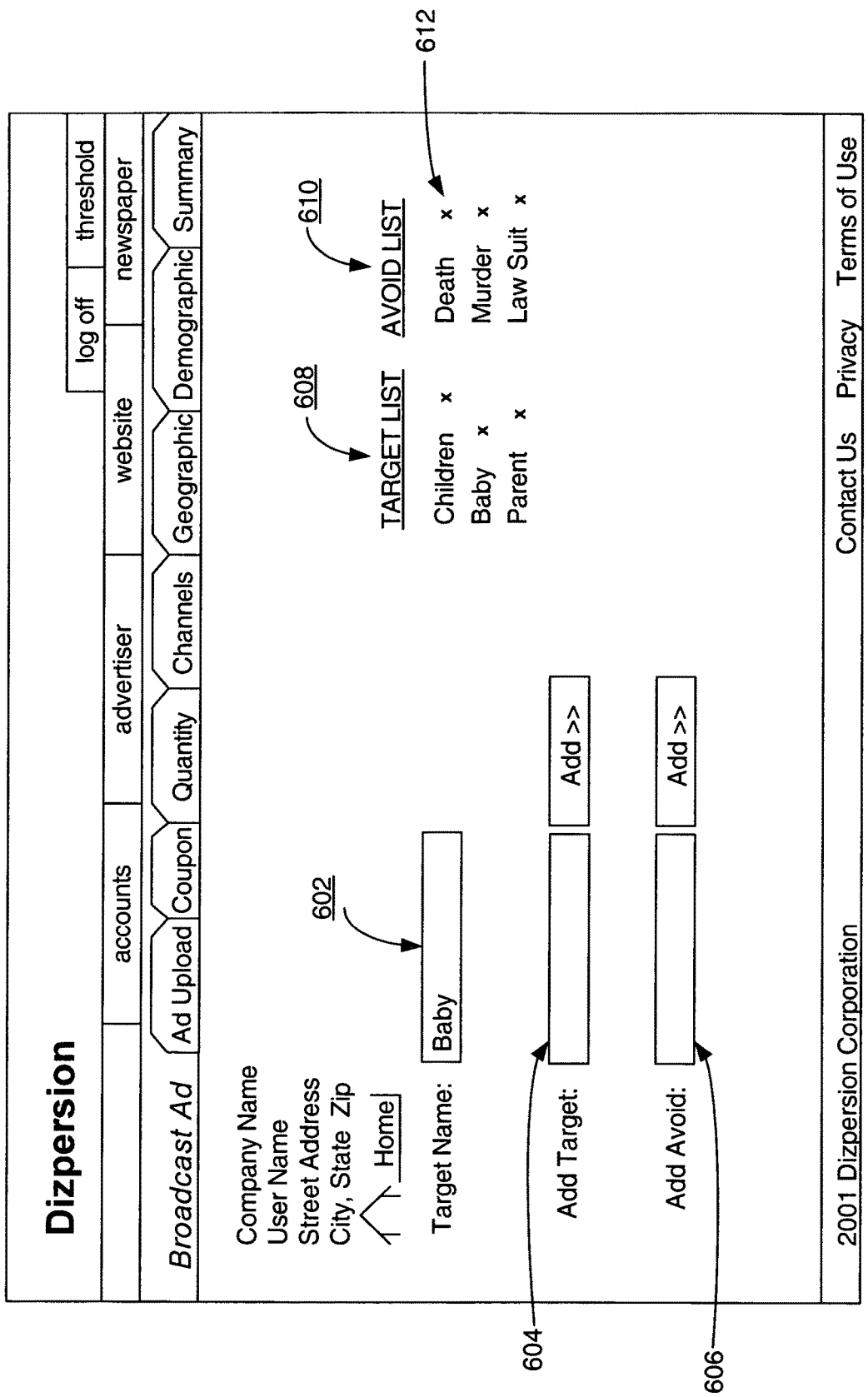
FIG. 43 illustrates one embodiment of a keyword definition page.

The subject matter surrounding and context in which an advertisement is received can be as important as geographic targeting, demographic targeting, or any other sort of target information. FIG. 43 illustrates an interface 600 for creating a subject identifier, based on keywords. First, for future ease of use and identification, the user may supply a target name 602. Input boxes 604 and 606 may be provided for the entry of target keywords and banned keywords. When a keyword to target or avoid is selected and added by the user, it is displayed in the appropriate keyword list, target list 608 or avoid list 610, at the right. Each entry in these lists may also have an associated delete link 612. When clicked, delete link 612 removes the entry from the list. In another embodiment, the user may be presented with a predetermined list of subject-based keywords. Instead of allowing the user to add any keyword to the target list and avoid list, they may in this embodiment be limited to the predetermined list. These keywords or subjects may be termed target references, banned references, or collectively termed keyword references.

There are four general methods of assigning and associating subjects to the page on which an ad will appear. The most accurate methods, but most time consuming and least scalable, require human interaction. In one embodiment, the burden of human interaction may be placed upon the web site on which the ad will be displayed. In another embodiment, the burden of human interaction may be placed upon the ad server company. In another embodiment, the burden of human interaction may be placed on the end advertiser. In another embodiment, the ad server may automatically process the subject of the page.

In the embodiment wherein the human interaction takes place at the web site, when a new page is going up, or when the contents of a page change, the ad request embedded on the page may be manipulated to reflect the new page subject matter. For example, alphanumeric values may be added to the query string of the ad request URL, such as "http://www.ad-server.com/adrequestjsp?subject=C2,C3". A list of valid alphanumeric values may be supplied to the web site, and might include such values as C2 representing that the subject of the page is "babies," C3 representing "parenting," and L1 representing "divorce." In this embodiment, the interface 600 may include these values and alphanumeric codes as the predetermined list. Other information may be sent is this manner as well. For example, a code may be, for example, supplied to represent the author of the article on the page or the position of the advertisement on the page.

In the embodiment wherein the human interaction takes place at the ad server company, the ad request is associated with the page on which it originated. This may be supplied in full or in part in the request for the advertisement, such as "http://www.ad-server.com/adrequest.aspx?requestpage=http://www.website.com/page.html" For each new request page received at the ad server, a person may go to that page and assign the codes to future requests received from that page. In this embodiment, it must be taken into account that pages may keep the same URL, but change content. Therefore, it may be useful to review the assigned codes on a periodic basis, or when it is indicated that content has been updated.

The embodiment wherein the human interaction takes place at the end advertiser is quite similar. In this embodiment the ad server system may be either RFRAS or TAWS. Each advertiser that has defined ads that may be served may be given the ability to review each new page and assign codes. Alternatively, the advertiser may have an interface that allows them to specify first whether they wish to serve or not on the page, and second which ad copy they would like to serve. Further details and embodiments relating to advertiser selected pages is discussed in more detail below, see FIG. 46.

Figure 44:
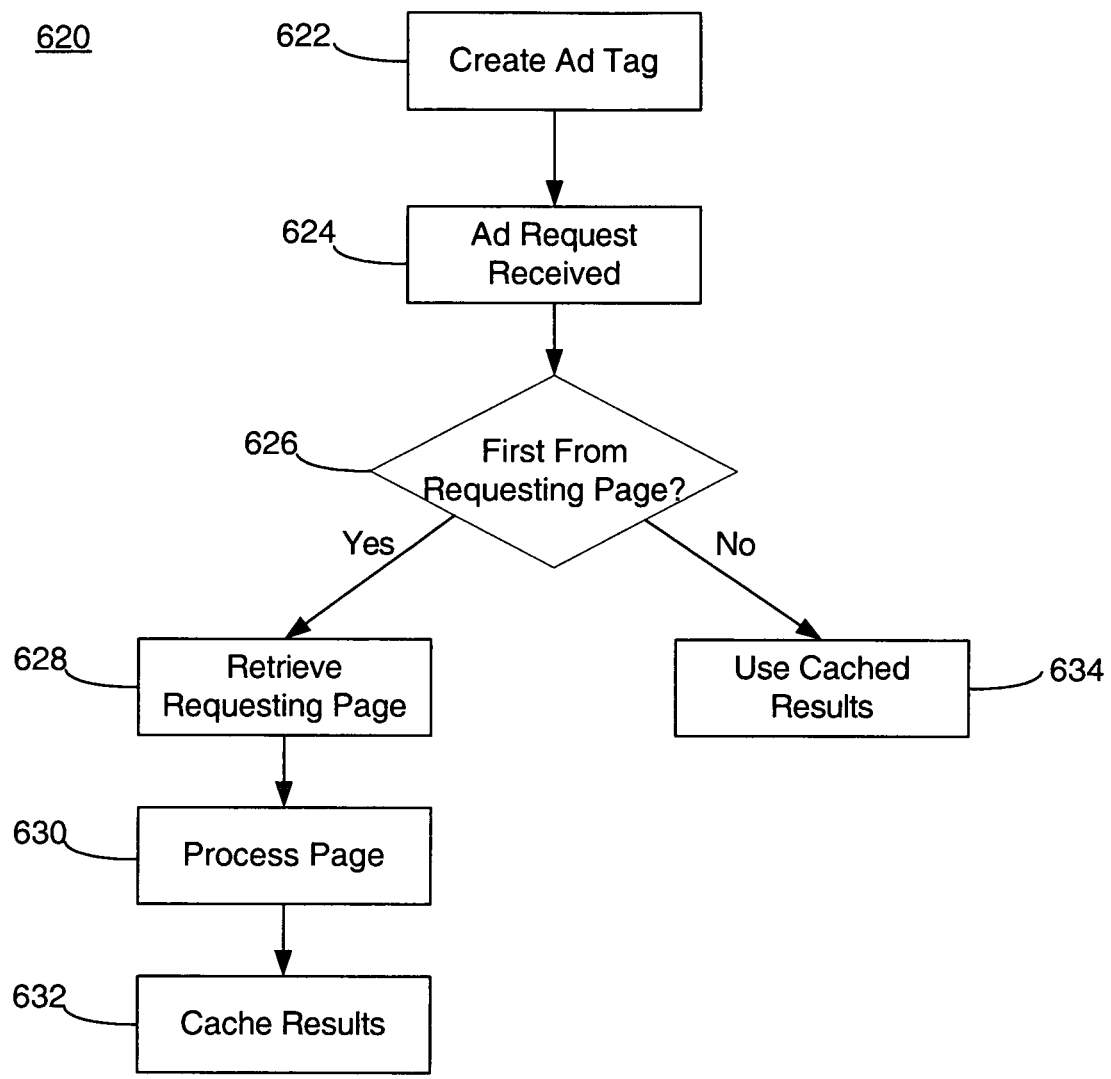
FIG. 44 illustrates a flow chart of a first embodiment for targeting ads to a content page by keyword.

FIG. 44 illustrates the embodiment wherein the ad server may automatically process the subject of the requesting page. First, an ad tag is created 622 that includes the page on which it will originate its request. When the page on which the tag is hosted is viewed, an ad request is received 624 at the ad selection node 140. At the ad selection node it is determined whether this is the first time a request is being received from the requesting page 626. As was previously noted, content may change in a page, so the determination of whether this is the first request from the requesting page may take into account a periodic resetting. After a set period of time, the ad server may indicate this is the first request from the page even if the page has been requested before, thereby giving the opportunity to reprocess the subject of the page. If this is the first time a request has been received from the requesting page, the ad server retrieves the content of the requesting page 628.

The content retrieved from the requesting page is then processed 630. Content may be processed in a wide variety of ways. One simple approach would be to simply index the text of the content and consider each word to be a keyword. Many commercial and proprietary searching, indexing, and cataloging means are known in the art, and any of these or others may be employed to process the content of the requesting page. The results of the processing are cached in a database at ad selection node 140. The database associates the requesting page with the processed results, allowing these results to be used for subsequent ad requests from the requesting page 634.

In one embodiment, ad selection node 140 may cache a copy of the requesting page 628. This may be performed for review by advertisers. In another embodiment, the caching may be performed to provide a visual display of page-level availability information for an existing ad wrapper. With this cached information available to advertisers, satisfaction or approval information may be collected indicating approval or disapproval of the subject and keyword targeting system. In one embodiment, the payment to a web site for used ad inventory may be based in part on the approval information. In another embodiment, approval information may be required prior to the ad being served.

Advertiser Selection of Placement

Figure 45:
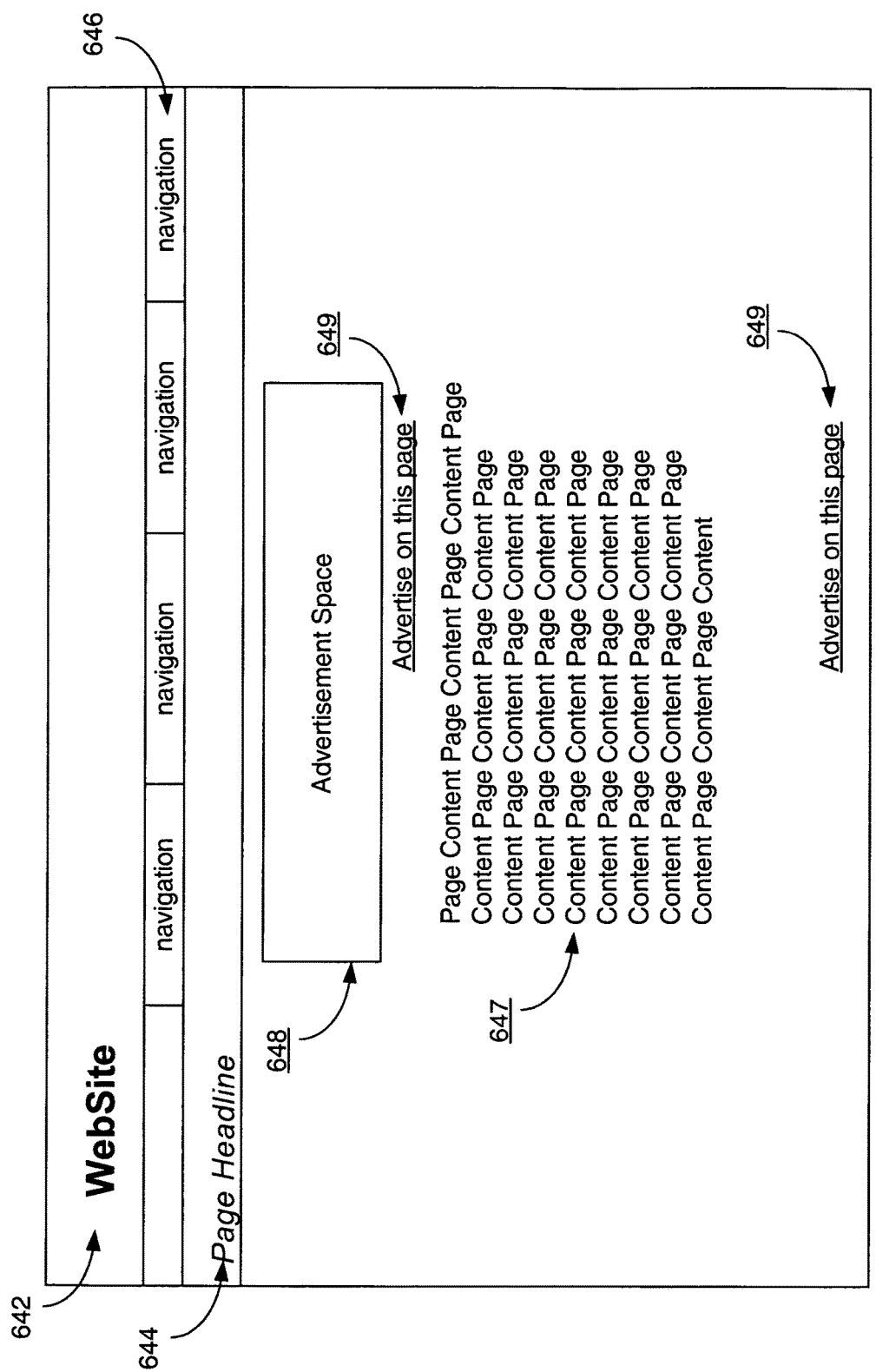
FIG. 45 illustrates one embodiment of a page displaying proxy advertising.

FIG. 45 illustrates a web page on a standard web site as shown at 640. The web page 640 may contain one or more of the elements shown including a title 642, navigation elements 646, page content 647, or a headline 644. For the purposes of this embodiment, the two necessary elements are advertisement space 648, and page specific invitation to advertise link 649.

Figure 46:
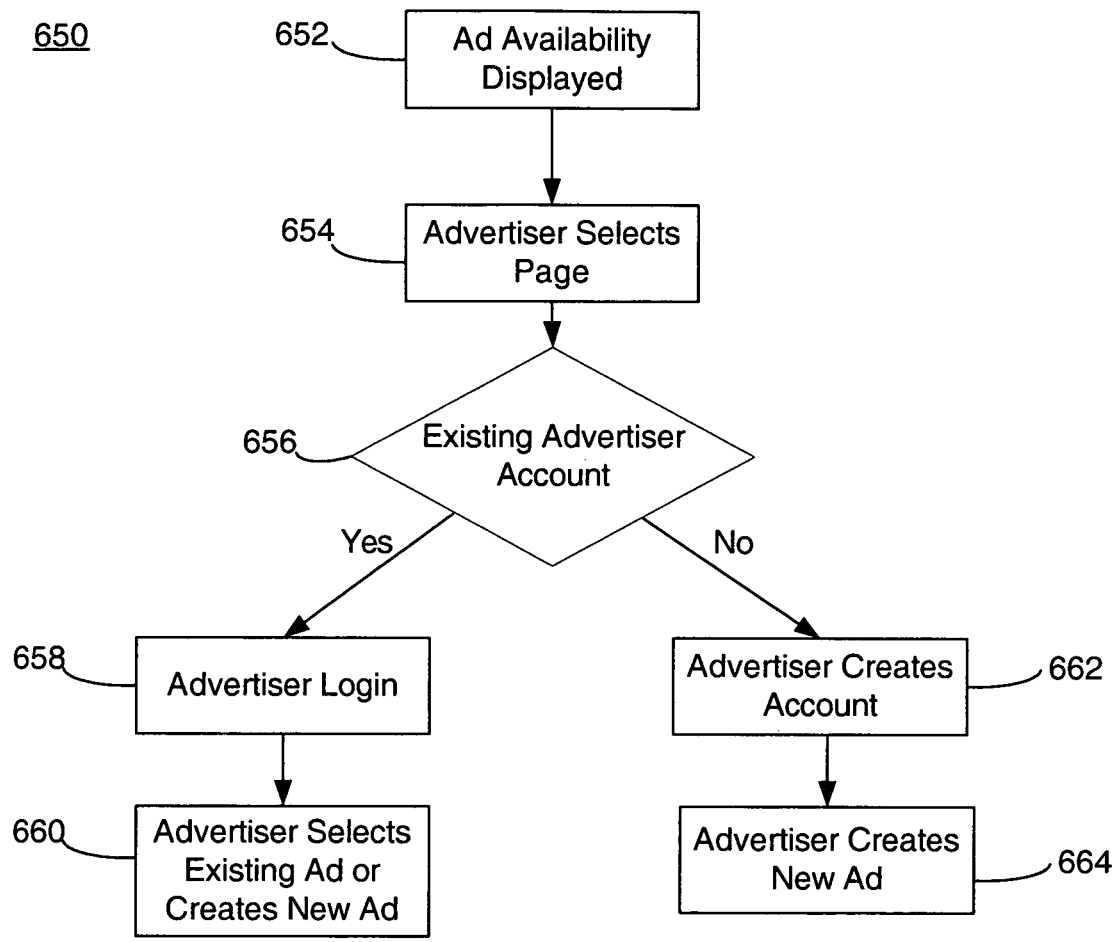
FIG. 46 illustrates a flow chart embodying an aspect of a method for targeting ads.

Any individual viewing web page 640 may, for example, wish to advertise a product or service, or broadcast a desired commercial, personal or political message in the space available for advertising, as represented by advertisement space 648. Advertisement space 648 may be in the form of an area dedicated to a banner, tower, or some other form of advertisement included in the page layout, or may be in the form of an interstitial advertisement or pop-up ad triggered by web page 640. FIG. 46 illustrates one embodiment of the process by which the individual creates or selects a page specific advertisement.

A page specific invitation to advertise link 649 provides the individual viewing that specific web page with the opportunity to fill the advertisement space 648, thereby advertising the ad availability 652. The page specific invitation to advertise link 649 may be in the form of a text hyperlink, a button, or any other means of directing the individual to a different web resource.

In one embodiment, a relationship exists between the request to advertise and the specific web page on which the request originates. A unique identifying key associates the ad that is to be specified for display with the specific web page. In one embodiment, this may be achieved through the use of a randomly generated global unique identifier (GUID) that is created for each new web page 640. In another embodiment, the universal resource identifier (URI) for web page 640 is used. Use of an URI allows the use of a preexisting unique identifier. The GUID or URI must be included in the request to advertise via the page specific invitation to advertise link 649.

The individual makes a page specific request to advertise 654. As the ad server processing the page specific ad requests may display ads on many pages of a site or many pages on many sites, and as the individual may wish to advertise on another page or site in the network, an account can be maintained for each individual that is an advertiser, or potential advertiser, on the network. Maintaining an account allows the advertiser to avoid entering certain information on a repeated basis such as personal identification information, billing information, and even specific ad details. In order to determine whether the individual has an existing advertiser account 656, a login screen may be presented after the advertiser selects the page on which they want to advertise 654. If an account exists, the advertiser logs in 658. As an existing advertiser, there may already be defined advertisements associated with the account. The logged in advertiser may then select an existing ad or create a new ad 660 to be displayed on the selected web page 640. If no account exists, account information may be entered and a new account created 662. A new advertisement is then created by the new advertiser 664. The ad may be created and include any of the targeting properties described in the RFRAS system and TAWS above.

As multiple advertisers may find advertisement space 648 on the same specific web page 640 attractive, providing an auction for the advertising space provides one possible model to handle pricing. In one embodiment, each new advertiser that indicates interest in advertising on a specific web page is presented with an incrementally higher CPM. In one embodiment, if they choose to accept the higher CPM, each advertiser that has been displaced from that advertising space is notified that the space is available at a higher CPM.

In one embodiment, a profile is maintained for each advertiser account. Information held in the profile may include, but is not limited to, area of business, specific web sites selected for advertising, URIs selected for advertising, subject or keywords in the content at each selected URI (information obtained using the scanning process described previously), a list of subject and keywords selected for targeting specific ads, and a list of subject and keywords selected for targeting ads in general. When a new web page is added to the ad server network, this addition may, in one embodiment, trigger recommendations to an existing account based on the profile collected for this account. For example, if the profile for a car manufacturer indicates that they have regularly advertised on a specific web site, when a new article is posted on this web site the system may alert them of this addition. In another similar example, if the profile for a car manufacturer indicates that they have advertised on pages where a competitor's brand name and car model type is displayed, if a new page exhibiting these criteria is added to the ad server network they may be alerted of this addition.

In one embodiment, the collected profiles are not viewed in isolation, but in comparison with other profiles using Bayesian or non-Bayesian statistical models. For example, if the profiles for two law firms indicated similar areas of business, or if the two firms had historically selected similar sites and web pages on which to advertise, the ad server might alert one when the other selects a page on which to advertise. In one embodiment, the ad server providing the page specific ad placement is a RFRAS. In one embodiment, the ad displayed on the specifically selected page is a targeted ad wrapper.

Proxy Advertising

In one embodiment of the present invention, a listing site may cooperate with an element to further both of their purposes. When referenced in this active manner, an element may be referring to a person, group of people, company, government or the like. In another embodiment, an element is an advertiser or a product or service that is the subject of advertising. In another embodiment, an element is a listing that appears without active participation by a person, group of people, company, government or the like, such as a item that appears in a search results listing page on a search engine. The cooperation of the listing site and element may be in the form of online advertising. The online advertising may be display advertising such as a banner, text advertising such as an inclusion in paid search, or an advertisement sent as part of, or an entire, email. The advertisement, in whatever form, directs the viewer to the listing site. In one embodiment, the advertisement directs the viewer specifically to an individual listing page. In order to maintain the advantages related to the perceived impartiality of a listing site, the advertisement, in one embodiment, makes no mention of the cooperating element. As the element may be referred to as an advertiser, and the listing site also, designation between the two advertising roles must be made. The element on the listing site will be referred to as a featured advertiser, and the listing site will be referred to as a proxy advertiser. In order to more fully illustrate the invention, several examples are now provided.

Figure 47:
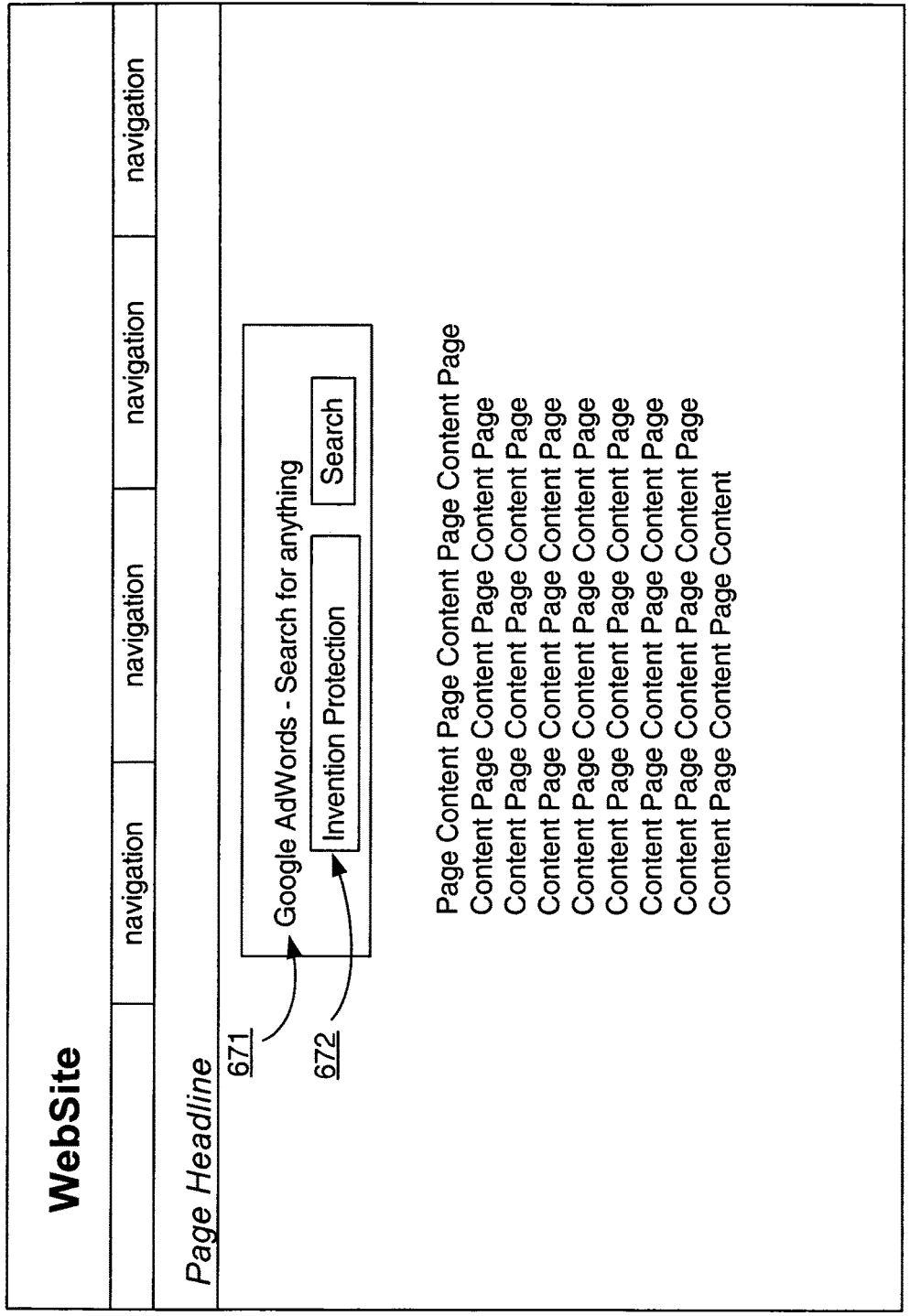
FIG. 47 illustrates one embodiment of an account details page.

For the first example, we will refer back to the featured advertiser using Google AdWords who associates their service with the term "invention protection." Together they may purchase an ad such as that in FIG. 47, representing a webpage 670 containing an ad. The ad displays the Google AdWords brand name 671 and a search bar with the search terms "invention protection" 672. In one embodiment, the click through destination for this advertisement is the Google website. In another embodiment, the click through destination for this advertisement is the Google listing page that results from the search terms "invention protection." Among the advantages in this embodiment of the system is the increased brand awareness for Google resulting from the exposure in the display advertising, and any user that clicks on this advertisement may be exposed to featured advertiser's element in the Google Adwords system. This exposure results without requiring a user to navigate to the Google site or requiring them to then chose the search terms "invention protection."

As another example, an intellectual property lawyer using a directory site may act as the featured and proxy advertisers respectively. The intellectual property law firm may have purchased a package that gives them higher ranking or featured status on the listing page of the directory site. As a proxy advertiser, the directory site may run a display advertisement or send out email marketing that highlights their intellectual property law listings. The resultant click-throughs may direct the viewer to the listing page with the intellectual property lawyer's featured listing.

Another example may be a singles site such as Lavalife®. Lavalife may create a listing page of "most eligible bachelors" or "most eligible bachelorettes." Each listed element on the page represents a subscribed member of the site. In one embodiment, the subscribers may improve their chances of being listed or straight out buy placement on the "most eligible" list. A subscriber could further enlist Lavalife as a proxy advertiser to direct traffic to the listing page.

Turning to an example where the preferential state is lower ranking or absence from a listing page, consider the list of least environmentally friendly companies. A company may develop a method of determining environmental friendliness that includes such factors as trash production, hazardous material disposal methods, toxic emissions, or any of the like. In one embodiment, another factor used in determining the ranking is the amount of money donated to environmental protection groups, lobbyists, or the company running the listing site. Online advertising may be employed to drive people to the listing site. The listing site may approach listed elements and offer them adjusted ranking, based upon their ranking method, by donating money to the listing site company. In one embodiment, portions of the proceeds may be used for additional advertising, while further portions are passed to environmental groups and a portion is maintained within the listing site company.

Another example of a preferential state situation may be the absence from a list on a review site or a page on an incidental listing site. For example, an article may point out the likelihood of certain sports utility vehicles to flip when turning quickly. If, for example, a company called Make manufactures vehicles called Model, and the Make Model and other Model products were absent from the list of vehicles likely to flip, Make may elect to subsidize proxy advertising on the listing site.

Figure 48:
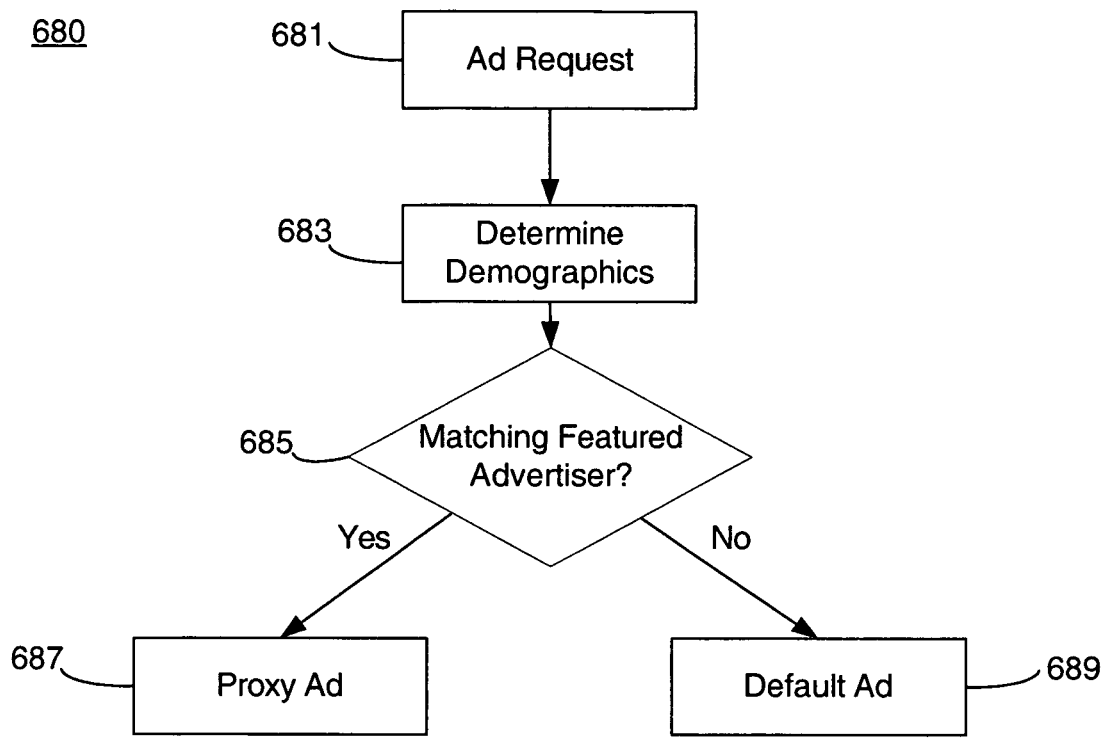
FIG. 48 illustrates a flow chart of one embodiment of proxy advertising.

In one embodiment, proxy advertising may employ RFRAS or TAWS systems. For example, if a featured element in a directory site has a geographic area in which it conducts business, the listing site may run proxy advertisements using a RFRAS system only within that geographic area. Alternatively, the directory site may run a general ad for the directory site as the default ad in a TAWS system. Geography is just one example of a selection criteria for whether to serve a particular proxy ad or not, or which proxy ad to select, and the selection criteria may include any individual or combination of targeting types. The element may also run an advertisement independent of the listing site. If the featured element desires additional exposure for its listing, a display ad that leads to that particular listing page can be included in the wrap when advertisements were displayed within the featured element's geographic area. FIG. 48 illustrates a flowchart 680 representative of a process for TAWS proxy advertising. First, an ad is requested 681. Next, demographics of the requester are determined 683. The demographic determination may be made by the web site on which the ad is to be displayed, by a TPAS, by some other demographic information provider, or a combination of these. The TAWS system then determines whether there is a featured advertiser matching the determined demographics 685. If there is a featured advertiser, a proxy ad for that featured advertiser is served 687. If no featured advertiser exists for the determined demographics, a default ad is served 689. In one embodiment, the default ad is an ad for the listing site.

In one embodiment, the proxy ad may be based upon a template proxy ad. A template proxy ad displays a basic template but includes a portion that is modified based upon some input. For example, an ad for Yellowpages.com might display the Yellowpages.com logo and offer the service of helping you "Find a plumber in," where that phrase is completed such as "Find a plumber in Evanston" based upon the determined location of the person viewing the ad. In this example, the click through link for the "Find a plumber in Evanston" ad may link directly to the Evanston plumber listing page, whereas a "Find a plumber in Chicago" ad may link directly to the Chicago plumber listing page. Such ad adjustment targeting may employ multiple confirmation targeting, as any proxy advertising may employ multiple confirmation targeting. Any destination link, reached by click through, may be adjusted based upon selection criteria for the proxy ad. In one embodiment, the destination link includes a proxy ad click through indicator. This may be in the form of an identifier added to the querystring or through some other URL manipulation. When a request for a page is received at the listing site, the listing site may check for a proxy ad click through identifier. The listing site may modify the destination listing page based on the presence of a proxy ad click through identifier. For example, if a featured advertiser has helped sponsor proxy advertising, that featured advertiser may be moved into a better page position based on the proxy ad click through identifier. Alternatively the listing site may redirect the user to a different page based upon the proxy ad click through identifier.

By way of another example, a chamber of commerce maintains relationships with many local companies. The chamber may run a chamber web site promoting the local business community, the site including a directory of chamber members and perhaps a featured company page or section of a page. An advertisement run promoting the community or the chamber is proxy advertising for the chamber members. If the click through destination for the proxy advertisement is a page including a featured chamber member that member may specifically subsidize the advertising. The featured status and the advertising that directs to the featured page may be sold separately from memberships, included as part of a membership, or included as part of certain membership packages.

Figure 68:
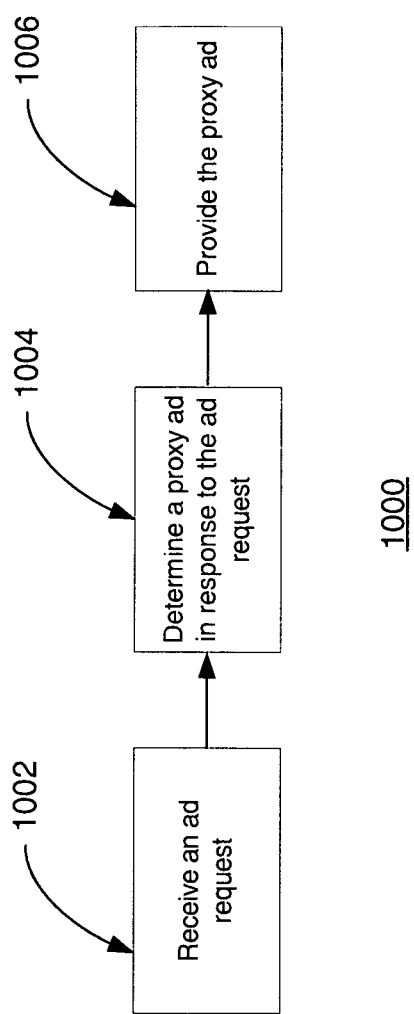
FIG. 68 illustrates a flow chart embodiment of providing proxy advertising.

FIG. 68 illustrates a flow chart embodiment of providing proxy advertising at 1000. A request is received for an advertisement 1002. A proxy ad is determined in response to the request 1004. The determination may be based on selection criteria. A proxy ad is provided 1006. The proxy ad may link to a listing page.

Multiple Confirmation Targeting

Figure 49:
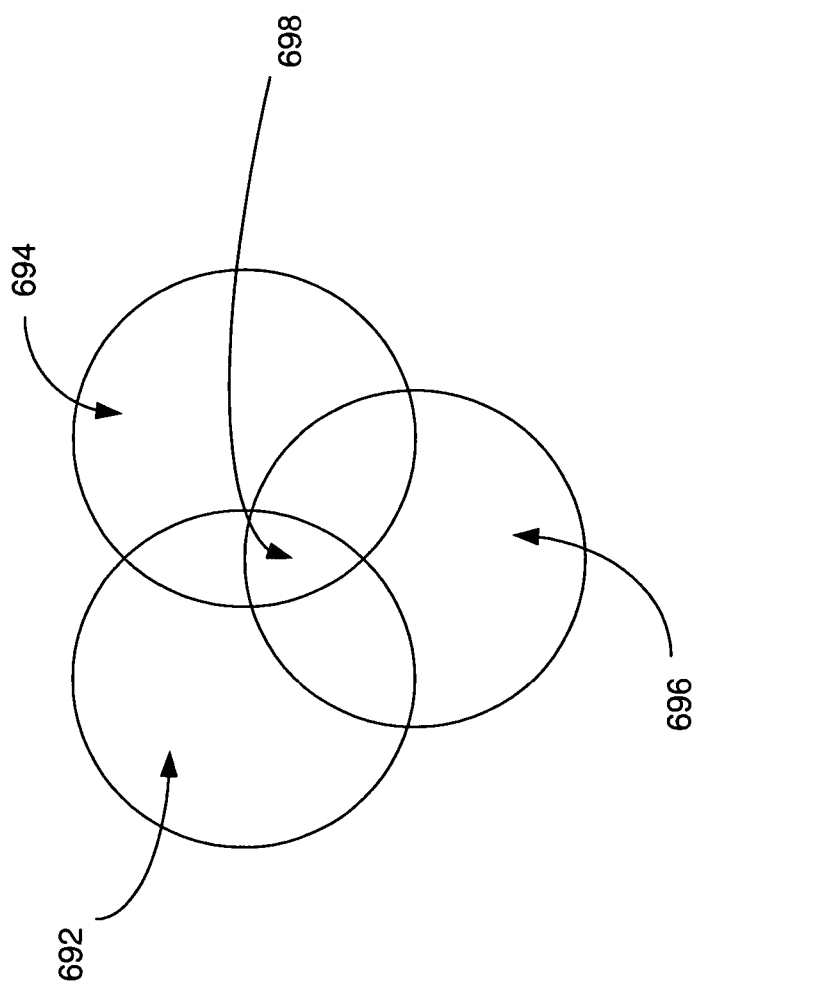
FIG. 49 illustrates one embodiment of multi-confirmation advertising.

Cooperative use of various methods of determining location may help decrease the likelihood of erroneously targeted advertising, or increase possible audience size depending upon how the data is cooperatively used. In one embodiment, an ad is only served if both profile-based and IP-based targeting agree on the location of the person viewing the ad. This is one example of multiple confirmation advertising. Additional sources of targeting confirmation, or characteristic confirmation input, may be employed, and targeting by other demographics may also be achieved through multiple confirmations. FIG. 49 illustrates a Venn diagram of multiple confirmation targeting 640 made up of three confirmations. A first characteristic confirmation input 692, for example IP-based targeting, indicates a certain set of ad requests fit a targeting criteria. A second characteristic confirmation input 694, for example profile-based targeting, indicates a certain set of requests fit the targeting criteria. A third characteristic confirmation input 696, for example contextual targeting by the content of a page, indicates a certain set of requests fit the targeting criteria. An ad or other content served based upon multiple confirmation targeting may selectively include only the requests 698 wherein multiple methods agree or are within a selected deviance of the requested targeting criteria.

Figure 50:
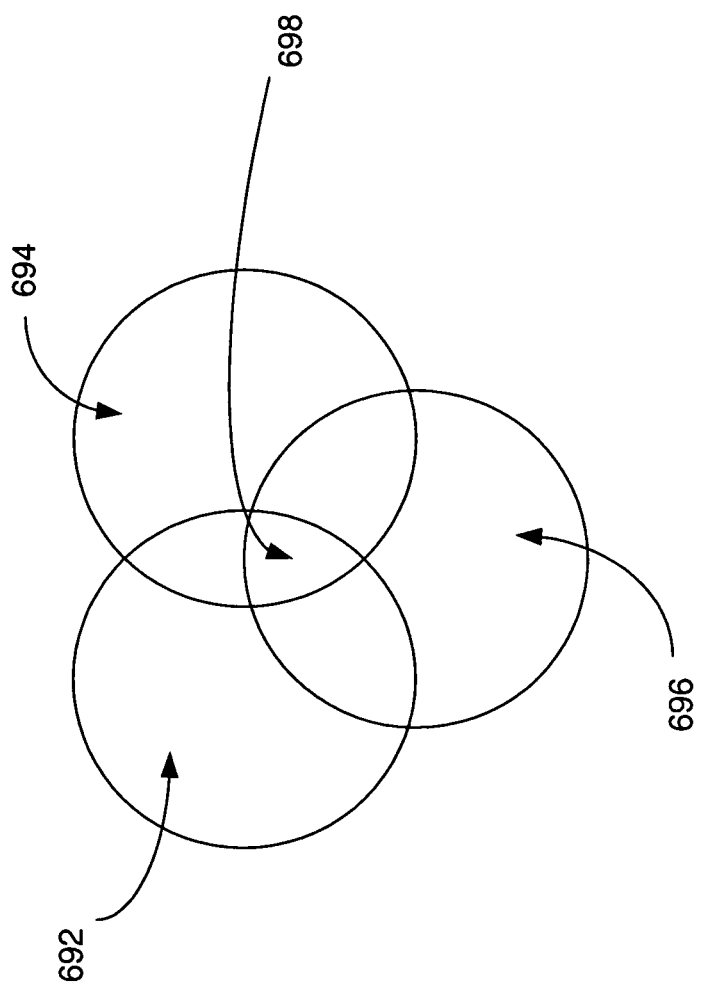
FIG. 50 illustrates one embodiment of union advertising.

FIG. 50 illustrates a Venn diagram of union targeting 700. The same three characteristic confirmation inputs are displayed 692-696. Using union targeting, each confirmed request 692-698 results in an ad or other targeted content being served.

Different levels of geographic targeting precision are available from profile-based and IP-based targeting providers. For example, many web sites only allow advertisers to target to the level of Designated Market Area (DMA), as defined by Nielson Media Research. In one embodiment, multiple confirmation targeting includes targeting to a particular city by serving ads using a TAWS system into a DMA using profile-based targeting, and then employing IP-based targeting to target the particular city. In one embodiment, multiple confirmation targeting includes targeting to a particular state based on zip codes established through profile-based targeting providing information in agreement with IP-based targeting. Any variety of combinations of precision provided by profile-based targeting, IP-based targeting, and desired targeting may be used in conjunction to provide multiple confirmation targeting or union targeting. The IP-based targeting may be provided by a website in conjunction with profile-based targeting. Alternatively, profile-based targeting may be supplied by a website, and a TPAS may supply IP-based targeting to provide multiple confirmation targeting. In one embodiment, the TPAS may also provide profile-based targeting either through information collected directly by the TPAS, bought by the TPAS, released to the TPAS by another provider, or gathered by the TPAS based on previously targeted campaigns including profile-based targeting. In one embodiment, multiple confirmation geotargeting entails serving an ad only when two geographic characteristic confirmation inputs overlap.

Various circumstances may arise in which multiple confirmation targeting or union targeting may be appropriate. For example, certain types of loans or loan rates may only be legally offered in certain states. A bank wishing to advertise available loans and rates may prefer, or be required by law, to be as certain as possible that they only display the offer to people in the state it is available in. In this example, the bank may select multiple confirmation targeting to selectively serve their ad. In another example, a political candidate may be running for a statewide position. In this example, the political candidate may determine that it is more important to serve an ad if there is any chance that the viewer may be within that state than to accidentally serve an ad outside the state. Selecting not to serve an ad because the viewer may not be in the state has the potential of missing the opportunity to sway a potential voter. In this example, the candidate's ads may be targeted using union targeting to provide the greater number of impressions delivered. Alternatively, the candidate may wish to stress a particular message in a particular region of the state and a different message in a different region of the state. In this case, the candidate may wish to use multiple confirmation targeting to assure that each message is targeted to the correct region.

Further levels of confirmation may be employed if so desired. For example, two or more IP-based targeting providers may be used in conjunction with or without profile-based targeting. For example, Quova™, NetAcuity™ and profile-based targeting may be used together. Again, using the additional method to determine geographic location or some other targeting attribute allows for potentially more accurate targeting by corroboration in multiple confirmation targeting, or for more total impressions to be served if union targeting is employed.

In one embodiment, an ad server may drop a cookie to track ad viewing by user as is known in the art. Coordinating media orders with multiple sites each providing independent profile-based or contextual targeting presents an additional method of confirming geographic location. For example, ads may be served onto a Yahoo!® property wherein the media order placed with Yahoo! requests ads profile-based targeted to the Chicago DMA. When a user views one of these ads, it is assumed that they are in the Chicago DMA. This same user then may visit the Washingtonpost.com, where another campaign is run from the same ad server, this time profile-based targeting 60201, a zip code in Evanston, IL which is a city in the Chicago DMA. Because the ad server has dropped a cookie on the end user's computer, the ad server may recognize, and optionally record, that the profile-based targeting on both Yahoo and Washingtonpost.com confirm the user's location in the Chicago DMA. In one embodiment, location confirmation may also factor in sites visited, if the sites may be assumed to target certain geographic locations, such as Metromix.com, a site that focuses on Chicagoland establishments, events, and available activities. In one embodiment, location information used when searching a directory site may provide additional confirmation information. In one embodiment, search terms entered into a search site may provide additional confirmation information.

A cookie that includes geographic information about the end user or that includes an ID that links to a server-based profile that includes geographic information is called a geocookie. A multiple confirmation cookie is a cookie that has had characteristic confirmation input information multiply confirmed in one of the manners described above or in some comparable manner. A cookie may be further termed a multiple confirmation geocookie. A multiple confirmation geocookie is a cookie that has had its geographic information determined from at least two different corroborating sources in one of the manners described or in some comparable manner. One advantage of a geocookie or multiple confirmation geocookie is that sites or sections of sites that do not maintain profiles and do not employ IP-based targeting may still employ geographic ad targeting. For example, some sections of Yahoo!® do not currently use the Yahoo!® profile for targeting. The front page of Yahoo!® is a current example. While this section and other sections may never require a user to log in, a cookie associated with one or more previous logins or associated with one or more previous IP-based geographic translations may still allow Yahoo!®, or an agency employing a TPAS employing geocookies, to sell targeted advertising to the front page.

Multiple confirmation geocookies may be maintained by a site, a cooperative of sites, an independent provider of multiple confirmation information, a TPAS, or an individual advertiser.

A multiple confirmation percentage may be established based on the percentage of an ad run or a portion of an ad run that meets multiple confirmation criteria. For example, an ad run may be targeted by profile based targeting into a particular DMA. A TPAS may provide DMA information based on IP address. Over a period of time a percentage of the total ad run may be determined for which the two characteristic confirmation inputs agree. This is a multiple confirmation percentage. Multiple confirmation percentage may be based upon agreement of more than two characteristic confirmation inputs.

Multiple confirmation percentage may be used to establish a price for an ad run. Using the previous example, we will term the portion of the ad run that did not meet the multiple confirmation criteria as overage. The overage may be sold at one price and the multiple confirmation ads at another price. Based upon the multiple confirmation percentage and a target profit for the entire ad run, a price may be established. For example, 60% of the ads in a 1,000,000-impression ad run meet the multiple confirmation criteria, the target sale price of the ad run is $20,000, and overage ads are sold at a $10 CPM. Based on these numbers 400,000 ads must be sold at a $10 CPM, leaving $16,000 as the price for the multiple confirmation portion. This implies a CPM of $26.66 for the multiple confirmation ads. Other formulas based on multiple confirmation percentage may be used to determine ad run pricing.

Political Advertising Interface

FIGS. 51-55 illustrate one embodiment of an interface for creating and managing online advertising campaigns for the political advertising market.

Figure 51:
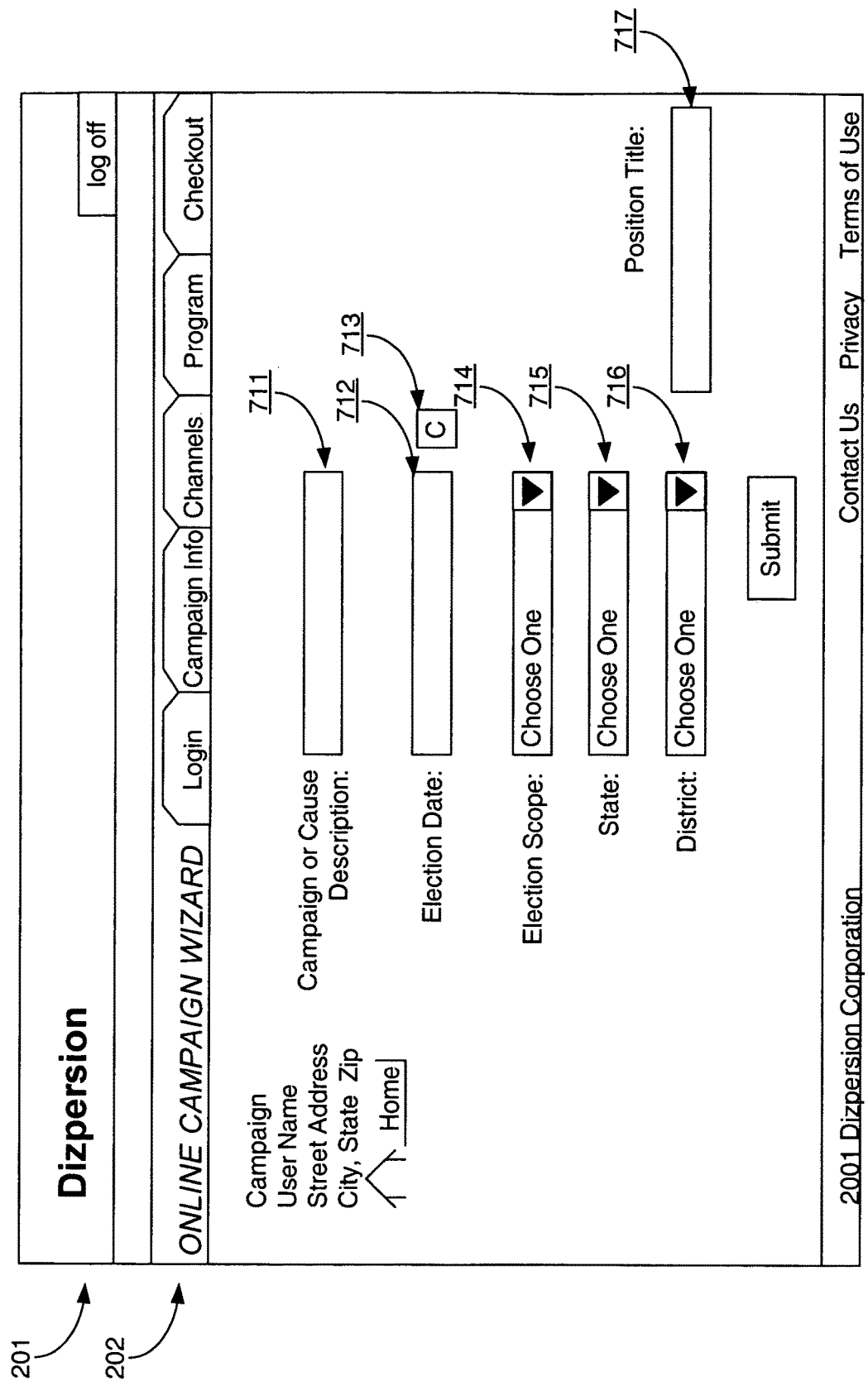
FIG. 51 illustrates one embodiment of a campaign description page.

FIG. 51 illustrates the campaign description page 710 of an online campaign interface for the political advertising market. Information entered, called political ad program criteria, may include campaign or cause description 711, the date of the election 712, and a set of election position select boxes 714-716. In one embodiment, a calendar 713 may be provided to select the date of election. In one embodiment, the date of the election is not entered, as the election date is stored in a database associated with the election position selected using the election position select boxes 714-716. In one embodiment, the election position select boxes begin by asking the country of the election 714. In one embodiment, the interface is country specific and the election position select boxes begin by asking the scope of the election. For example the election scope options may be federal, state, and local. The next election position select box 715 is then displayed based upon the election scope selection. For example if federal is selected, the following options may be displayed: president, senate, and representative. If state were selected, the next election position select box 715 would display the states. This process continues until the election position is reached.

Figure 52:
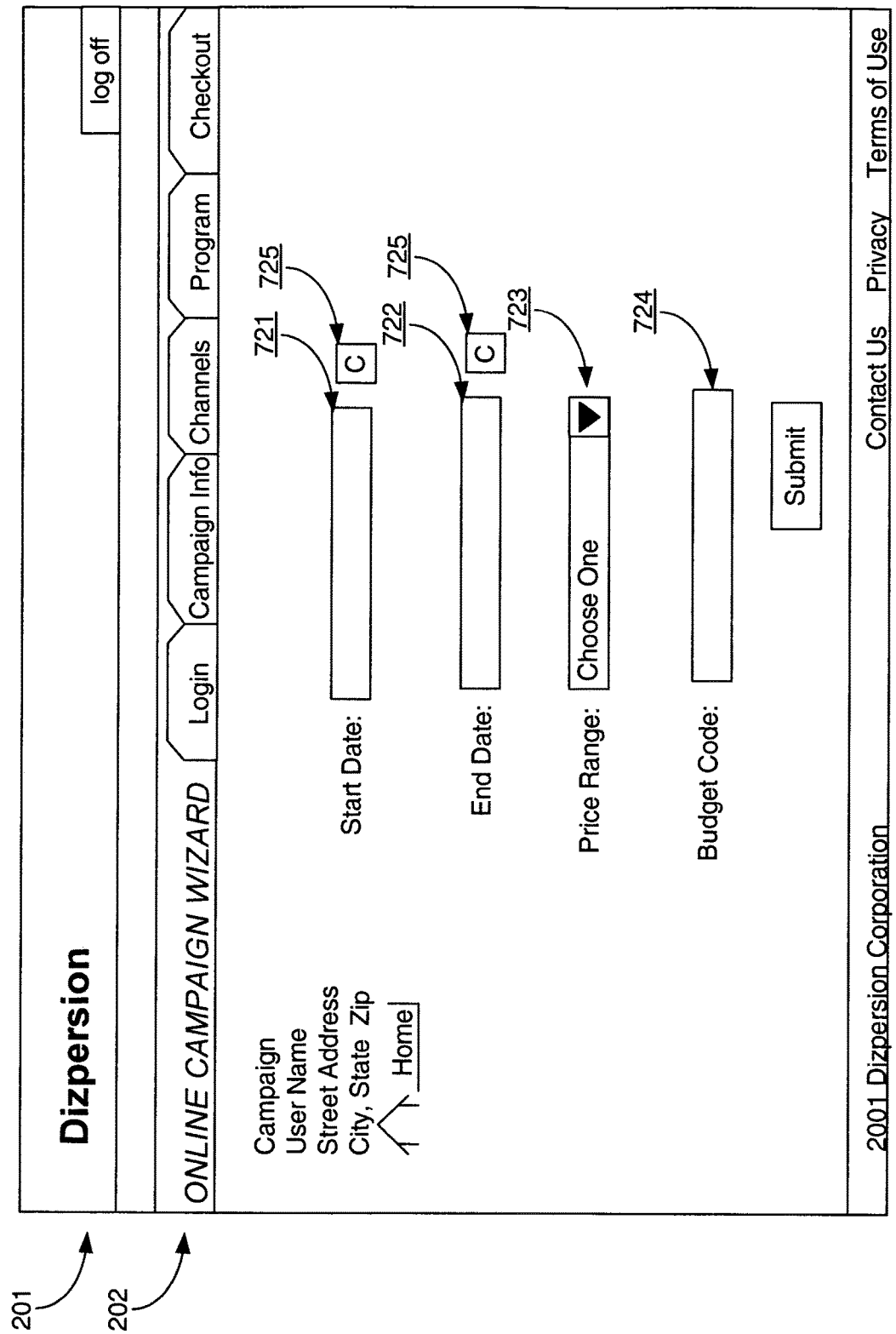
FIG. 52 illustrates one embodiment of an ad program specification page.

In FIG. 52 a page for establishing an ad program 720 is illustrated. Information relating to the ad program may include the program start 721 and end dates 722, a price range or ad program budget 723, and an ad program budget code 724. In one embodiment, the start and end dates may be selected using calendars 725. In one embodiment, the price range select box 723 includes information regarding any discounts that are associated with purchase levels. For example, the price range of an ad program costing over ten thousand dollars may indicate a 5% discount.

The budget code 724 may be used for a variety of purposes. In one embodiment, the budget code may entitle the user to a portion of a larger wrap. For example, the DNC, or some other political association, may purchase a large national ad run and supply individual campaigns with budget codes that allocate by geography, by dollar value, by site section or some other means, a portion of their ad run. In one embodiment, the budget code subsidizes at least a portion of the cost of the ads.

Figure 53:
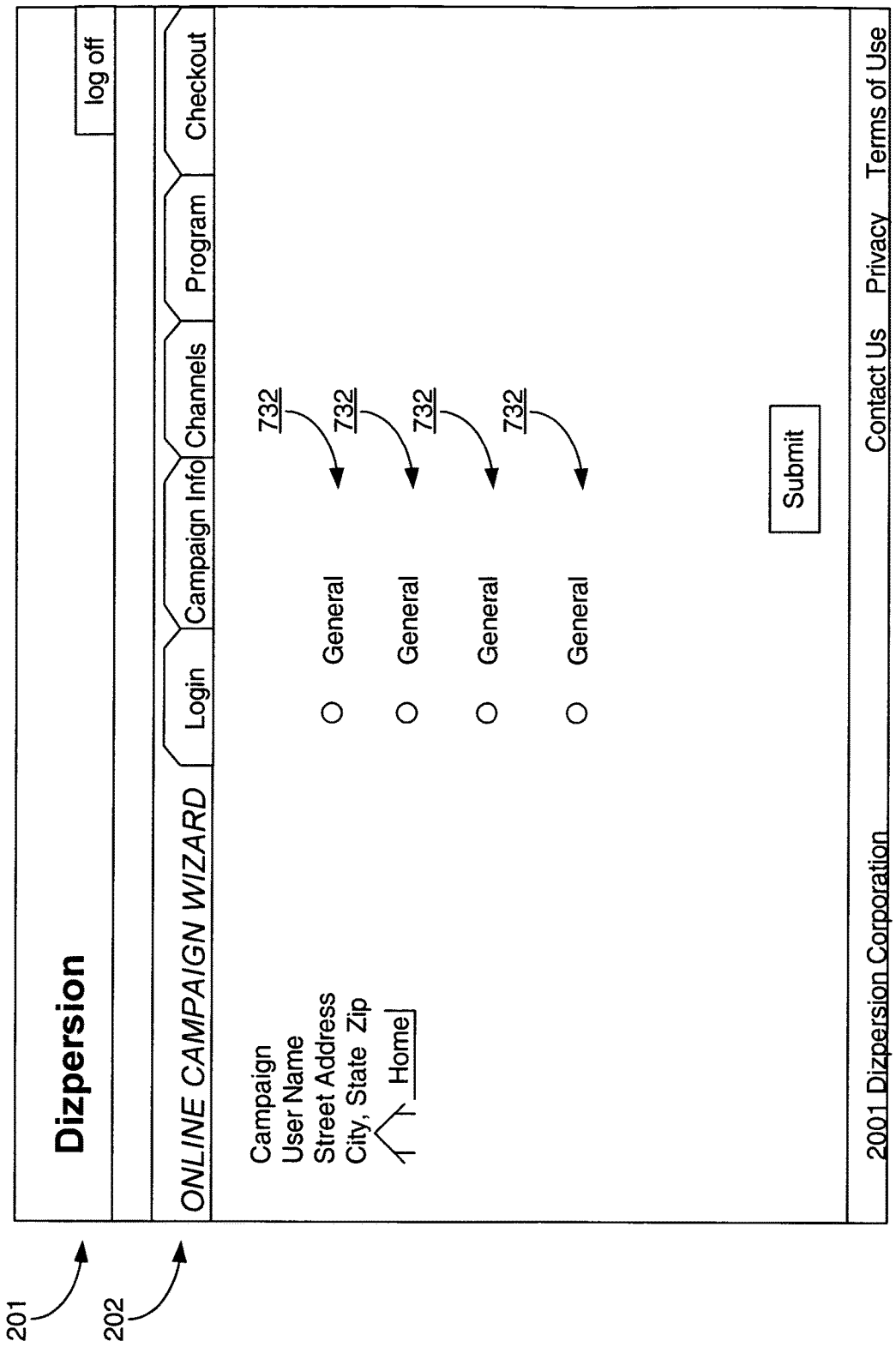
FIG. 53 illustrates one embodiment of an ad program subject selection page.

FIG. 53 illustrates a page for selecting the ad program subject 730. In one embodiment, the user may only select one of the subject options 732. Alternatively, the user may select more than one option 732.

Figure 54:
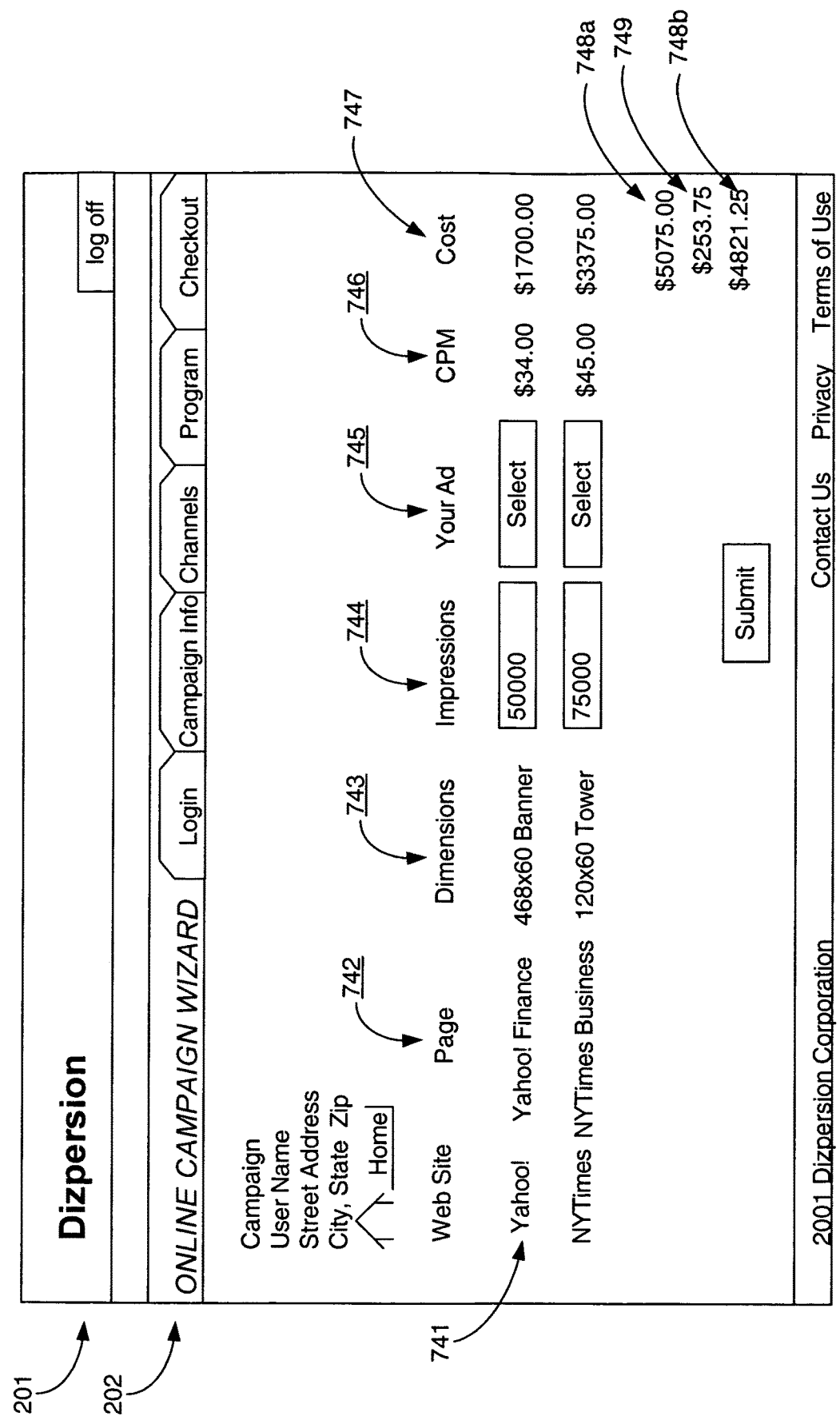
FIG. 54 illustrates one embodiment of a program recommendation page.

FIG. 54 illustrates a program recommendation page 740. In one embodiment of the invention, the program recommendation is established based on a combination of the information provided by the user regarding their campaign. In one embodiment, these pieces of information may include the selected election position, the subject of the advertisement, the price range, and the budget code. The determination of the suggested ad program may also take into account the geographic targeting required for the selected election position. For example targeting to an entire state may be less expensive that targeting a local school district, and the suggested ad program would reflect this expense. In one embodiment, only sites that are able to target with the required precision for the election position would be listed. In another embodiment the suggested program may also take into account the selected ad program run dates to determine the availability of inventory on one or more web sites. This information may be provided by current availability information shared by each web site, or based on historical availability.

Program recommendation page 740 includes information such as the suggested web site 741, site section or page 742, display ad dimension 743, number of impressions 744, CPM 746, and total cost of each suggested placement 747. The interface may also include an ad selection button 745 for each suggested placement that allows the user to select or create an advertisement for that particular placement. In one embodiment, the program recommendation includes total program pricing including pricing before any discounts 748a, any discounts included 794, and the final price of the campaign post-discounting 748b.

Figure 55:
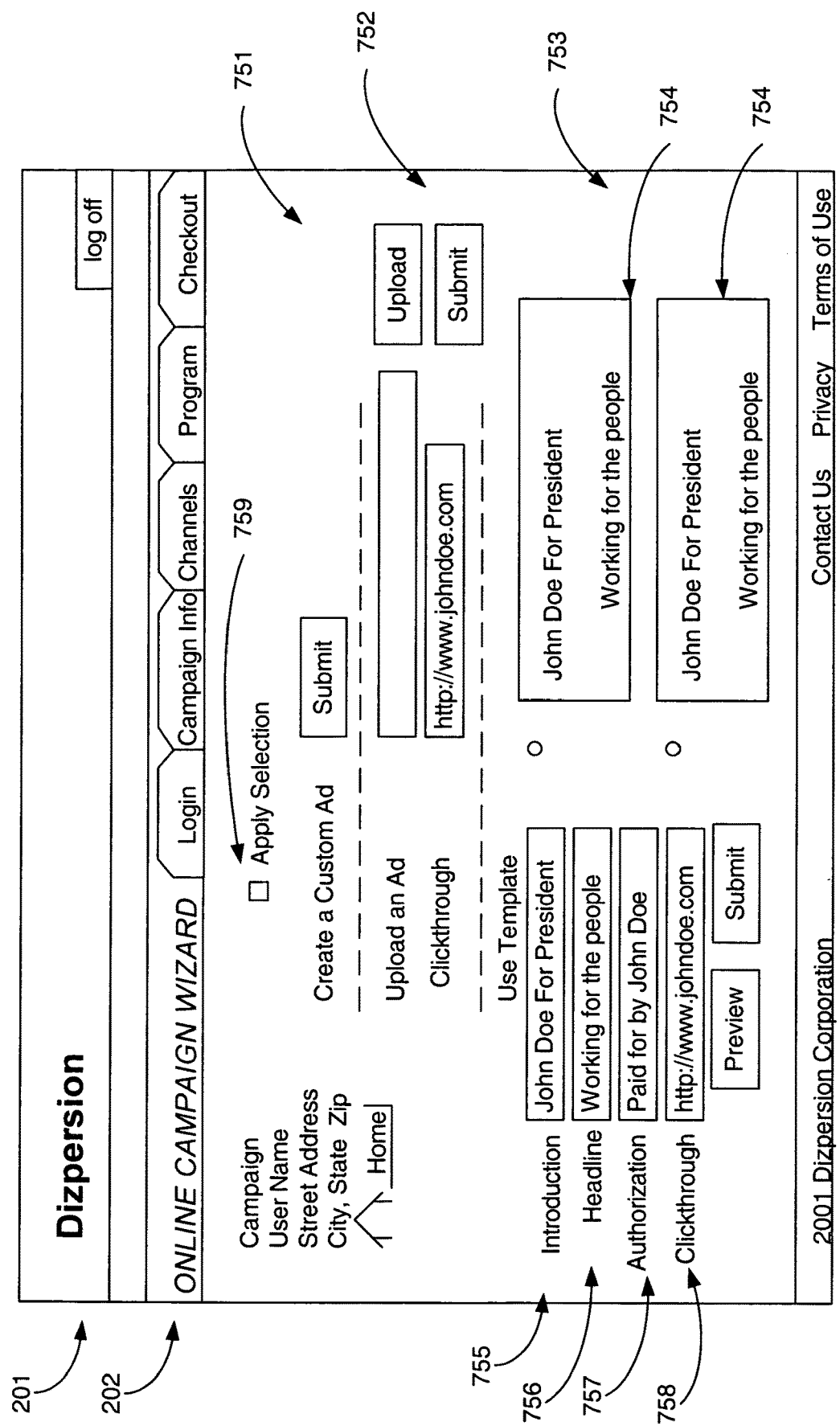
FIG. 55 illustrates one embodiment of an advertisement selection page.

FIG. 55 illustrates a page for selecting an advertisement 750. The page may be broken down into three ad selection options. The first option 751 allows the user to specify that they wish to have a custom ad created. The second option 752 allows the user to upload an existing advertisement, and to specify the click through destination. The third option 753 allows the user to select one or more templates 754 and to customize them by providing text such as an introduction 755, headline 756, and authorization 757, along with a click through destination 758. In one embodiment, the template customization may also allow the user to upload a photo, for example, of a candidate. The page may also include an apply selection option 759 to allow the user to apply the selected choice to all other ads in their recommended program. If the apply selection option 759 and the first option 751 are selected this indicates that they wish to have all custom ads created. If the apply selection option 759 and the second option 752 are selected, the ad will be applied to all suggested ad runs that use that ad dimension. If the apply selection option 759 and the third option 753 are selected the templates may have been grouped into general template styles; the selected template style is applied across all ads. Political ads may have regulations applied to them. The supplied templates and associated template text elements may aid the user by making sure that all required elements and other regulations are followed in the ad content.

Tracked Multi-Dimensional Advertising

One embodiment of the present invention includes the use of cookie based tracking to record the effect of multi-dimensional advertising. Multi-dimensional advertising is the use of two or more forms of online advertising.

In one embodiment, a cookie is used to track users who view proxy advertising. In one embodiment, if the user later uses the listing site that was the proxy advertiser, this is recorded. In one embodiment, if the user navigates to the listing page that was the destination click through of the proxy ad, this is recorded. In one embodiment, the search terms, click trail or other input used to reach the listing page is recorded.

In one embodiment, correlations may be drawn between impressions on a listing site of people who have and have not viewed display or proxy advertising for that element previously.

Progressive and Associative Advertising

Figure 56:
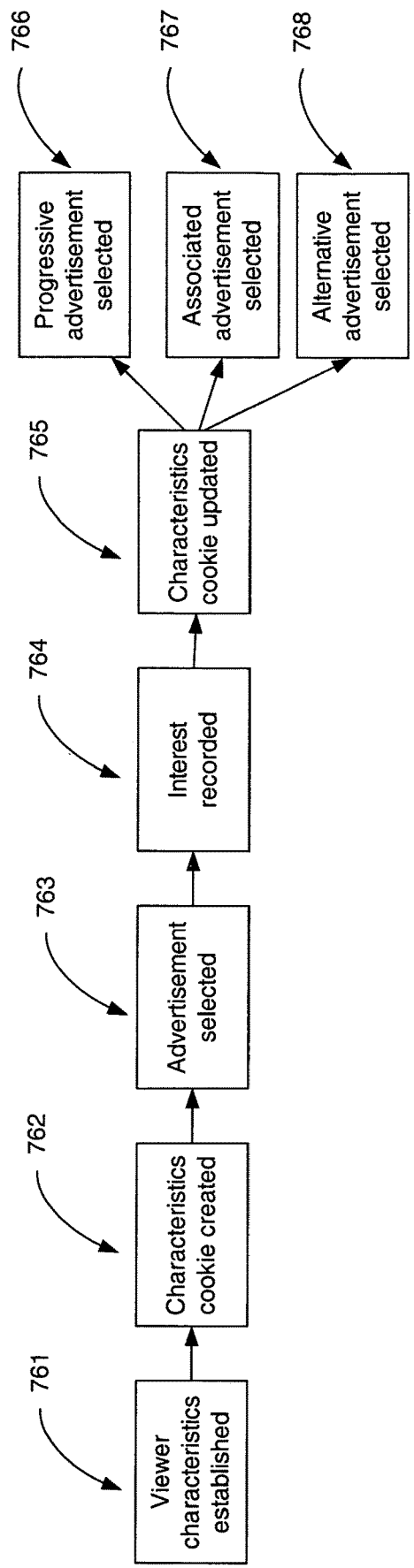
FIG. 56 illustrates a flow chart embodiment of progressive and associative advertising.

FIG. 56 is a flowchart representing a method of displaying progressive and associative advertisements 760. When a user of a website is to view an advertisement, certain characteristics of the viewer may be presumed. For example, any profile based targeting information or IP-based geographic determination may be assumed as established characteristics 761 of the viewer. A characteristics cookie is dropped 762 in order to maintain a profile of the characteristics of the viewer. In one embodiment, the characteristics information is stored in the cookie, alternatively an ID is stored in the cookie that is associated with the characteristics information stored in a server-side database. An initial advertisement, called a base advertisement, is selected 763 for display based on the characteristics information.

When the advertisement is displayed, the interest level the viewer has in the advertisement is recorded 764. In one embodiment, the interest level is established by whether the viewer clicks on an advertisement. In one embodiment, the ad interest level is established by the amount of time the viewer interacts with an interactive advertisement, or the time the viewer's mouse is over the advertisement. In one embodiment, information may also be recorded regarding navigation throughout a click through destination site of an advertisement, including information regarding any purchases, account signups or the like. In one embodiment, ad interest level will also be established in part based upon the viewer of the advertisement going to the click through destination site not based upon click through but later in their surfing. In one embodiment, different interactions with the advertisement or click through destination site will result in different interest level assignments to the viewer. Based on the ad interest level, the characteristics cookie is updated 765. Alternatively, a different or new cookie may be used to maintain ad interest level data.

In one embodiment, if a high ad interest level is shown, but the viewer does not purchase, sign up, or in some other way result in a conversion for the advertiser, a progressive advertisement may be selected 766 at the next advertising opportunity. A progressive advertisement may be, for example, an advertisement for the same advertiser that includes further information about their product or service, or information regarding a discount for the product or service.

In one embodiment, if a high ad interest level is shown, even for example including a conversion, an associative ad may be selected 767 at the next advertising opportunity. An associative advertisement may be, for example, an advertisement for a complementary product either available through the same advertiser or through an entirely different advertiser.

In one embodiment, if a low ad interest level is shown, an alternative ad is shown 768 at the next advertising opportunity. An alternative ad may be, for example, an advertisement for an unrelated product or service. In another embodiment, the alternative ad may promote a product for an entity associated with the base ad. In an example of such an advertisement, subsidiaries of a single parent corporation may share advertising buys and operate as base and alternative advertisements for each subsidiary.

For example, a car manufacturer may wish to advertise a particular car model. If the viewer of the advertisement clicks on the advertisement, but does not fill out a form requesting a dealership contact them, at the next advertising opportunity an ad may be displayed for the same car model that includes information about a specific discount off retail price. If the viewer does fill out the form requesting a dealership contact them, then the next advertisement displayed may be one regarding auto financing options. If little interest is showed in any of the advertisements for that car model, an advertisement for another model may be displayed.

In one embodiment, the progressive, associative, or alternative ad may be an ad, message, special promotion or coupon sent via an IAP interface, as described below. Alternatively, banner ads or other audio/visual ads may be run.

Geographically Targeted Content Distribution

One embodiment of the present invention includes the ability to target site content. While much has been discussed with regards to targeting advertisements, it has also been mentioned that this may include targeted video, audio, or any other form of web content. In one embodiment, the web content may be a segment of HTML that represents one or more portions of a web page.

Figure 57:
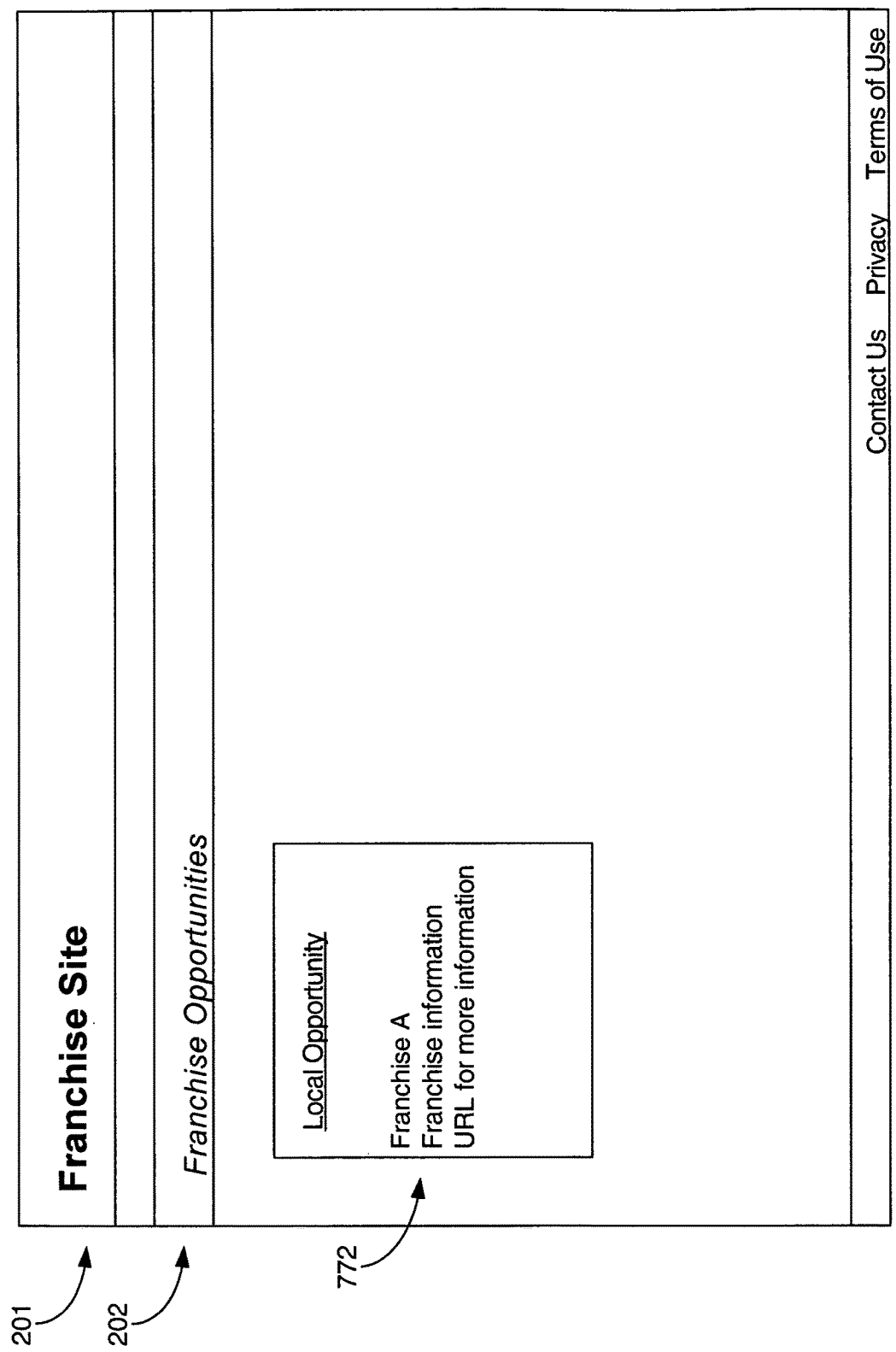
FIG. 57 illustrates one embodiment of targeted content distribution.

For example, FIG. 57 illustrates the front page of a site specializing in displaying franchise opportunities 770. Users of the site may be able to search for franchise opportunities available in their area. In one embodiment, a portion of the front page 770 or some other page of the franchise opportunity site may vary based upon IP-address based targeting to display local opportunities 772. In one embodiment, the site may sell various advertising packages wherein certain packages include a featured listing on the front page of a site or of a particular section of the site. For example, a sandwich franchisor may currently have available franchise locations in the Detroit, Chicago, and Minneapolis areas. In one embodiment, this franchiser may have their featured franchise listing be displayed on the front page when a user of the site comes from one of those areas. In one embodiment, the franchiser may select not to serve into an area in which they've reached their target concentration of stores, or the franchiser may choose to be featured in an area they currently have no presence in. Alternatively, the franchiser may choose to not be featured in states or areas in which the franchisor is legally precluded from offering franchises for sale, or the franchisor may choose to only be featured to viewers in states where the franchisor is legally able to offer franchises for sale.

In one embodiment, the franchise opportunity site or another entity may offer advertising opportunity to franchisors in the form of online display advertising. This advertising includes a TAWS system wherein the default ad is an ad for the existing franchise locations or wherein the default ad is an ad for available franchise opportunities. For example, if a sandwich franchise wanted to open new locations in Elgin and Evanston, Illinois, and already had stores in the Chicago area, a wrap could be created for the Chicago DMA that advertises the franchise opportunity in Elgin and Evanston and advertises the existing locations when the ad is viewed in other areas. Alternatively, the franchiser may wish to advertise its product into all areas it currently has stores, and as a default ad it may use an ad for the franchise opportunity. In one embodiment, the content of an IAP, including default textual content served, can be modified based on geotargeting, as described below.

360 Ads

One embodiment of the present invention includes an advertisement containing 360 degrees of a photographed or videoed scene. Using multiple fish-eye lenses, and stitching images together, a 360-degree panoramic view can be created. In order to view the stitched image or video, special viewing software is typically required. In one embodiment, a programmable web content format such as java or Macromedia's Flash® product may be used to create a program that appropriately presents the stitched image or video. Such embodiments may allow the viewer of a 360-degree advertisement to move throughout the provided scene. In one embodiment, the viewer of the advertisement does not have navigational control, but the navigation is programmatically determined. For example, a scene photographed or videoed at a political rally may begin focus out in the middle of the crowd and eventually pan to the candidate as the final focus. In one embodiment, there may be a programmatically determined route throughout the scene that may be overridden by viewer intervention. In one embodiment, the same 360-degree advertisement may vary how it is displayed on each viewing. For example the starting point, pan directions, pan speeds, direction and speed changes may all be randomly determined when the ad program begins. In this way, a single ad using a single stitched image or video may appear entirely differently on each viewing. In one embodiment, programmatic bounds or only a certain set of options may be employed to help ensure more pleasurable viewing. In one embodiment, a cookie may be maintained specifically for the 360-degree advertisement in order to record the previous parameters that determined how the ad was viewed. Using the information in the cookie the ad can programmatically ensure that the same viewer never views the ad twice in the same way. In one embodiment, the initial parameters used are recorded along with click through rates in order to determine the most successful initial parameters.

Figure 58:
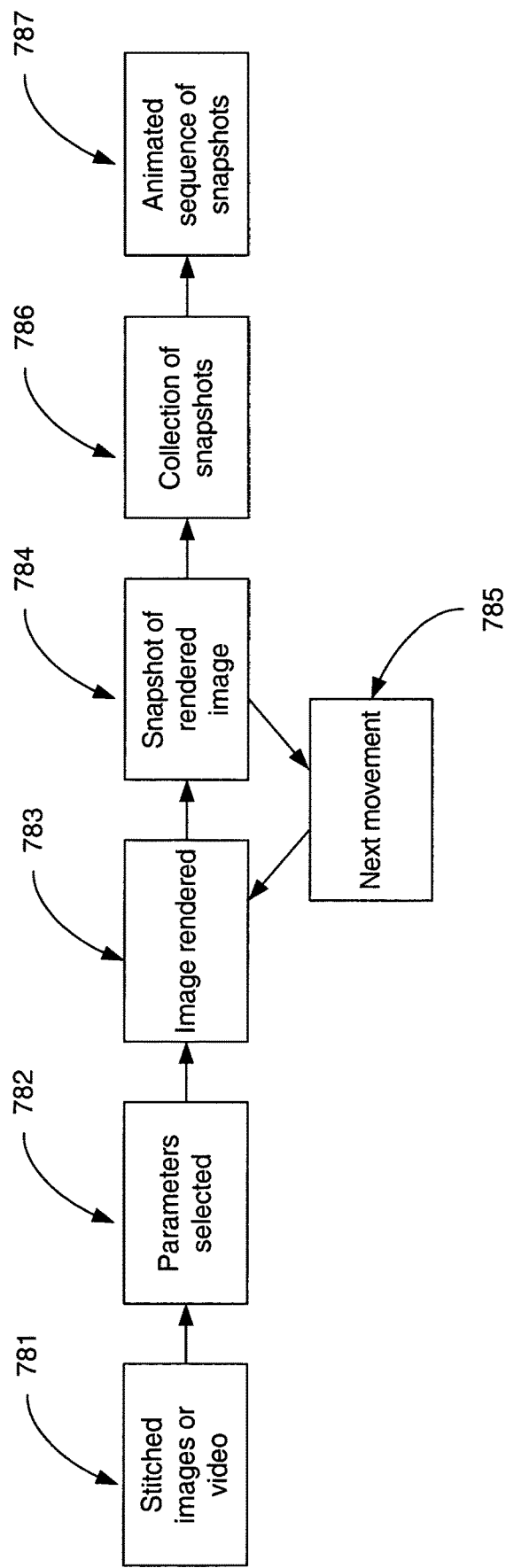
FIG. 58 illustrates a flow chart embodiment of distributable 360 degree advertising.

FIG. 58 illustrates a method by which a 360-degree advertisement may be created 780 that does not require custom viewing software at runtime. Stitched images or video are obtained 781 using the necessary 360-degree lenses and stitching software. Parameters are selected 782 that determine the path through the stitched image or video. At a selected frame rate the images or video is programmatically rendered 783 and a snapshot of the rendered image or video frame is saved 784. The next movement within the scene is then made 785. The rendering 783 and saving of the snapshots 784 continues until the desired movement is complete. This results in a collection of saved snapshots 786. Many formats may be used to create an animated sequence of these snapshots 787 including GIF, MPEG, Flash and many others.

In one embodiment, a 360-degree advertisement is used to attract attention to another advertisement. For example, a 360-degree advertisement may include a person pointing in a certain direction. As the 360-degree advertisement progressively pans the direction the person is pointing may change. When the progression is complete a floating ad appears in the direction the person is pointing. Alternatively the floating ad may follow the pointing finger throughout the progression. A person pointing is merely exemplary and a variety of other manners of attracting attention to a point may be alternatively employed. The attention may be directed to any form of ad or content including ads, content, promotions, or the like on an IAP, as described below.

Structured Information Format Fed Advertising

Figure 59:
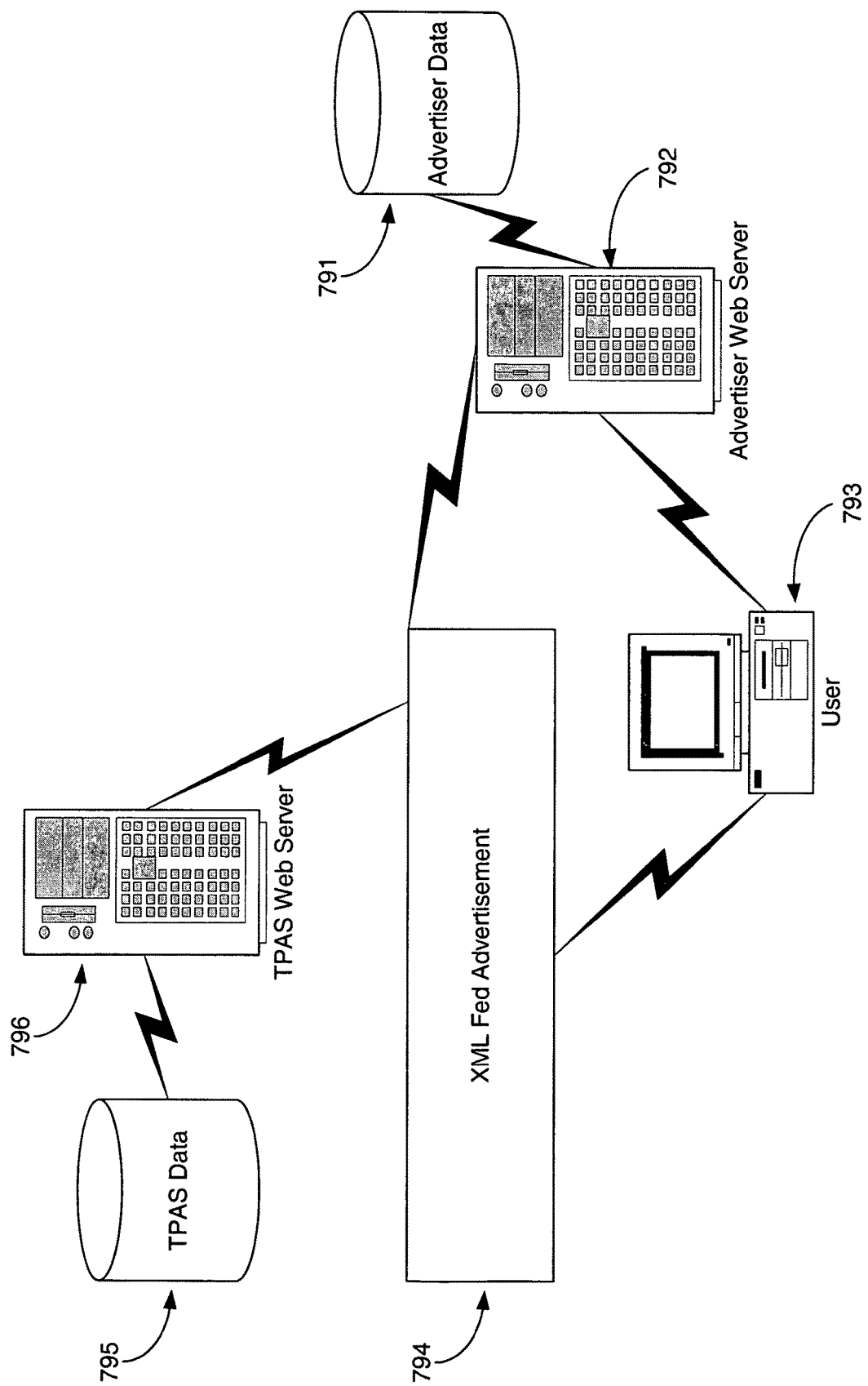
FIG. 59 illustrates one embodiment of XML-fed advertising.

FIG. 59 illustrates a system for providing structured information format fed advertisements 790. Structured information formats include comma delimited files, XML, and the like. For exemplary purposes XML will be the structured information format referenced, but it should be understood that XML may be replaced by any structured information format. It should be further understood that the portion of an XML fed advertisement that exists independent of the XML information, for example static text or graphics, may be called a template ad. For example, a banner advertisement may include a static portion, including, for example, the logo of a company, and an XML fed portion, for example, a promotion based upon one or more selection criteria, including, for example, IP-based geographic information, profile-based geographic information, demographic data, profile data, page content, site categorization, and/or information included in the ad request. Many advertisers hold information regarding their products or services and any special pricing on their products or services in one or more advertiser databases 791. An advertiser may supply access to this product, service, and pricing data via an advertiser web server 792. Information of advertiser web server 792 may be directly accessed by user 793 using a standard web browser, viewing the advertiser information at a website. Alternatively, user 793 may view the information through an XML fed advertisement 794. In one embodiment, the XML fed advertisement 794 pulls data directly from a web service on advertiser web server 792. In one embodiment, the XML web service may be available directly from the advertiser database 791. Regardless of the specific server from which the information is requested, the act of retrieving data from the advertiser may be referred to generally as requesting the data from the advertiser database. TPAS web server 796 may serve XML fed advertisement 794. In this embodiment TPAS data 795 does not hold the specific product, service, and pricing data for the XML fed advertisement 794.

Figure 60:
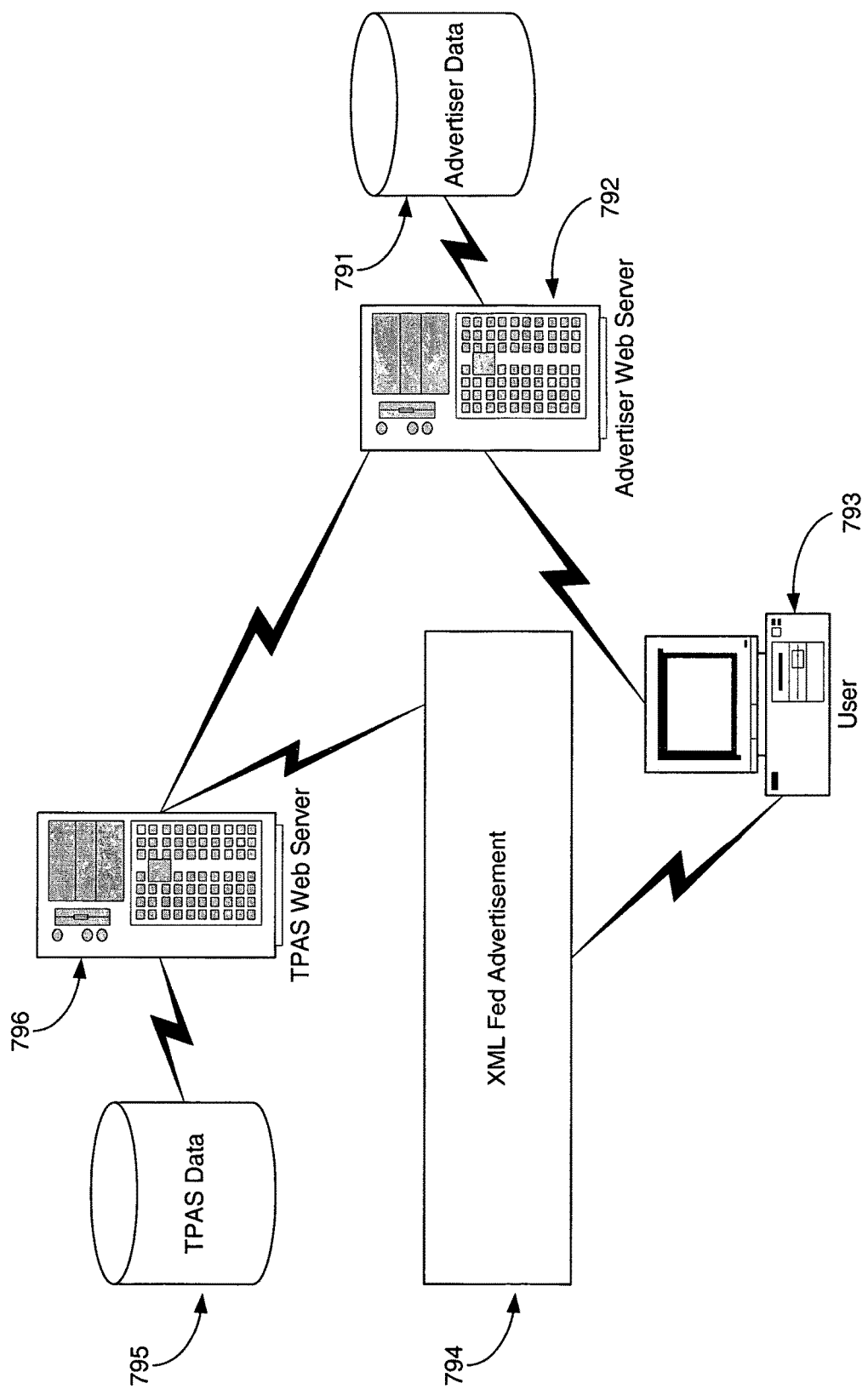
FIG. 60 illustrates a second embodiment of XML-fed advertising.

FIG. 60 illustrates an alternative embodiment for a system for providing XML fed advertisements 800. In this embodiment, TPAS web server 796 communicates directly with the XML web service on advertiser web server 792. Data collected from advertiser database 791 via advertiser web server 792 may be stored in TPAS database 795. In this embodiment, when XML fed advertisement 794 is displayed, the data displayed is drawn from the TPAS as opposed to directly from the advertiser web server 792 or database 791. XML data may be updated each time the ad is displayed, or updated on a periodic basis.

Figure 67:
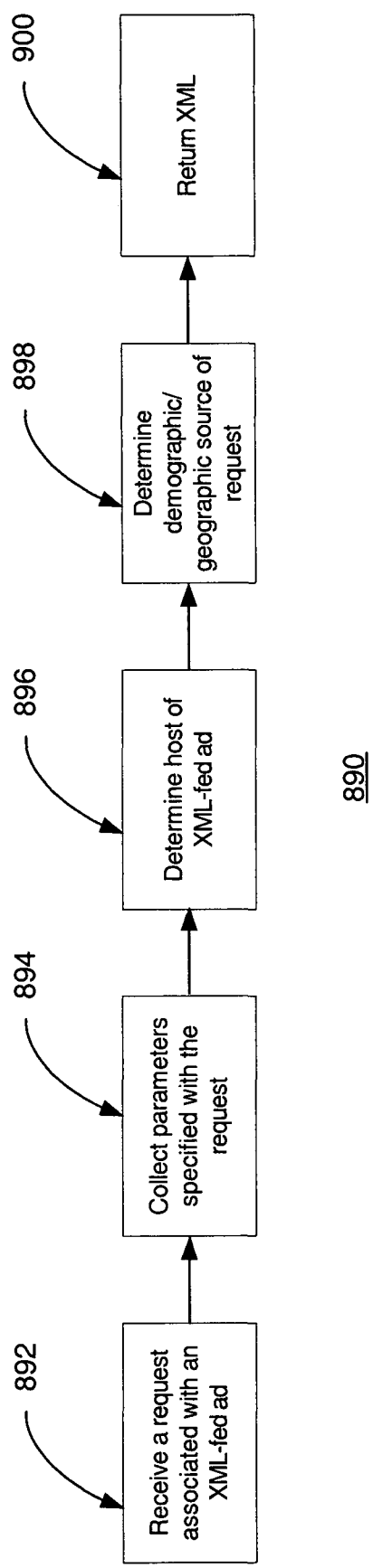
FIG. 67 illustrates a flow chart embodiment of XML-fed advertising.

FIG. 67 illustrates a flow chart embodiment of XML-fed advertising at 890. A TPAS or other structured information format data server receives a request associated with an structured information format data fed ad 892. Parameters associated with the request may be collected 894. In one embodiment, the host site on which the ad is to be served may be determined 896. Further determinations of demographic or geographic information associated with the request may be determined 898. The TPAS or other structured information format data server then returns structured information format data 900.

One example use of an XML fed advertisement is an advertisement for an online travel agent such as Orbitz. The Orbitz site and promotional emails display flight specials to and from various locations. It would be useful to display the current flight specials in display advertising. An advertisement served by a TPAS may pull XML information directly from the Orbitz advertiser database or web server. In one embodiment, the TPAS may determine the location of the user using IP-based targeting, profile-based targeting, or multiple confirmation targeting. Based upon the determined location the XML fed advertisement for Orbitz displays local travel specials. For example, if a user is determined to be in Chicago, travel specials originating at Midway or O'Hare airports may be displayed.

In other embodiments, demographic and optimization information, as described below, may also be used alone or in combination with geographic information to determine what information is pulled and displayed in any audio and/or visual ad or content, including ads or content on an IAP, as described below.

Advertising Optimization

One aspect of the present invention provides for the ability to optimize network advertising. It would be useful for an ad server to include the ability to make optimization recommendations or automatically optimize ad runs based on a variety of targeting methods and other ad characteristic inputs. Examples of ad characteristic inputs include the site, site section, or page onto which the ad is served, the profile information, geography, time of day, day of the week, time of the year, or other determinable demographic information regarding the viewer of the advertisement. Ad characteristic inputs may be multiple confirmation targeting characteristics. Proximity to holiday dates may also be noted and recorded independently of the specific day of the year. For example, the date of Easter varies each year, so it may be important to note an ad impression was served one week prior to Easter along with the specific date itself.

Figure 61:
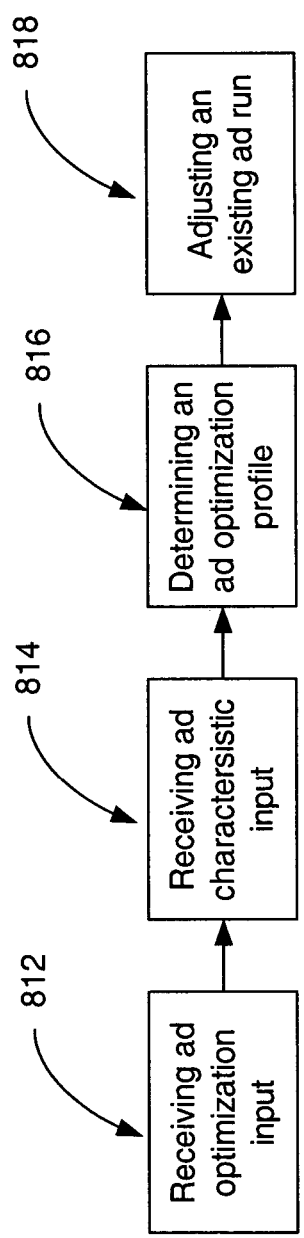
FIG. 61 illustrates a flow chart embodiment of optimizing online advertising.

FIG. 61 illustrates a method of optimizing online advertising 810 based upon ad characteristic inputs. When an advertisement is served, a variety of interest levels may be observed regarding the present ad. Viewed in the context of ad optimization, this interest level is received as ad optimization input 812. Also received is one or more than one ad characteristic input associated with that particular ad impression 814. For example, an ad run may be targeted based on a profile held by the web site hosting the ad run. Targeting information for that ad run may be stored on the ad server and may be provided to the ad optimization program. Further ad characteristic inputs such as, for example, IP-address, geography associated with the IP-address, time independent of or including time zone adjustment, and other time and date information may be provided to the ad optimization program. The ad characteristic input or inputs may be stored individually along with the ad optimization input for that particular ad. The ad characteristic input or inputs may be stored in a collection or vector associated with the ad optimization input for that particular ad. For example, it may be recorded that positive ad optimization input provided by a male user was received on a particular ad. Separately it may be recorded that the positive ad optimization input was received on that ad in Washington D.C. It may also be recorded that a male in Washington D.C. was the source of the positive ad optimization input. Based on the ad optimization input and the one or more characteristic inputs, an ad optimization profile is established for the ad 816. In one embodiment, the ad run from which the ad impression came is adjusted based upon the ad optimization profile 818. Alternatively, recommendations based on the optimization profile may be made to the advertiser or an agent of the advertiser and individually accepted or rejected.

In one embodiment, an optimization profile includes an ad category indicator. An ad category indicator is used to indicate some characteristic of the advertisement that may place it in common with another ad. For example, an ad category indicator can be the advertiser placing the ad, the keywords or other targeting applied to the ad, text or keywords in the advertisement itself, or a category entered freeform or selected from a list of options such as, for example, retail, legal, food service, or the like. Based on one or more common ad category indicators and the optimization profiles associated with existing ads, the ad server may recommend or automatically optimize a second ad run.

For example, if a first family law practice ran an ad that targeted keywords "family law" an optimization profile associated with their ad may also contain those keywords as an ad category indicator. When a second family law practice places an ad run request including the keywords "family law," the optimization profile of the ad run for the first family law practice's ad may be applied to the second practice's new ad.

In one embodiment, an ad run is also associated with a cost profile. The cost profile may be based on CPM, CPC, CPA, and any other ad costing method or any combination of methods. Certain ad characteristic inputs or combinations of ad characteristic inputs will generate more positive ad optimization input than others. Based on a limited availability of ad inventory meeting those characteristics, prioritization of what ads are delivered may be required. Ad space may be provided based at least in part on cost profile. If an advertiser input a cost profile to their ad run, for example offering one dollar as a CPC rate, at least portions of what would be their recommended ad optimization profile may be prohibitively expensive, and the ad optimization profile associated with their ad may be determined based upon the cost profile. Alternatively, based on an optimization profile, a cost profile or ad run price may be determined. For example, the practice targeting "family law" may have an optimization profile that will place them in rotation at a ten-dollar CPM. Meanwhile, a practice targeting "intellectual property law" may have a more popular and expensive optimization profile that requires a twelve-dollar CPM to place their ad in rotation. In this manner, the price of an ad run may be determined based upon an optimization profile.

In a system containing multiple ad runs and multiple optimization profiles, it is likely that conflicts between optimization profiles will arise as described based upon a limited inventory of ad space. By examining the individual ad optimization profiles in conjunction with cost profile input, an overall optimization profile for the system may be determined.

In one embodiment, the ad optimization system may take into account more than just the interaction with an advertisement. Various return on investment (ROI) measures may be tracked separate from an advertisement. For example, an advertiser may apply certain value to the printing of a coupon, the submission of a form, navigation to one or more web pages, an online purchase of a service or product, or the like. ROI measures may be received as ad optimization input. In one embodiment, an ROI tag may be placed on a web page that processes a form submission on an advertisers website. When a user of the computer network views the advertiser's ad, a cookie recording that ad impression may be placed on the user's computer. If the user clicks through to the advertiser's website and then submits a form, the processing page with the ROI tag is requested. Based on the cookie it is determined that this user came to the site based on the advertisement, and the ROI is attributed to that ad. In one embodiment, an ROI tag allows the advertiser to specify an ROI value. ROI value may be on an arbitrary scale or tied to a monetary unit. For example, an advertiser might assign an ROI of twenty-five cents to each page visited on their website and one dollar and fifty cents to a form submission. In one embodiment, the payment to the ad server may be based upon the value of the ROI tags. For example, the ad server may receive one cent for someone viewing an ad, ten cents for someone clicking on the ad, twenty-five cents for each page visited on the advertiser's site, and a dollar for the user submitting a form requesting a quote for service or product purchase. Any or all of these may be taken into the ad cost profile and optimization profiles adjustment.

In one embodiment, the ad optimization systems and methods described may be managed by a TPAS using a TAWS system, or this system may be employed by website as its method of serving advertisements. In one embodiment, the optimization system is configured to read cookies left by advertising. As described above, cookies may represent a variety of information that the optimization system may use to determine profile information regarding a user. In one embodiment, the cookie left by advertising is a multiple confirmation cookie.

For example, the optimization system may determine that a particular product or service is popular among certain demographics. For example, the optimization system server may indicate that 21-34 year old men in Evanston, IL respond to advertising for pizza between 11 pm and 2 am on Friday nights, to a greater extent than 34-45 women in Highland Park, IL In response to this determined greater interest ratio, the optimization system may display advertising messages for pizza providers on the optimization system for all 21-34 males in Evanston during 11 pm and 2 am on Friday nights. Likewise, the optimization system may determine that 34-45 women in Highland Park respond well to advertising offering baby clothing between 11 am and 2 pm, and display advertising for baby clothing to each 34-45 woman in Highland Park. These ads can also be cycled through an IAP based on the optimization determination, as described below. In addition, the frequency at which the ad is displayed may be increased or decreased based on optimization determinations.

Furthermore, the optimization system may determine demographic similarities between geographies, and extrapolate results from one geographic area to another geographic area. If the optimization system determines that certain demographic similarities exists for multiple geographic areas, the determined areas are termed Demographically Similar Geographically Diverse Areas (DSGDAs). For example, the optimization system server may determine, based on a demographic similarity input, that Highland Park, IL and Scarsdale, NY are DSGDAs. In another example, a list of DSGDAs is predetermined and provided to the optimization system for general usage, or usage by a particular optimization system advertiser. A demographic similarity input may comprise census data, data collected by survey organizations such as Nielsen® or based on advertising data collection as described herein. Based on a determined demographic similarity, advertising that is determined to be effective in Highland Park, IL may result in advertising in Scarsdale, NY.

In yet another embodiment, the optimization system monitors for an optimization input. This may include a variety of inputs including those previously described along with, for example, completed sales, depositing a product in a shopping cart, submission of a predetermined level of information, viewing a predetermined number of pages at an advertiser site, or any other conversion. Along with the optimization input of one user, the optimization system receives the contents of at least one of the user's cookies, such as a multiple confirmation cookie. The results of the optimization system review of the cookie are maintained in the optimization system. The optimization system, in one embodiment, may determine that certain messages may be desirable to demographically similar users. For example, a user who is an 18-34 male in Evanston, IL sees an advertisement for a fantasy hockey league and becomes a successful conversion as defined by the fantasy hockey league. The optimization system records that an 18-34 male in Evanston, IL was a successful conversion for a fantasy hockey league. In response to the recorded successful conversion, the optimization system may adjust to increase display of fantasy hockey league advertising to 18-34 males in Evanston, IL In addition, the optimization system may display fantasy hockey league advertising to other DSGDAs, such as, for example, Ann Arbor, MI.

In another example, DSGDA targeting is premised on statistical models. In one example, optimization system advertising is displayed only if a predetermined percentage of a demographic is noted as a successful conversion.

A method in accordance with these examples includes providing a demographically and geographically targeted ad and leaving a cookie in response to the provided ad. The optimization system accesses cookie data to determine at least one of a demographic characteristic and a geographic characteristic. In one embodiment, the optimization system provides the at least one demographic characteristic and geographic characteristic associated with the user. The optimization system then displays a second advertisement to a demographically similar, geographically diverse user.

Template Advertising Opportunities

Advertising opportunities that result in particularly high interest levels may be recognizable and recurring in nature. For example, the hours just previous to lunch or dinner are likely to indicate high interest levels for restaurant advertising. Tuxedo advertising may result in high interest levels for men who are engaged to be married. Nightclub and movie advertising may result in high interest levels each weekend. While these template opportunities may be as simple as the above case of recognizing a time of day for restaurants, they may involve much more complex templates. For example, a template may be based upon online behaviors such as visiting certain sites or searching for certain words, or the like. Additionally, a template may be based upon profile information obtained directly from a profile or via profile-based targeting from a third-party site. Further, a template may be based upon factors external to the user such as time, day, IP-based geographic targeting, demographics, or the like. Some templates may be based on a nature sketch. A nature sketch is a quality that may be displayed in a variety of manners. For example, a template advertising opportunity may include a competitiveness attribute. Applying an individual to the competitiveness attribute may be done in variety of ways, the only part necessary to them falling into the template opportunity that the attribute is expressed in some way. For example, competitiveness may be attributed based upon the results of a personality profile the user filled out, or based upon frequently checking scores in fantasy leagues, interest in sports, gambling sites, or the like.

Determining an opportunity to exercise a template advertising opportunity may be achieved in a variety of ways. Using the example of a man engaged to be married, this information may be directly volunteered by the user. The user may have provided this information erroneously, and therefore a degree of certainty may be applied to the likelihood that this is the expected template opportunity may be assigned. If profile information suggests that the user is male there is a larger degree of certainty that they are a man engaged to be married than if they were simply an anonymous user. If this user, recognized as male, also is visiting wedding registry sites, the degree of certainty again increases. Based upon the attributes provided regarding each user, a template advertising opportunity system may apply a degree of certainty that a user is in each template advertising opportunity.

Advertisers may be provided the opportunity to associate one or more ads with a template advertising opportunity. The advertiser may further select a degree of certainty that a user is in the template for their advertisement to be displayed.

Template advertising opportunities may be discovered in a variety of ways. There may be an understood causation that leads to the creation of a template. This is called a determined template. For example, one may recognize that DSGDAs that represent college markets display high interest levels on travel package advertising in the month of February. Upon examination one recognizes that this interest is due to college spring breaks that begin the following month. Based on this recognition the college spring break determined template may be created.

An alternative method of recognizing template advertising opportunities employs past advertising and interest level information, such as the ad optimization system previously described. The ad optimization system is capable of recognizing abstract templates, these may be made up of what seem to be random characteristics that combine to increase positive optimization input. Examination of the characteristics may explain the template advertising opportunity, allowing descriptive titling, but in some cases the cause of the template may remain unknown. Both determined and abstract template advertising opportunities may be made available to advertisers. An advertiser may be queued for a user who enters a template. Alternatively an advertiser may request to advertise to users already in a template.

Multilevel Marketing Embodiment

Figure 62:
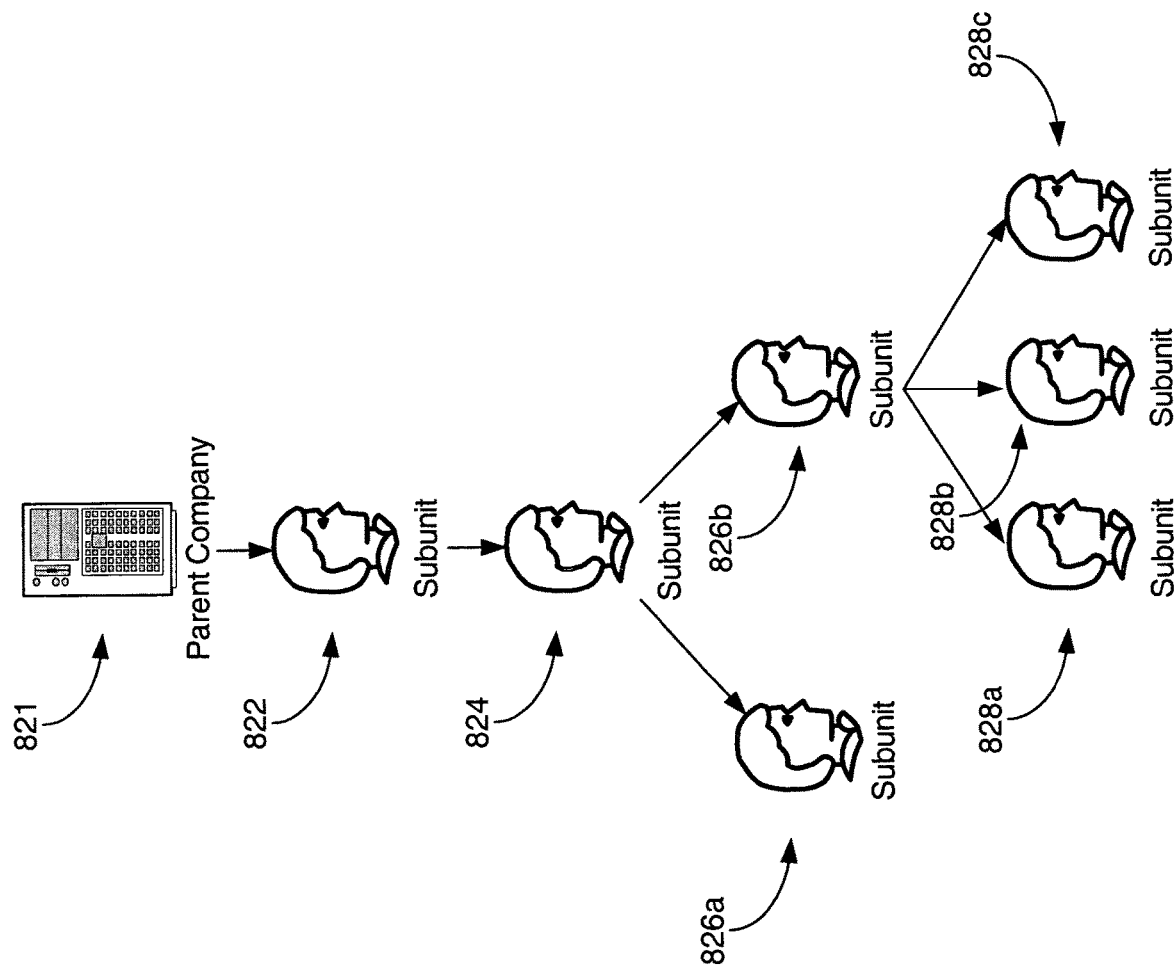
FIG. 62 illustrates a tree sales structure.

FIGS. 6-12 illustrate one embodiment of an interface for creating and managing online advertising campaigns. In one embodiment, this interface may be accessed by or licensed to an individual business unit, contractor, or franchise, these various entities collectively called subunits. FIG. 62 illustrates a tree sales structure 820 for the organization of one or more subunits as a sales organization. The tree sales structure includes at least a parent entity and a child entity. Tree sales structure 820 displays these as parent company 821 and a subunit 822.

There are a variety of ways a subunit parent company 821, and the advertising product. In one embodiment, the parent company 821 owns one or more websites that may provide a portion or the entirety of the advertising product to a subunit. Alternatively, the parent company 821 obtains advertising product from a third party. In one embodiment, a subunit may be required to purchase a certain amount of advertising inventory as part of the agreement with the parent company 821. This advertising may be part of a larger wrap run by the parent company 821. In one embodiment, the subunit runs ads for its own advertising services as the default ad in their wrap that is a portion of the parent company wrap.

For example the parent company 821 may purchase advertising at a two-dollar CPM. In one embodiment, the parent company 821 may advertise the opportunity to run a subunit of the company with the ad space. The parent company 821 then enlists a subunit 822 to sell the advertising at a price of four dollars. The parent company 821 pays the subunit 822 thirty-two cents per thousand ads sold. If that subunit 822 signs up a subunit 824 below it, then subunit 822 may receive sixteen cents per thousand ads sold by its subunit 824. In this way compensation for each subunit is based upon its tree position. If the price paid to each subunit for each subunit level below is one half of the commission, the maximum payment asymptotically approaches sixty-four cents on the ad, leaving the parent company with a minimum profit of one dollar and thirty-six cents. In one embodiment, the total size of a subunit's wrapper-including all of the ads for the subunits below it-affects the CPM that subunit is charged for its ads. For example, subunit 826b may be initially charged a ten-dollar CPM for ten thousand ads. If subunit 826b chooses to commit to one hundred thousand ads, or if the addition of the ad commitments for subunits 828a, 828b, and 828c bring the wrap for subunit 826b to one hundred thousand ads, subunit 826b is charged only an eight-dollar CPM. Each subunit, as stated, may choose to advertise the subunit opportunity with their allotted ads or to find advertisers to use the inventory they've committed to. In one embodiment, a subunit may receive a commission payment for signing up a subunit directly below it, or perhaps also a commission for each subunit signed up on the chain below it. For example, subunit 824 receives one hundred dollars for signing up 826a and 826b. Subunit 824 may then receive an additional fifty dollars when it's child subunit 826b signs up 828a, 828b and 828c.

In one embodiment, each subunit may be provided with a customized or branded interface. The parent company 821 maintains a database of the relationships between each subunit and the commission structure. Parent company 821 also determines an aggregate ad buy based on the sales commitments of all subunits. For example, if all subunits collectively have sales commitments of ten million ads, parent company 821 may determine that an aggregate ad buy of ten million ads is required. The cost to obtain ads may vary based upon the quantity, placement, and other characteristics of the purchase, so the cost of each ad in the aggregate ad buy may vary based upon these factors. Parent company 821 may determine the cost of subunit sales commitments based on the determined aggregate buy.

In one embodiment, the aggregate ad buy is managed in a TAWS system. For example, the aggregate buy represents the outermost wrap, and each subunit sales commitment represents a wrap within the outermost wrap. The tree sales structure 820 is an organization for the sales and use of ads; any method of targeting may be employed in the distribution of ads including multiple confirmation targeting, progressive advertising, associative advertising, structured information format fed advertising, and advertising on an IAP, as described below.

RSS Feed Advertising

One embodiment of the present invention includes a system and method of supplying and tracking advertisements included in an RSS feed or other page description language feed. RSS is one example of a page description language used for information syndication to content aggregation sites, and the present invention is designed for use with any RSS format, other XML formats, as well as other page description languages. While many formats of RSS exist, for illustration purposes, here is one example of a page that would be returned:

```
<rss version="0.91">
    <channel>
        <title>site.com</title>
        <link>http://www.site.com/</link>
        <description>site.com description.</description>
        <language>en-us</language>
        <item>
            <title>Site Article, Part 1</title>
            <link>http://www.site.com/article1.html</link>
            <description>This is a first article.</description>
        </item>
        <item>
            <title>Site Article, Part 2</title>
            <link>http://www.site.com/article2.html</link>
            <description>This is a second article.</description>
        </item>
    </channel>
</rss>
```

Figure 63:
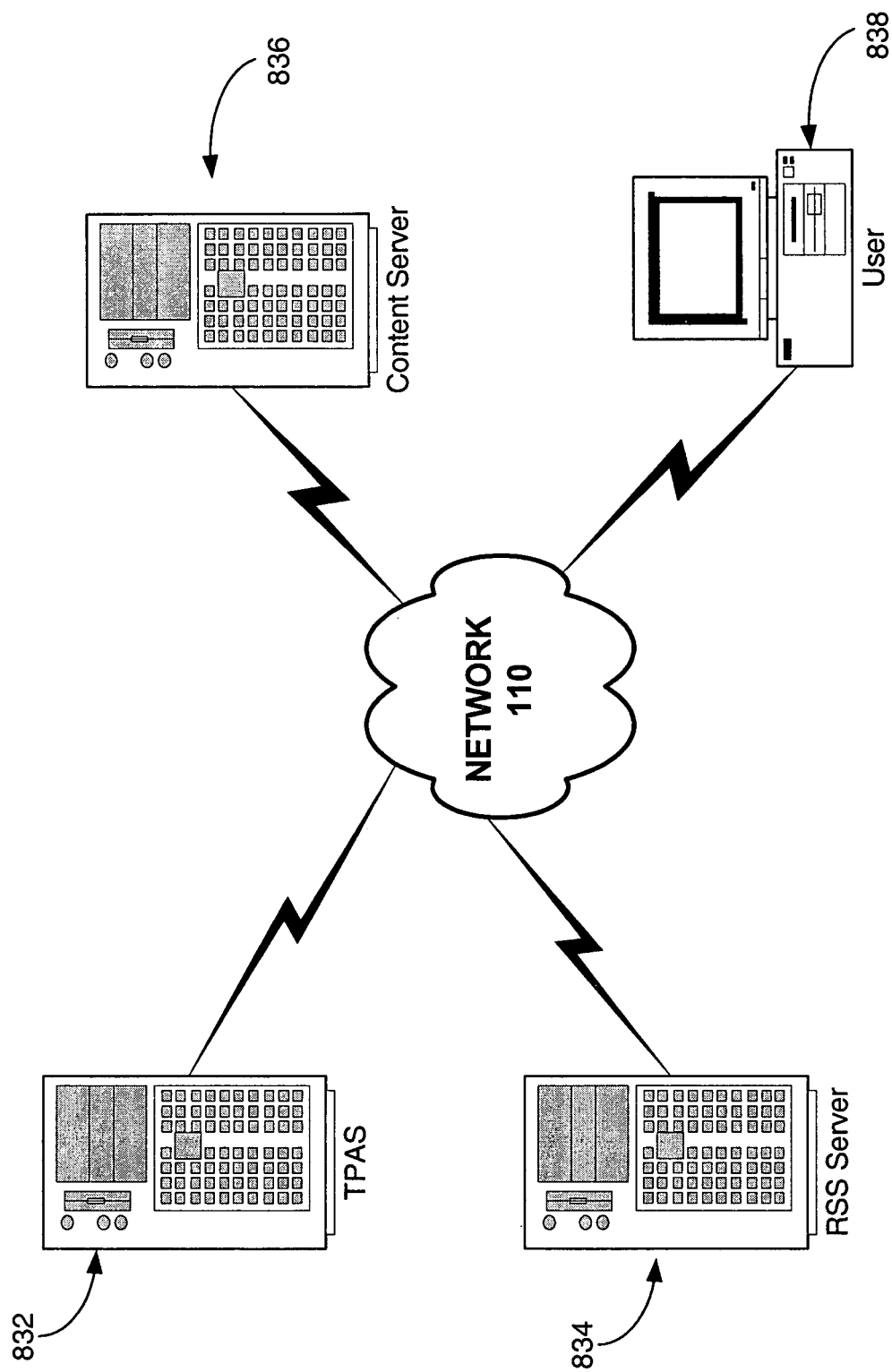
FIG. 63 illustrates one embodiment of a system for RSS advertising.

FIG. 63 illustrates a system for RSS advertising 830. The system includes a variety of servers and clients communicating over network 110. A TPAS 832 exists to supply advertising for use in RSS feeds from RSS server 834. RSS server 834 may, in one embodiment, supply its own advertising. A content aggregator at content server 836 consumes RSS feeds from RSS server 834. User node 838 issues requests to content server 836.

Figure 64:
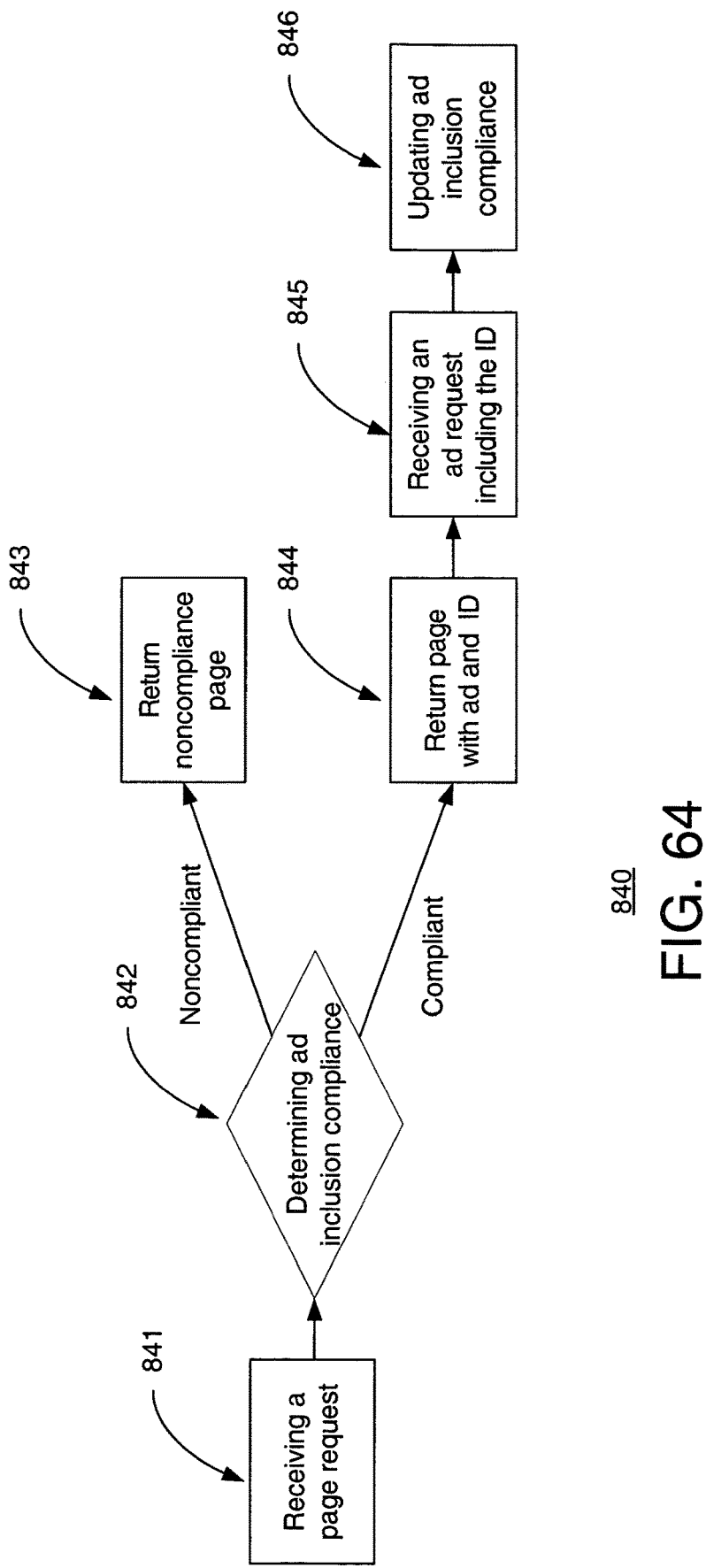
FIG. 64 illustrates a flow chart embodiment of RSS advertising.

FIG. 64 is a flowchart illustration of an RSS advertisement supply and tracking system 840. RSS server 834 receives a page request 841 for an RSS feed from content server 836. The request includes a content server identifier. A content server identifier is used to maintain records of RSS and other requests from content server 836. A content server identifier may be an account name, number identifier, or the like, that is assigned by the RSS provider or selected by content server 836. Alternatively, a content server identifier may be the IP address of content server 836. Content server identification may also include the use of a certificate installed on either one or both of RSS server 834 and content server 836. Any form of identifying the source of a request may be employed.

When the request is received, RSS server 834 makes a determination of ad inclusion compliance 842 based upon the content server identifier. If content server 836 is noncompliant, RSS server 834 returns a noncompliance page 843. Alternatively, RSS server 834 may return a blank page or simply record the noncompliance. If content server 836 is compliant, RSS server 834 returns a page as requested 844. The returned page may, in one embodiment appear as follows:

```
<rss version="0.91">
  <channel>
    <title>site.com</title>
    <link>http://www.site.com/</link>
    <description>site.com description.</description>
    <terms>Use of this RSS feed requires the inclusion of the ad tag included herein. Noncompliance with these terms may result in lost access to this feed and prosecution for damages.</terms>
    <ad><script src="http://www.site.com/ad?CSID=143.123.1.42">
    </ad>
    <language>en-us</language>
    <item>
      <title>Site Article, Part 1</title>
      <link>http://www.site.com/article1.html</link>
      <description>This is a first article.</description>
    </item>
    <item>
      <title>Site Article, Part 2</title>
      <link>http://www.site.com/article2.html</link>
      <description>This is a second article.</description>
    </item>
  </channel>
</rss>
```

Two additional tags have been added to the previous RSS example. First is a terms tag. This tag may be used to describe the terms of use for the RSS feed. The other tag is an ad tag. This tag may be supplied by RSS server 834 or requested during the construction of the page from TPAS 832. In this embodiment, the querystring value CSID represents the content server identifier—an IP address of 143.123.1.42. Other forms of URL hashing may be used to include the content server identifier in the ad tag. The ad tag may represent any type of ad. When RSS server 834 serves its RSS feed, a request associated with the content server identifier is registered as having been received and responded to. When content server 836 serves a page constructed with information from the RSS feed it must, according to the terms of RSS use, include the ad tag in the served page. When content server 836 serves the ad tag, a request for an ad is issued by the code of the ad tag, this tag including the content server identifier 845. When this request is received, the ad inclusion compliance is updated 846 based on the content server identifier.

Various ad inclusion compliance rules may be enforced using this method and system. For example, a rule may be set that sets a content aggregator to noncompliance if a certain absolute threshold discrepancy between RSS requests and ad impressions requested is reached. For example, a threshold of twenty may be set. If content server 836 has made twenty-three requests of RSS server 834 but only three ad requests have been received by TPAS 832 or RSS server 834, content server 836 may be set to noncompliance and the next request may result in the return of a noncompliance page. Alternatively, the threshold may be set over a period of time. For example, a discrepancy of twenty requests over an hour may be applied. If the discrepancy ever reaches more than twenty, the noncompliance page is returned. The ad inclusion compliance may be updated when the time threshold is passed or it may remain in noncompliance once that state is reached. A wide variety of rules may be used, these being exemplary only. Reports may be generated and human intervention used to set and remove compliance.

In one embodiment, the item links and other links included in the RSS feed are based on the content aggregator identifier. For example, the RSS feed may return:

```
<rss version="0.91">
  <channel>
    <title>site.com</title>
    <link>http://www.site.com?CSID=143.123.1.42</link>
    <description>site.com description.</description>
    <terms>Use of this RSS feed requires the inclusion of the ad tag included herein. Noncompliance with these terms may result in lost access to this feed and prosecution for damages.</terms>
    <ad><script src="http://www.site.com/ad?CSID=143.123.1.42">
    </ad>
    <language>en-us</language>
    <item>
      <title>Site Article, Part 1</title>
      <link>http://www.site.com/article1.asp?CSID=143.123.1.42</link>
      <description>This is a first article.</description>
    </item>
    <item>
      <title>Site Article, Part 2</title>
      <link>http://www.site.com/article2.asp?CSID=143.123.1.42</link>
      <description>This is a second article.</description>
    </item>
  </channel>
</rss>
```

In this code sample the identifier is again included as part of the querystring. Other forms of URL hashing may be used to include the content server identifier in the links. In one embodiment of the present invention, ad inclusion compliance is adjusted based upon recording requests for linked items included in the RSS feed and their associated content server identifiers. For example, RSS server 834 may require an ad request including a content server identifier for each request for a linked item including that content server identifier. Similar ad inclusion compliance rules may be applied to requests for linked items as described for RSS requests. RSS server 834 may return a noncompliance page if these compliance rules are not followed.

In one embodiment, the required ad may be included in another RSS element, for example the title or description element. Further, the request for an ad script, image, or the like may include a link or identifier for the destination article or content indicated by the link element of the RSS feed. Based on this article or content, the TPAS or other ad supplying mechanism may determine an appropriate ad for display.

Two further examples of RSS Feed advertising follow:

```
<rss version="0.91">
  <channel>
    <title>site.com</title>
    <link>http://www.site.com?CSID=143.123.1.42</link>
    <description>site.com description.</description>
    <terms>Use of this RSS feed requires the rendering of the ad script included within the description. Noncompliance with these terms may result in lost access to this feed and prosecution for damages.</terms>
    <language>en-us</language>
    <item>
      <title>Site Article, Part 1</title>
      <link>http://www.site.com/article1.asp?CSID=143.123.1.42</link>
      <description>This is a first article. <script src="http://www.site.com/ad?CSID=143.123.1.42"></description>
    </item>
    <item>
```

-continued

```
        <title>Site Article, Part 2</title>
        <link>http://www.site.com/article2.asp?CSID=143.123.1.42</link>
        <description>This is a second article. <script
src="http://www.site.com/ad?CSID=143.123.1.42"></description>
        </item>
    </channel>
</rss>
<rss version="0.91">
    <channel>
        <title>site.com</title>
        <link>http://www.site.com?CSID=143.123.1.42</link>
        <description>site.com description.</description>
        <terms>Use of this RSS feed requires the rendering of the ad
image included within the description. Noncompliance with these terms
may result in lost access to this feed and prosecution for damages.</
terms>
        <language>en-us</language>
        <item>
            <title>Site Article, Part 1</title>
            <link>http://www.site.com/article1.asp?CSID=143.123.1.42</link>
            <description>This is a first article. <img
src="http://www.site.com/ad.gif?CSID=143.123.1.42&link=
http://www.site.com/article1.asp"></description>
        </item>
        <item>
            <title>Site Article, Part 2</title>
            <link>http://www.site.com/article2.asp?CSID=143.123.1.42</link>
            <description>This is a second article. <img
src="http://www.site.com/ad.gif?CSID=143.123.1.42&link=
http://www.site.com/article2.asp"></description>
        </item>
    </channel>
</rss>
```

Figure 69:
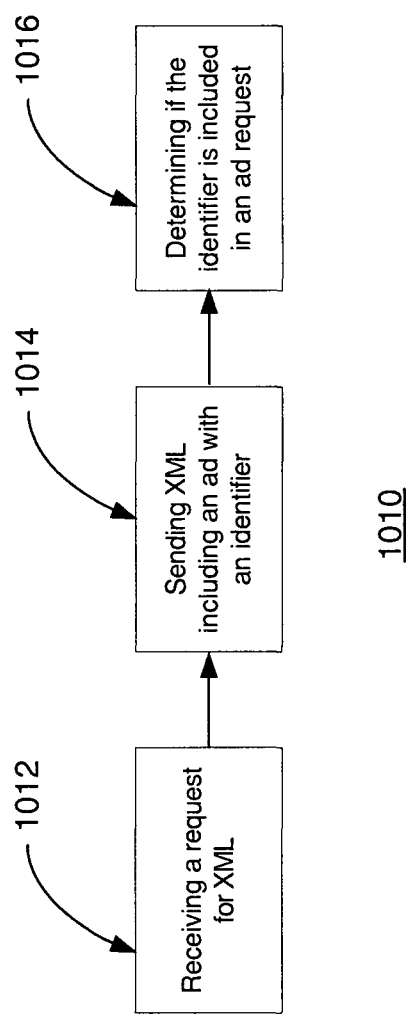
FIG. 69 illustrates a flow chart embodiment of advertising with structured information format data feeds.

FIG. 69 illustrates a flow chart embodiment of advertising with structured information format data feeds at 1010. A request for structured information format data is received 1012. Structured information format data is sent, including an ad with a content aggregator identifier 1014. It is then determined if the content aggregator identifier is included in a subsequent ad request 1016.

Independent Access Portal

Figure 65:
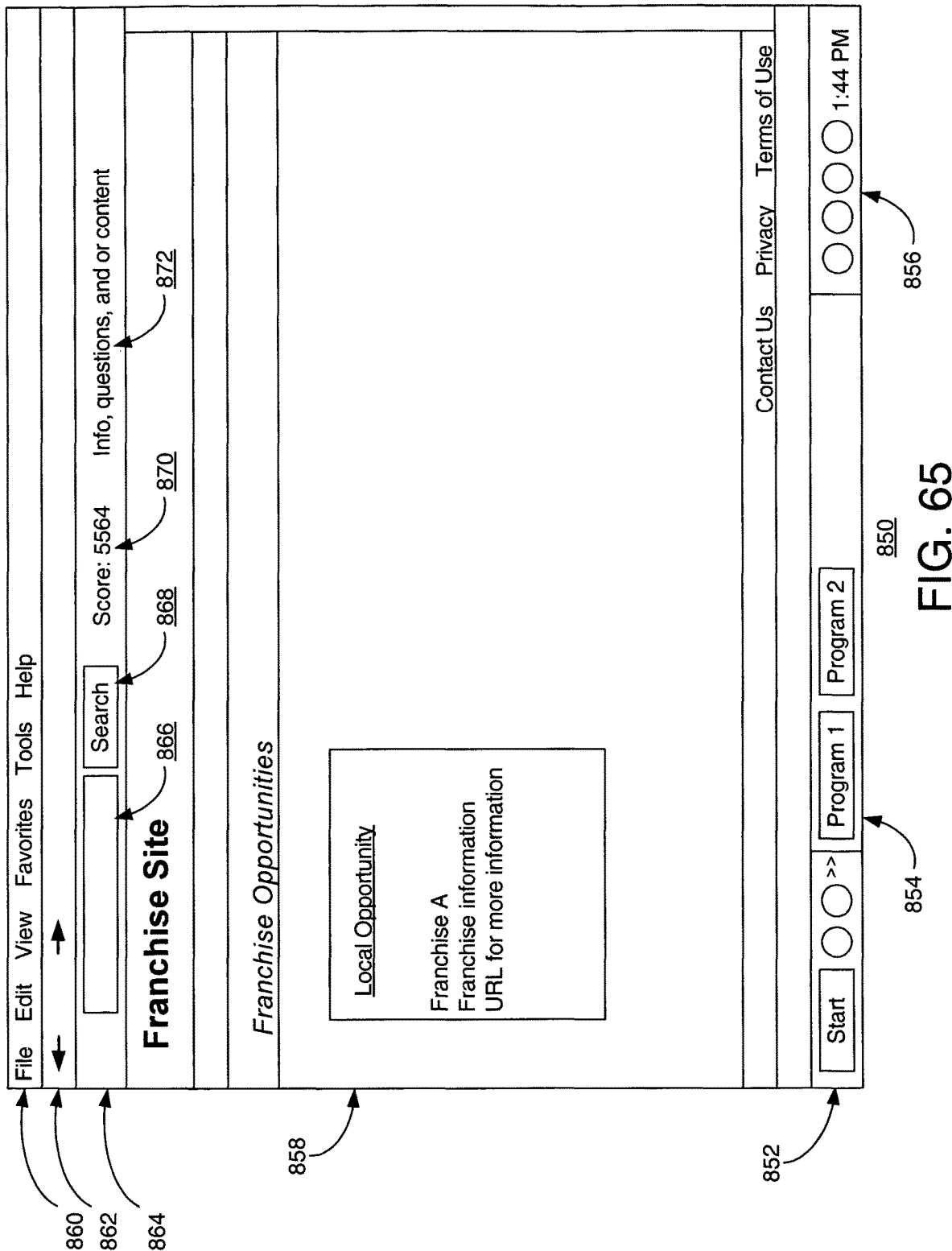
FIG. 65 illustrates one embodiment of an IAP.

FIG. 65 illustrates a sample computer screen provided with an independent access portal (IAP) 850. The sample screen includes elements such as a start bar 852, icons representing open programs 854, icons for starting programs 856 in the system tray, and a browser displaying a web page 858. The browser includes a standard menu 860, navigation elements 862, and a toolbar IAP 864. In one embodiment, toolbar IAP 864 is provided to supply additional information, questions, and/or content 872 to the user. In one embodiment, toolbar IAP 864 includes a field for the user to enter search terms 866 and allows the user to submit the search 868. In one embodiment, toolbar IAP 864 includes a score 870, associated with points collected by one or more users of the toolbar. While the toolbar IAP in this diagram is displayed at the top of the page, the toolbar IAP may be displayed on the side of the browser such as services provided by SideStep, or the included history and favorites sidebars provided with Internet Explorer.

Figure 66:
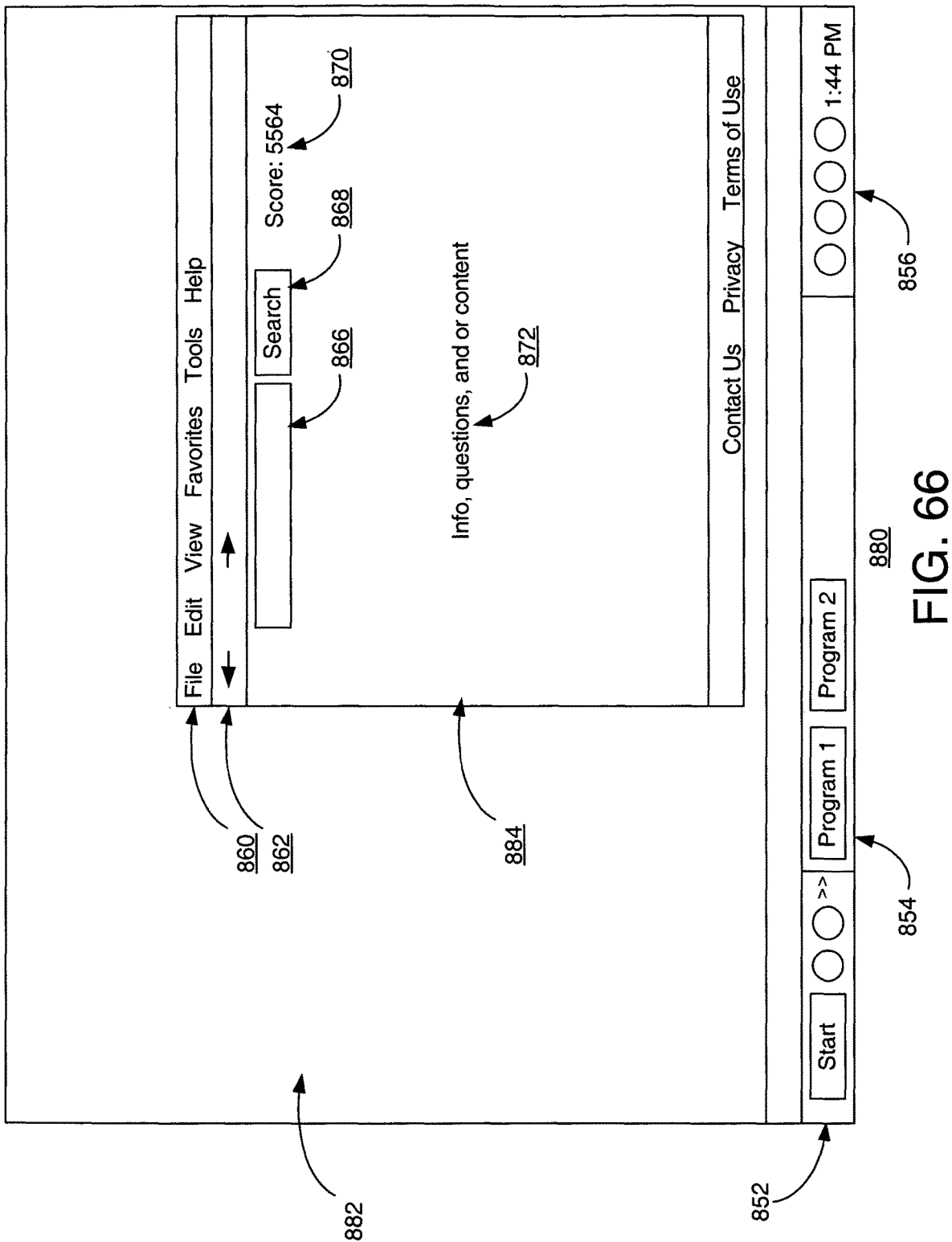
FIG. 66 illustrates a second embodiment of an IAP.

FIG. 66 illustrates another sample computer screen provided with an IAP 880. On this screen, standalone LAP 884 is displayed. In one embodiment, standalone IAP 884 is set to a fixed size, smaller than the desktop, allowing portions of the desktop 882, or other programs running behind standalone IAP 884, to show. In one embodiment, standalone IAP 884 is a web browser capable of displaying web content. Alternatively, standalone IAP 884 may be a desktop program, or some combination of desktop program and web browser. For example, standalone IAP 884 may be a deskbar-such as that made available by Google—that combines programmatic capabilities in addition to browsing. In one embodiment, standalone IAP 884 may be associated with a TPAS. Information collected by or activity performed on standalone IAP 884 may contribute to profile information used in advertisement selection for the associated TPAS.

In one embodiment, an IAP is always running when a web browser is open, such as is displayed on the sample computer screen provided with an IAP 880. Alternatively, the IAP may run as a background process, on at all times the computer is running. The user may interact with this background process through an interface such as that shown as standalone IAP 884. In one embodiment, the user receives an incentive to operate the IAP. For example, the incentive may comprise the award of points, accumulation of points, award of consideration, or an honorific, all herein to be referred to collectively as points. Points may be directly awarded for a predetermined action or may accumulate in response to a span of time that the IAP is operable. Predetermined actions may include, for example, clicking on an advertisement, sending an email, filling out a profile, responding to a survey, providing a review, referring a friend, or winning a contest. Regarding the award of points for a span of time, the user may, for example, collect a point for a designated time period, such as five minutes, that the IAP is running. In one embodiment, the IAP requires a user to login in order to correctly associate a user with their IAP account.

In one embodiment, the IAP provides the user with constantly updating information, refreshed on a regular basis—for example, once every one or five minutes. This information may include sports scores, weather reports, news information, horoscopes, stock quotes, inspirational quotes, or the like. In one embodiment, the information also includes advertisements. In one embodiment, the IAP brings itself to the front of the desktop, known as gaining focus, over other programs, each time the information refreshes. In one embodiment, the IAP does this only when certain types of information are refreshed or displayed, for example an advertisement may cause the IAP to gain focus, or an updated score for a certain sports team may cause the IAP to gain focus. In one embodiment, the user may specify which refreshed content may cause the IAP to gain focus.

In one embodiment, any ads displayed on an IAP are independent of access requests by the user, with content information and ads refreshing on regular intervals. These ads allow a variety of targeting methods, and a quick method to reach end users is attained. Independent refresh requests from various communications devices and associated profiles may be recorded and a current audience determined based upon these refresh requests.

Advertisements displayed over the IAP may be designed specifically to be run over the IAP, may be templates, or another type of advertisement. Template ads may relate to a category of advertisers, such as restaurants, politicians, or grocery stores.

For example, consider the following advertising opportunity. An IAP may be a local entertainment site, and further it may hold standard profile information such as the age, location, and sex of the user. A bar may wish to advertise a ladies night special. Each week, on the night of the special, the bar may distribute an advertisement over the IAP to IAP users over the age of 21, further targeted to the zip code of and other zip codes surrounding the bar. An advertisement may not even require scheduling on a regular basis, the bar may submit the advertisement only on one of the ladies nights to include information as specific as how many people are currently at the bar. This on the fly advertising may be submitted by phone, fax, email, via online interface, or other communications system. Restaurants and bars in a given city or geographic region may have template ads stored in a database that would be modified upon a call to an IAP command center or via another notification method such as fax, email, instant messaging, and the like. If a user is detected present at a computer, a check for geographic and other information for that user would be made and a time sensitive ad would be made from the ad server. If a time sensitive directive were received at the IAP command center from Joe's bar, the Joe's bar template ad would be pulled and appropriate language in accordance with the directive would be inserted in the ad and displayed on the appropriate IAPs. For example, an ad at Joe's Bar may be delivered to a user "Come on in, drinks are half off." The ad may not be served if there is additional profile information about the user that would not be compatible with the advertiser or advertisement. Alternatively or in addition, a banner or text advertisement could be served to a web page separate from the IAP sent to the user's computer based on the same criteria.

In one embodiment, the IAP software may record whether a web site that is the IAP or is associated with the IAP is set as a user's homepage. Points may be awarded for maintaining a certain homepage.

The IAP may incorporate methods of attracting users such as awarding points for recommending the service to friends. In one embodiment, the recommending user may receive some portion of the points earned by the recommended user during at least a period of time the recommended user uses the IAP.

In one embodiment, providing additional profile information may also accumulate points. Additional profile information may also accelerate the rate points accumulate for leaving the IAP running.

In one embodiment, the IAP may be associated with a TPAS. The IAP may provide an interface for users to view and edit information collected about that user. Further, the IAP may track the ads displayed to the user and allow for feedback by the user. The user can receive points for providing feedback on the advertisements delivered over the IAP or over other sites by the TPAS.

In one embodiment, interaction with the IAP may be conducted through an instant messenger bot, a cell phone or other web-connected device, or through email. For example, a query to an instant messenger bot might respond with a users current score. The bot may respond based up on the screenname issuing the request, based upon the message sent or a combination of the two. Using email as an example means of interaction, an email to a particular email account may result in a reply email containing a link that indicates a user's IAP settings, allowing them to share their preferences by forwarding the email.

In one embodiment the IAP will periodically or continually check for mouse or keyboard activity to determine the presence of a user. Requests for advertising may be based on profile information, cookie information, multiple confirmation targeting, or other targeting methods described herein independently or in conjunction with each other. The check for active interaction information may be used to determine a current active audience for the IAP. In one embodiment, the IAP notifies potential advertisers of the current audience or current active audience. For example, if a large number of IAP users are active on their IAP, the IAP may notify a movie theater of the opportunity to advertise an R-rated movie that is going to begin showing in a few hours. Advertisers may also request current audience or current active audience information via a website, command center, or various other methods. Advertisers may require information regarding subset audiences. For example, the IAP may provide the movie theater with only active audience numbers for users within a certain zip codes surrounding the theater or perhaps also narrow by providing numbers of users also known to be over 18.

In one embodiment, an IAP can be dedicated to one or more types of content. In one embodiment, an IAP can be dedicated to a single function, for example, weather information for the users geographic location. Other IAPs can be dedicated to different functions, for example, sports scores. A user of the Weather IAP can also be a user of the Sports IAP. Upon refresh of the two IAPs a determination is made that the refresh requests are from the same communication device. Based on this determination, in one embodiment a combined Sports and Weather IAP is delivered and the single function IAPs are deleted. Alternatively, one of the IAPs may expand to combine both Sports and Weather while the absorbed IAP is deleted. This will allow a user to build a custom IAP based on desired information. Custom IAP settings and preferences of different users can be shared or a first user may add a custom IAP of a second user to the first users IAP. In one embodiment, the second user may email or instant message a link to his IAP or IAP settings and preferences. In one embodiment, once the first user views the custom IAP of the second user a timing trigger can be set at the IAP server. The timer can, for example, be based on a number of timed refresh requests or any other time delay to allow the first user to view it for a period before the second user IAP is combined with the first user IAP. In one embodiment, the second user must actively select to combine the first user's IAP with their IAP. In another embodiment, each function of an IAP can have an add or delete symbol or icon to allow a user to add or delete functions he no longer desires. For example, by clicking a delete icon next to a Weather function, the IAP would send a delete request to the server to delete the Weather function. In one embodiment, a history of IAP changes and preference profiles are maintained. A user may be allowed to select a previous IAP state, providing a rollback feature on IAP settings.

In one embodiment, various web sites can display IAP icons, to allow a user to extract content from the web site to an IAP. This extraction can be done by an available RSS feed, screen scraping, or other protocols. For example ESPN would display an IAP icon next to Basketball headlines. Clicking on the icon sends a request to the web server and the selected content would be sent to the IAP server and appears on the IAP when it is refreshed. When, for example, a user clicked on a given basketball headline on the IAP, the user would receive a headline page on the ESPN site. In one embodiment, the user can first be sent a make-up ad page which would display an ad the user would have seen had he accessed the article directly from the ESPN site. From the make-up ad page the user can click once again to see the article. Alternatively, the make-up page could be timed to disappear or fade away to reveal the article.

In one embodiment, the IAP icons on various websites may vary in appearance based upon whether the user is known to have an existing IAP account. In one embodiment, this determination can be made by checking for an IAP cookie that is deposited on the IAP users computer in an operation associated with the IAP. For example, when a user is viewing Basketball headlines on ESPN and is not known to be an IAP user, the IAP icon may include a message such as "Keep track of basketball scores even when you're not at ESPN." If the user is a known IAP user, the IAP icon may include a message such as "Add basketball scores to your IAP." Alternatively, the icon may not contain text, but may be an image recognizable as associated with the IAP.

Alternative to this distributed method of finding IAP content, users may check certain categories of interest on the IAP to choose what content is displayed. This may be done on a page managed by the IAP that aggregates all IAP channel options. IAP channel selection and category selection can be used to determine user characteristics and establish additional user profile.

In one embodiment, the IAP may be minimized or may, when minimized, disappear off the Windows desktop startbar and be restored by an icon in the system tray. The IAP may be capable of restoring itself. For example, a time sensitive ad or message might prompt the IAP to bring itself into focus.

In one embodiment, the IAP includes opportunities for games, raffles, gambling or other types of contests. IAP points may be required for entry into these contests. In one embodiment, prizes may consist of a coupon for a product or service, perhaps a local one such as pizza, and may include a valid time of day or other time limitation. Alternatively, winners may receive IAP points.

In one embodiment, information regarding click throughs and product purchases facilitated by the IAP may be used to optimize advertisements and other site and content recommendations as described above. Further, the IAP may be used to identify template advertising opportunities through observation or direct inquiry of the users.

In one embodiment, some information related to user location or schedule may be stored in the IAP database. For example, school schedules may be entered into the IAP database for college students in order to appropriately target certain schedule specific information, such as graduation deals.

In one embodiment, the IAP can access coupons. For example, a user can access his IAP via a cell phone with a display screen, or via an automated response system that the user dials into, and request lunch specials. Based on the user profile, which may include both where the user works and lives, the IAP server determines lunch specials for the location and sends available listings from the IAP server to the cell phone. Alternatively, the user's location may be dynamically established based upon a mobile location service such as is available through Microsoft's MapPoint suite of programs. In one embodiment, the user can read off the coupon numbers to the restaurant to get his discount. In one embodiment, the coupon will include a bar code, which can be read through the phone into a bar code scanner to receive a discount.

In one embodiment, an IAP may include a request window. A user can type in a product or service of interest into the request window and send the request to the IAP server. The request would then be scanned for key words, parsed, and/or interpreted by IAP personnel. The request or an interpreted or modified version of the request can then be sent to a retail data interface, or RDI, for communicating with the IAP. For many products and services, local retailers, e.g. those located within a predefined radius from the user or postal codes or other areas at or adjacent to the user, are necessary and/or desirable. In one embodiment, once the subject matter of the request is determined, a second determination can be made to determine if the subject matter requested applies to local retailers or both local and national retailers. In another embodiment, the entity providing the product or service may choose to be classified as a national or local retailer. Based on this geographic relevancy determination, the request is then sent to the geographically relevant RDIs.

For example, a user may type in a request for a sink to be unclogged and send the request to the IAP server. The request would be interpreted as a plumber service request being geographically relevant to an area within, for example, a zip code, a distance from the requestor's address, DMA, or other suitable geographic area. Once the IAP determines the relevant geographic region, the region can be compared to a list of plumber profiles containing the plumber locations and/or geographic areas they are willing to service. The request is then sent to the plumbers and they can send a reply via their RDI to the IAP server, which then sends it on to the requester's IAP. The plumber's reply, for example, can include the plumber's phone number along with a cost estimate or typical range and when he could arrive. Alternatively, in one embodiment, the requestor can phone in the request to an IAP command center—where the call can be digitally recorded, interpreted and sent as a digital message or text message to the RDI. In another embodiment, the service provider is provided with contact information for the requestor, enabling the provider and requestor to communicate directly. In some embodiments, the contact information for the requester is only forwarded to the service provider if the requestor gives permission for the IAP to forward the contact information.

In one embodiment, a retailer's inventory information can be sent from a retailer database to respond to a request. For example, a request might be received at the IAP server for a digital camera. The IAP server recognizes this as a request serviceable by Best Buy, and directs the query to the local Best Buy RDI. The Best Buy RDI interfaces with the store inventory database, requesting current inventory and pricing information on digital cameras. The response is then routed back to the IAP that originated the request for digital camera information. In one embodiment, the retailer may have a database with set responses to send on to requesters. This database may be held on a computer maintained by the retailer or on the IAP server.

Some users may be more comfortable getting a product from a local retailer. In one embodiment, the retailers inventory can be checked and a request to a wholesaler or manufacturer can be made in response to the request. So even if the retailer does not presently have the product available, the retailer can reply that a shipment will arrive on a certain date. In one embodiment, the retailer could send a product request to a wholesaler or manufacturer data interface MDI via the IAP server. The manufacturer can send a reply from the MDI to the RDI via the IAP server. In one embodiment, manufacturer inventory data can be integrated with the MDI to facilitate a response to the RDI.

In one embodiment, the IAP may be used for facilitating bulk purchases and associated savings. For example, a deal might be presented to the IAP whereby a local store is able to sell a set of golf clubs at fifteen percent below retail if it is able to purchase ten sets from the supplier. Invitations to take part in the fifteen percent savings are sent out via the IAP. Users may, in one embodiment commit to purchasing the set if nine other sets are sold. When the ten sets are all pre-sold the IAP may charge previously stored credit card accounts for each user and inform the local retailer that the bulk purchase may be made.

Alternatively, an IAP user may request a product. Based upon the product request the company managing the IAP may negotiate a potential bulk purchase, or a retailer may propose a bulk sale via their RDI. Again, as before, invitations to take part in the purchase are sent to likely candidates via the IAP.

Often times a person may be enticed into desiring a product or service through an ad, but may still want to purchase it locally. In one embodiment, an advertiser may geotarget an ad using, for example, a TAWs, RFRAS or other targeting system. Based on a level of interest value, a request can be sent from the ad server to an IAP server. The IAP server can then based on the product or service category send a request to one or more geographically relevant RDIs.

In one embodiment, a RDI can send a response to the IAP server indicating that it sold a product or service to a requester. The IAP can then send a request for recommendation to the requester IAP. The recommendation can be held in a recommendation database, which may also include a friends and acquaintances database indexed based on profile data entered by users. This profile data may be initial registration requested data or created based on activity of the requester or other IAP user, for example, when a requesters IAP is combined with as second IAP, or the reverse, it can be inferred that the requester and the second user of IAP are friends. Other methods of establishing relationship networks are known in the art and may be employed. In one embodiment, an IAP user can request a product or service and specify friends and/or general recommendations. The IAP server can directly send a reply from the recommendation database with general information. In one embodiment the recommendations can be sent along with a reply from a retailer.

In one embodiment, the IAP user can designate an association with one or more other IAP users. This can be accomplished, for example, upon sign up as part of profile information, automatically when one user's IAP is merged with another user's IAP, or by a direct request sent to the IAP server, which then links the associated parties within the IAP database. These associations allow the promotional events including games, for example, poker tournaments, fantasy football leagues, and the like. For example, players from one team of associated IAPs can play a game and all would get 20 percent off a pizza and the winner get a month's supply of Pizza. In one embodiment, promotions can be established so that IAP teams can play against one another and the winner would get a special discount over the other team. In one example, team trivia contests can reward the whole team with discounts if one IAP user of the team gets the answer. Promotional games can be run on short notice to increase business during slow periods. For example, guessing a spread at half time of a football game to win the promotion.

Placement Advertising with Added Information Opportunity

There has been a recent trend to advertise products and services within movies and other programming. In one embodiment, tags can be imbedded in audio and/or video programming. When the tagged programming is played advertisements can be sent in coordination. For example, a frame or frames of a movie with an actress in a dress can be embedded with a tag that triggers a request from the ad server to send an ad featuring the dress and the promotional price to the users screen. New as well as archives movies and programming can be embedded with tags to maximize brand awareness and also provide users with information on where to purchase the product. In one embodiment, the programming may be recorded using TIVO or other systems and the ads associated with the tags can be displayed responsive to the pause. The tag responsive ads can be sent from an ad server, via an IAP, or as data included with the programming. In one embodiment, the ads can be sent based on an optimization profile. Alternative to the tagged approach, a parallel and synchronized advertising information stream may be provided with the audio or video content. In one embodiment, the advertising information stream is not displayed except when requested by a user. In one embodiment, the advertising information stream may contain coordinate information in the case of video content. The coordination information indicates where on the video image the placement advertising exists. A user may indicate by mouse, laser pointer, or some other means of coordinate identification the position in the video they are interested in advertising information for. Advertising information for the selected coordinate is then displayed at the users request. In one embodiment a user may also select from a list of non-coordinate based information in the video. For example, a user may request information regarding a song playing in the background of a video. In one embodiment, other peripheral information may also be provided in the parallel stream. For example, a user may request information regarding what city a scene being viewed takes place in. In one embodiment, the non-coordinate or peripheral information may have topical advertising associated with it. For example, the information regarding the song playing in the background may include purchase information, or the information about what city might include flight or tourism advertising for that city.

COOPERATIVE USE

A variety of targeting and tracking methods have employed the use of cookies. It should be understood that the cookie data for various methods may be stored in the same cookie or in separate cookies and these cookies may be persistent or temporary cookies unless otherwise specified or as is necessary to achieve the described functionality. Further, it should be understood that many of the inventions described herein may be used cooperatively. For example, advertising on the IAP may make use of The following example situational descriptions will further illustrate some of the opportunities presented by cooperative use.

A pizza company employs an RDI. The pizza company is a national chain that has used banner advertising on Yahoo!® in a TAWS system to build their brand and to send store specific promotional advertisements to users who have been multiply confirmed as being within the delivery zone of a store. The TAWS system is run on a TPAS that employs the previously described optimization system. The optimization system has identified an optimization profile that indicates high response rates for male college students. Cross-referencing the times having the highest response rates with a television schedule it is determined that response rates are highest an hour before Fresh Prince of Bel Air reruns. The pizza company uses this information to send out offers over an IAP network to students running IAPs at a local university. The offer takes the form of a short trivia game, winners receive two dollars off a pizza order. Two students win the trivia game. The first student selects to have a two dollar off coupon sent to their cell phone in the form of a bar code, and they go to the store to redeem the offer. The other winner places an order for their pizza over the IAP. The RDI at the pizza company receives the order and recognizes the student's address as a dormitory. The RDI then signals the IAP server to send out dollar off coupons to all students in that dormitory who respond within a set period of time, for example 5 minutes. This has the effect of more efficiently delivering pizza, as multiple orders may be placed from the same delivery location. Alternatively, the RDI may send a signal to the IAP server that prompts discount advertising to users in the dorm and surrounding areas with a longer redemption period, for example 20 minutes. The pizza delivery person takes 5 extra pizzas with them in anticipation that additional orders will be received in the same area. When orders are placed in that same area and received by the RDI, the RDI signals the delivery person with the additional delivery information via cell phone, blackberry, pager or some other wireless means of communication.

As another example, an optimization system develops a template advertising opportunity based on an optimization profile that recognizes college students who drink coffee as good prospects for buying books. A TPAS extrapolates information of differing geographic data to determine likely college students. For example, profile information suggests a user is from Chicago, IL, but IP-based targeting suggests they are from Champaign, IL This user ordered coffee through their IAP. Amazon.com® has selected this template advertising opportunity to advertise their online bookstore. A bookstore advertisement for Amazon.com is displayed on a website to the user. The user clicks on the advertisement but does not end up purchasing anything. Later a 360-degree ad on a website displays a scene of a person pointing. The person pointing swings around to point to the lower right of the user's screen, where the IAP gains focus. The IAP appears with a progressive advertisement, offering a free cup of coffee at Starbucks® with the purchase of a book at Amazon.com.

The present invention may be embodied in other specific forms without departing from its spirit or essential characteristics. The described embodiments are to be considered in all respects only as illustrative and not restrictive.

We claim:

1. A system for distribution of targeted online content comprising:
   a memory configured to store a plurality of sponsored content items, wherein each of the plurality of sponsored content items is associated with demographic and geographic information; and
   at least one processor configured to:
   provide a graphical user interface for display at a first user device, wherein the graphical user interface is configured to visually represent options or input fields for creating a sponsored content item, wherein the options or input fields include a first option, a second option, and a third option, wherein the first option is associated with an image of a clickable map configured to enable input or selections of one or more designated market areas or regions for the sponsored content item, wherein the second option is associated with one or more interface elements to enable input of target demographic information for the sponsored content item, wherein the third option is associated with one or more interface elements to enable input of time-based information for the sponsored content item, and wherein at least the first option is selected by a user;
   receive a request that includes at least one attribute associated with a user of a second user device, wherein the at least one attribute includes a geographic location and user demographic data;
   compare the geographic location to the one or more designated market areas or regions associated with each of the plurality of the sponsored content items;
   identify sponsored content items based on the comparison of the one or more designated market areas or regions to the geographic location;
   identify a subset of the sponsored content items based on comparing the user demographic data to the target demographic information associated with each of the subset of the sponsored content items;
   select the sponsored content item from the subset of the sponsored content items;
   provide the sponsored content item for display on the second user device; and
   determine an amount or fee to be charged to a sponsor or content provider, wherein the amount or fee includes a first predetermined amount for providing the sponsored content item in a first designated market area or region that is a designated market area or region of the sponsor or content provider and includes a second predetermined amount for providing the sponsored content item in the first designated market area or region when the first designated market area or region is also a designated market area or region of a different sponsor, and wherein the second predetermined amount is different than the first predetermined amount.

2. The system of claim 1, wherein the at least one processor is further configured to rank the subset of the sponsored content items, wherein the sponsored content item is selected based at least in part on the ranking, and wherein the at least one attribute further includes geographical information, demographic information, IP address information, user profile information, page content information, site categorization information, website information, search information, user behavior information, uniform resource location (URL) information, a content request, timing information, cost information, or a combination thereof.

3. The system of claim 1, wherein the memory comprises one or more databases of a server, wherein each of the plurality of sponsored content items is further associated with at least one content category or channel, wherein the at least one attribute is further associated with a content category or channel, and wherein the at least one processor further compares the content category or channel of the at least one attribute to the at least one content category or channel associated with each of the plurality of the sponsored content items.

4. The system of claim 1, wherein the request is received from a content provider, wherein the at least one processor is further configured to modify the sponsored content item based on the at least one attribute, and wherein the sponsored content item is provided to the content provider for inclusion on a web page.

5. A non-transitory computer readable storage medium comprising computer executable instructions which, when executed by a processor, cause the processor to perform operations for distribution of targeted online content comprising:
   providing a graphical user interface for display at a first user device, wherein the graphical user interface is configured to visually represent options or input fields for creating a sponsored content item, wherein the options or input fields include a first option, a second option, and a third option, wherein the first option is associated with an image of a clickable map to enable input or selection of one or more designated market areas or regions for the sponsored content item, wherein the second option is associated with one or more interface elements to enable input of target demographic information for the sponsored content item, wherein the third option is associated with one or more interface elements to enable input of time-based information for the sponsored content item, and wherein at least the first option is selected by a user;

storing a plurality of sponsored content items, wherein each of the plurality of sponsored content items is associated with demographic and geographic information;

receiving a request that includes at least one attribute associated with a user of a second user device, wherein the at least one attribute includes a geographic location and user demographic data;

comparing the geographic location to the one or more designated market areas or regions associated with each of the plurality of the sponsored content items;

determining sponsored content items based on the comparison of the one or more designated market areas or regions to the geographic location;

identifying a subset of the sponsored content items based on comparing the user demographic data to the target demographic information associated with each of the subset of the sponsored content items;

selecting a sponsored content item from the subset of the sponsored content items;

providing the sponsored content item for display on the second user device; and determining an amount or fee to be charged to a sponsor or content provider, wherein the amount or fee includes a first predetermined amount for providing the sponsored content item in a first designated market area or region that is a designated market area or region of the sponsor or content provider and includes a second predetermined amount for providing the sponsored content item in the first designated market area or region when the first designated market area or region is also a designated market area or region of a different sponsor, and wherein the second predetermined amount is different than the first predetermined amount.

6. The non-transitory computer readable storage medium of claim 5, wherein the sponsored content item is provided to a content provider for inclusion on a web page, wherein the at least one attribute is further associated with geographical information, demographic information, IP address information, user profile information, page content information, site categorization information, web site information, search information, user behavior information, uniform resource locations (URLs), a content request, timing information, cost information, or a combination thereof.

7. The non-transitory computer readable storage medium of claim 5, wherein the sponsored content item is stored on one or more databases, wherein each of the plurality of sponsored content items are further associated with at a content category or channel, and further comprising comparing the at least one attribute of the request to the content category or channel associated with each of the plurality of the sponsored content items.

8. A computer implemented method for distribution of targeted online content comprising:

providing, by a processor, a graphical user interface for display at a first device, wherein the graphical user interface is configured to visually represent options or input fields for creating a sponsored content item, wherein the options or input fields include a first option, a second option, and a third option, wherein the first option is associated with an image of a clickable map configured to enable input or selection of one or more designated market areas or regions for the sponsored content item, wherein the second option is associated with one or more interface elements to enable input of target demographic information for the sponsored content item, wherein the third option is associated with one or more interface elements to enable input of time-based information for the sponsored content item, and wherein at least the first option is selected by a user;

storing a plurality of sponsored content items, wherein each of the plurality of sponsored content items is associated with demographic and geographic information;

receiving a request that includes at least one attribute associated with a user of a second user device, wherein the at least one attribute includes a geographic location and user demographic data;

comparing the geographic location to the one or more designated market areas or regions associated with each of the plurality of the sponsored content items;

identifying sponsored content items based on the comparison of the geographic location to the one or more designated market areas or regions;

identifying a subset of the sponsored content items based on comparing the user demographic data to the target demographic information associated with each of the subset of the sponsored content items;

selecting, by the processor, a sponsored content item from the subset of the sponsored content items;

providing the sponsored content item for display on a second device; and determining an amount or fee to be charged to a sponsor or content provider, wherein the amount or fee includes a first predetermined amount for providing the sponsored content item in a first designated market area or region that is a designated market area or region of the sponsor or content provider and includes a second predetermined amount for providing the sponsored content item in the first designed market area or region when the first designated market area or region is also a designated market area or region of a different sponsor, and wherein the second predetermined amount is different than the first predetermined amount.

9. A computer implemented method for distribution of targeted online content comprising:

generating, by a processor, a graphical user interface for display at a first device, wherein the graphical user interface is configured to visually represent options to create a sponsored content item, wherein the options include a first option and a second option, wherein the first option is associated with an image of a clickable map configured to enable input or selections of one or more designated market areas or regions for the sponsored content item, wherein the second option is associated with one or more interface elements to enable input of target demographic information for the sponsored content item, and wherein at least the first option is selected by a user;

storing a plurality of sponsored content items, wherein each of the plurality of sponsored content items is associated with demographic and geographic information;

determining at least one attribute associated with a content provider or user of a second user device, wherein the at least one attribute is associated with a geographic location and user demographic data;

comparing the geographic location to the one or more designated market areas or regions associated with each of the plurality of the sponsored content items;
identifying sponsored content items based on the comparison of the geographic location to the one or more designated market areas or regions of one or more sponsored content items;
identifying a subset of the sponsored content items based on comparing the user demographic data to the target demographic information associated with each of the subset of the sponsored content items;
selecting the sponsored content item from the sponsored content items;
providing the sponsored content item for display on the second user device; and
determining an amount or fee to be charged to a sponsor or content provider, wherein the amount or fee includes a first predetermined amount for providing the sponsored content item in a first designated market area or region that is a designated market area or region of the sponsor or content provider and includes a second predetermined amount for providing the sponsored content item in the first designed market area or region when the first designated market area or region is also a designated market area or region of a different sponsor, and wherein the second predetermined amount is different than the first predetermined amount.

10. The computer implemented method of claim 8, wherein the sponsored content item is stored on one or more databases of a server and wherein the at least one attribute is further associated with geographical information, demographic information, IP address information, user profile information, page content information, site categorization information, website information, search information, user behavior information, uniform resource locations (URLs), a content request, timing information, cost information, or a combination thereof.

11. The computer implemented method of claim 8, wherein a content provider is further configured to: receive a search request, wherein the search request includes a search query, a document request, a keyword, or a combination thereof; and determine at least one non-sponsored content item responsive to the search request.

12. The computer implemented method of claim 8, further comprising modifying the sponsored content item, wherein the sponsored content item is modified based on geographic information or a link to a website.

13. The computer implemented method of claim 8, wherein a content provider is associated with one or more webpages, wherein the sponsored content item is included on the one or more webpages, wherein the sponsored content item includes a link to a website of a sponsor, wherein the second device comprises a web browser and is configured to receive and transmit data over a network, and wherein the sponsored content item comprises a web-based advertisement.

14. The computer implemented method of claim 8, the method further comprising identifying, by a content provider, profile information associated with the user based on the at least one attribute, wherein the profile information is based at least in part on data collected from the user accessing information of the content provider, wherein the profile information includes preference information, viewing history information, navigation history information, or a combination thereof, and wherein the sponsored content item is further identified based at least in part on the profile information.

15. The computer implemented method of claim 8, wherein the options include a fourth option, wherein the fourth option is associated with one or more interface elements configured to enable input of category content or channel information, and wherein the sponsored content item is further selected based on comparing the at least one attribute with the category content or channel information.

16. The computer implemented method of claim 15, wherein the options include a fifth option, wherein the fifth option is associated with one or more interface elements configured to enable input of a type of the sponsored content item, and wherein the sponsored content item is further selected based on comparing the at least one attribute with the type of the sponsored content item.

17. The computer implemented method of claim 8, the method further comprising determining a confidence level for the sponsored content item, wherein determining the confidence level includes determining a similarity between the at least one attribute and a characteristic of the sponsored content item.

18. The computer implemented method of claim 8, wherein the user demographic data comprises gender, age, education level, occupation, or a combination thereof, wherein the geographical location comprises an IP address, GPS coordinates, a country, a state, a county, a city, a zip code, or a combination thereof, and wherein the time-based information includes a start time, an end time, a time zone, a start date, an end date, or a combination thereof.

* * * * *